(12) United States Patent
Sakamoto et al.

(10) Patent No.: US 10,388,271 B2
(45) Date of Patent: Aug. 20, 2019

(54) SOUND SYMBOLISM WORD/PHYSICAL FEATURE INFORMATION PROVIDING APPARATUS AND SOUND SYMBOLISM WORD/PHYSICAL FEATURE INFORMATION PROVIDING METHOD

(71) Applicant: The University of Electro-Communications, Tokyo (JP)

(72) Inventors: Maki Sakamoto, Tokyo (JP); Tatsuki Kagitani, Tokyo (JP)

(73) Assignee: The University of Electro-Communications, Tokyo (JP)

( * ) Notice: Subject to any disclaimer, the term of this patent is extended or adjusted under 35 U.S.C. 154(b) by 40 days.

(21) Appl. No.: 15/758,133

(22) PCT Filed: Sep. 2, 2016

(86) PCT No.: PCT/JP2016/075849
§ 371 (c)(1),
(2) Date: Jul. 26, 2018

(87) PCT Pub. No.: WO2017/043424
PCT Pub. Date: Mar. 16, 2017

(65) Prior Publication Data
US 2018/0322864 A1    Nov. 8, 2018

(30) Foreign Application Priority Data
Sep. 10, 2015 (JP) .................................. 2015-178379

(51) Int. Cl.
*G10L 15/02* (2006.01)
*G10L 15/22* (2006.01)
(Continued)

(52) U.S. Cl.
CPC .......... *G10L 15/02* (2013.01); *G06Q 30/0282* (2013.01); *G10L 15/22* (2013.01);
(Continued)

(58) Field of Classification Search
CPC ......... G10L 15/02; G10L 15/22; G10L 15/30; G10L 25/03; G10L 2015/025; G06Q 30/0282
See application file for complete search history.

(56) References Cited

U.S. PATENT DOCUMENTS

2016/0232181 A1* 8/2016 Masuko ............... G06K 9/6202

FOREIGN PATENT DOCUMENTS

| JP | 2897701 | 5/1999 |
|----|---------|--------|
| JP | 2010-256957 | 11/2010 |
| JP | 2013-033351 | 2/2013 |

OTHER PUBLICATIONS

Tatsuki Kagitani et al., "A Method to Recommend Viscosity Animation Appropriate for Japanese Onomatopoeia Based on Sound Symbolism", 28th Proceedings of the Annual Conference of JSAI CD-ROM[CD-ROM], 2014 Nendo 28th Proceedings of the Annual Conference of JSAI, May 15, 2014(May 15, 2014), pp. 1 to 4 with English Abstract.

(Continued)

*Primary Examiner* — Walter Yehl
(74) *Attorney, Agent, or Firm* — IPUSA, PLLC

(57) ABSTRACT

Information can be provided upon quantitatively associating a sound symbolism word and a physical feature. An input unit configured to input a sound symbolism word; a morpheme analyzing unit configured to analyze a phonemic element included in the sound symbolism word; a physical feature estimating unit configured to estimate a physical feature value corresponding to the sound symbolism word based on a phonemic physical feature database defining a correlation between a phonemic element and a physical feature value, with respect to the phonemic element included in the sound symbolism word; and a presenting unit configured to present the estimated physical feature value, are included.

12 Claims, 40 Drawing Sheets

(51) Int. Cl.
G10L 25/03 (2013.01)
G10L 15/30 (2013.01)
G06Q 30/02 (2012.01)

(52) U.S. Cl.
CPC .............. *G10L 15/30* (2013.01); *G10L 25/03* (2013.01); *G10L 2015/025* (2013.01)

(56) References Cited

OTHER PUBLICATIONS

Yasunari Sasaki et al., "Qualitative Evaluation of Shaded Texture Images with Onomatopoeia: Statistical Analyses of Relationship Between Phonological and Image Features", Cognitive Studies: Bulletin of the Japanese Cognitive Science Society, Sep. 1, 2011 (Sep. 1, 2011), vol. 18, No. 3, pp. 477 to 490 with English Abstract.
Tomohiko Hayakawa et al., "Phonological Analysis of Texture Phase Diagram", 14th Proceedings of the Annual Conference of VRSJ[DVD-ROM], Sep. 11, 2009(Sep. 11, 2009), pp. 1 to 4 with English Abstract.
Chiemi Watanabe et al., "Cooking Recipe Ranking using Fitness Value between a Recipe and an Onomatopoeia in Cooking Recipe Search System "Onomatoperori"", 2012 Nendo 26th Proceedings of the Annual Conference of JSAI [CD-ROM], Jun. 15, 2012(Jun. 15, 2012), pp. 1 to 4 with English Abstract.
International Search Report for PCT/JP2016/075849 dated Nov. 22, 2016.

* cited by examiner

FIG.2

MORPHEME DATABASE 14

| HIRAGANA/KATAKANA | PHONEME | MORPHEME |
|---|---|---|
| A | /A/ | V |
| : | : | : |
| KA | /k/ /a/ | CV |
| : | : | : |

FIG.3A

PHONEMIC PHYSICAL FEATURE DATABASE (TABLE LIST) 15

| | CONSONANT ROW | | | DULL SOUND | | |
|---|---|---|---|---|---|---|
| EVALUATION SCALE | /t/ | /n/ | /r/ | DULL SOUND | SEMI-DULL SOUND | .. |
| FRICTION COEFFICIENT | 0.6 | 0.1 | 0.5 | 0.9 | 0.6 | .. |
| TEMPERATURE | 22.4 | 32.9 | 8.2 | 25.0 | 4.7 | .. |
| DEGREE OF ELASTICITY | 0.05 | 0.27 | 0.12 | 0.02 | 0.19 | .. |
| MOISTURE CONTENT | 5.1% | 10.4% | 9.2% | 1.1% | 4.2% | .. |
| : | : | : | : | : | : | : |

FIG.3B

PHONEMIC PHYSICAL FEATURE DATABASE (TABLE LIST) ~15

|  | CONSONANT ROW | | | DULL SOUND | | .. |
|---|---|---|---|---|---|---|
| EVALUATION SCALE | /t/ | /n/ | /r/ | DULL SOUND | SEMI-DULL SOUND | .. |
| STRONG FLOUR (g) | 70 | 40 | 50 | 10 | 20 | .. |
| SOFT FLOUR (g) | 20 | 10 | 30 | 25 | 10 | .. |
| SUGAR (g) | 7 | 10 | 3 | 0.5 | 15 | .. |
| BUTTER (g) | 3 | 11 | 2 | 2 | 12 | .. |
| : | : | : | : | : | : | : |

FIG.4A

| FIRST MORA | SECOND MORA | PHONEME | CATEGORY |
|---|---|---|---|
| $X_1$ | $X_7$ | CONSONANT | NO, KA ROW, SA ROW, TA ROW, HA ROW, MA ROW, YA ROW, RA ROW, WA ROW |
| $X_2$ | $X_8$ | DULL SOUND/ SEMI-DULL SOUND | NO, WITH DULL SOUND, WITH SEMI-DULL SOUND |
| $X_3$ | $X_9$ | CONTRACTED SOUND | NO, YES |
| $X_4$ | $X_{10}$ | VOWEL | NO, /A/, /I/, /U/, /E/, /O/ |
| $X_5$ | $X_{11}$ | SMALL VOWEL | NO, /a/, /i/, /u/, /e/, /o/ |
| $X_6$ | | SPECIAL SOUND | NO, SYLLABIC NASAL/N/, DOUBLE CONSONANT/Q/, PROLONGED SOUND/R/ |
| | $X_{12}$ | SPECIAL END OF WORD | NO, SYLLABIC NASAL/N/, DOUBLE CONSONANT/Q/, PROLONGED SOUND /R/, "RI" AT END OF WORD |
| $X_{13}$ | | REPETITION | NO, YES |

FIG.4B $$Y = a_1 X_1 + a_2 X_2 + a_3 X_3 + \cdots + a_{13} X_{13}$$

FIG.4C

| PROVISION-AL NUMBER | CONSO-NANT 1 | VOWEL 1 | CONTRACT-ED SOUND 1 | DULL SOUND 1 | CONSO-NANT 2 | VOWEL 2 | CONTRACT-ED SOUND 2 | ·· |
|---|---|---|---|---|---|---|---|---|
| 1 | NO | A | NO | NO | NO | A | NO | ·· |
| 2 | K | I | YES | YES | K | I | YES | ·· |
| 3 | S | U | | | S | U | | ·· |
| 4 | T | E | | | T | E | | ·· |
| : | : | : | : | : | : | : | : | : |

FIG.5A

| STIMULUS | FRICTION COEFFICIENT | CONSO-NANT 1 | VOWEL 1 | CONTRACT-ED SOUND 1 | DULL SOUND 1 | CONSO-NANT 2 | VOWEL 2 | .. |
|---|---|---|---|---|---|---|---|---|
| TARGET A | 0.2 | 1 | 1 | 1 | 1 | 2 | 1 | .. |
| TARGET B | 0.7 | 2 | 2 | 1 | 1 | 4 | 2 | .. |
| TARGET C | 0.1 | 2 | 3 | 2 | 1 | 5 | 3 | .. |
| TARGET D | 1.2 | 4 | 2 | 1 | 2 | 6 | 2 | .. |
| TARGET E | 0.4 | 3 | 4 | 1 | 1 | 2 | 4 | .. |
| TARGET F | 0.8 | 5 | 2 | 2 | 1 | 1 | 5 | .. |
| : | : | : | : | : | : | : | : | : |

FIG.5B

| STIMULUS | BUTTER (PER 100 g OF BREAD) | CONSO-NANT 1 | VOWEL 1 | CON-TRACTED SOUND 1 | DULL SOUND 1 | CONSO-NANT 2 | VOWEL 2 | .. |
|---|---|---|---|---|---|---|---|---|
| TARGET A' | 14 g | 1 | 1 | 1 | 1 | 2 | 1 | .. |
| TARGET B' | 12 g | 2 | 2 | 1 | 1 | 4 | 2 | .. |
| TARGET C' | 10 g | 2 | 3 | 2 | 1 | 5 | 3 | .. |
| TARGET D' | 8 g | 4 | 2 | 1 | 2 | 6 | 2 | .. |
| TARGET E' | 9 g | 3 | 4 | 1 | 1 | 2 | 4 | .. |
| TARGET F' | 15 g | 5 | 2 | 2 | 1 | 1 | 5 | .. |
| : | : | : | : | : | : | : | : | : |

FIG.11

| FIRST MORA | | | | | |
|---|---|---|---|---|---|
| CONSONANT | DULL SOUND | CONTRACTED SOUND | VOWEL | SMALL VOWEL | SPECIAL SOUND |
| NONE | NO | NO | NO | NO | NO |
| KA ROW | DULL SOUND | YES | A | a | SYLLABIC NASAL N |
| SA ROW | SEMI-DULL SOUND | | I | i | DOUBLE CONSONANT Q |
| TA ROW | | | U | u | PROLONGED SOUND R |
| NA ROW | | | E | e | |
| HA ROW | | | O | o | |
| MA ROW | | | | | |
| YA ROW | | | | | |
| RA ROW | | | | | |
| WA ROW | | | | | |

| SECOND MORA | | | | | |
|---|---|---|---|---|---|
| CONSONANT | DULL SOUND | CONTRACTED SOUND | VOWEL | SMALL VOWEL | SPECIAL SOUND |
| NONE | NO | NO | NO | NO | NO |
| KA ROW | DULL SOUND | YES | A | a | SYLLABIC NASAL N |
| SA ROW | SEMI-DULL SOUND | | I | i | DOUBLE CONSONANT Q |
| TA ROW | | | U | u | PROLONGED SOUND R |
| NA ROW | | | E | e | |
| "ri" | | | O | o | "ri" AT END OF WORD |
| HA ROW | | | | | |
| MA ROW | | | | | |
| YA ROW | | | | | |
| RA ROW | | | | | |
| WA ROW | | | | | |

FIG.12

| ONOMATOPOEIA EXPRESSION DATA | | | | | | | | | | | |
|---|---|---|---|---|---|---|---|---|---|---|---|
| | | FIRST MORA | | | | | SECOND MORA | | | | |
| MORA NUMBER | REPE-TITION | CONSO-NANT | DULL SOUND/SEMI-DULL SOUND | CON-TRAC-TED SOUND | VOWEL | SMALL VOWEL | SPE-CIAL SOUND | CONSO-NANT | DULL SOUND/SEMI-DULL SOUND | CON-TRAC-TED SOUND | VOWEL | SMALL VOWEL | SPE-CIAL END OF WORD |

$$Y = \frac{X_1 + X_2 + \cdots + X_{11} + X_{12} + X_{13} + Const.}{n} \times 2$$

FIG.18

EVALUATION SCALES (ADJECTIVE PAIR)

| «ADJECTIVE PAIRS» |
| :---: |
| BRIGHT-DARK |
| WARM-COLD |
| THICK-THIN |
| SAFE-UNSAFE |
| GOOD-BAD |
| STRONG IMPRESSION-WEAK IMPRESSION |
| HAPPY-SAD |
| CALM-RESTLESS |
| COMFORTABLE-UNCOMFORTABLE |
| REGULAR-IRREGULAR |
| CLEAN-DIRTY |
| MODERN-OLD |
| UNIQUE-TYPICAL |
| REFRESHING-SULLEN |
| NATURAL-ARTIFICIAL |
| FRIENDLY-UNFRIENDLY |
| DAMP-DRY |
| SHARP-MILD |
| ELEGANT-VULGAR |
| DURABLE-FRAGILE |
| SIMPLE-COMPLEX |
| LIKE-DISLIKE |
| SLIPPERY-VISCOUS |
| INCISIVE-DULL |
| STATIC-DYNAMIC |
| SOPHISTICATED-CORNY |
| FUN-BORING |
| ELASTIC-HARD |
| SHINY-MAT |
| STRONG-WEAK |
| BUMPY-FLAT |
| SMOOTH-ROUGH |
| STRETCHY-RIGID |
| FIERCE-QUIET |
| FLASHY-MODEST |
| CHEERFUL-GLOOMY |
| YOUTHFUL-AGED |
| CLASSY-CRUMMY |
| RESISTANT-NONRESISTANT |
| BRIGHT-DARK |
| WARM-COLD |
| THICK-THIN |
| SAFE-UNSAFE |

FIG.19

QUANTITATIVE EVALUATION DATABASE

|  | FIRST MORA "CONSONANT" | | | FIRST MORA "WHETHER THERE IS DULL SOUND/SEMI-DULL SOUND" | | | CON-STANT TERM |
|---|---|---|---|---|---|---|---|
| EVALUATION SCALE | KA ROW | SA ROW | HA ROW | NO | DULL SOUND | SEMI-DULL SOUND | |
| (−) WARM−COLD (+) | 0.16 | 0.52 | −0.28 | −0.08 | 0.18 | −0.13 | 3.89 |
| (−) BRIGHT−DARK (+) | −0.13 | −0.07 | −0.38 | −0.31 | 0.78 | −0.66 | 3.86 |
| (−) HARD−SOFT (+) | −0.82 | −0.33 | 0.29 | 0.14 | −0.39 | 0.48 | 4.43 |
| (−) SOLID−AIRY (+) | 0.11 | 0.47 | 0.22 | 0.44 | −0.95 | 0.32 | 3.86 |
| (−) YOUTHFUL−AGED (+) | 0.10 | −0.16 | −0.08 | −0.14 | 0.45 | −0.70 | 3.60 |
| (−) BUMPY−FLAT (+) | −0.06 | 0.56 | 0.13 | 0.36 | −0.68 | −0.22 | 3.37 |
| ⋮ | ⋮ | ⋮ | ⋮ | ⋮ | ⋮ | ⋮ | ⋮ |

FIG.23

IMAGE DATA

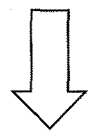

IMAGE FEATURE AMOUNT EXTRACTION
EXTRACT IMAGE FEATURE AMOUNT BY GLCM
(Gray-Level Co-occurrence Matrix)

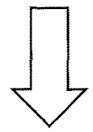

IMAGE FEATURE AMOUNT DATA

· Angular Second Moment (UNIFORMITY)
· Auto Correlation
· Cluster Prominence (STRENGTH OF CHANGE IN LIGHT AND SHADE, STRENGTH OF EDGE)
· Cluster Shade (EDGE STRENGTH)
· Contrast (CONTRAST)
· Correlation (COMPLEXITY AND PERIODICITY)
· Dissimilarity
· Entropy (MESSINESS)
· Homogeneity (NON-UNIFORMITY, LOCAL UNIFORMITY)
· Inverse Difference Moment (LOCAL UNIFORMITY)

$$\mu_x = \sum_i \sum_j i \cdot p(i,j), \quad \mu_y = \sum_i \sum_j j \cdot p(i,j),$$
$$\sigma_x = \sum_i \sum_j (i-\mu_x)^2 \cdot p(i,j), \quad \sigma_y = \sum_i \sum_j (i-\mu_y)^2 \cdot p(i,j)$$

FIG.25

Energy (angular second moment):

$$f_1 = \sum_i \sum_j p(i,j)^2$$

Contrast:

$$f_2 = \sum_{n=0}^{N_g-1} n^2 \left\{ \sum_{i=1}^{N_g} \sum_{j=1}^{N_g} p(i,j) \,\bigg|\, |i-j| = n \right\}$$

Correlation:

$$f_3 = \frac{\sum_i \sum_j (ij) p(i,j) - \mu_x \mu_y}{\sigma_x \sigma_y}$$

Inverse Difference Moment:

$$f_4 = \sum_i \sum_j \frac{1}{1 + (i-j)^2} p(i,j)$$

Entropy:

$$f_5 = -\sum_i \sum_j p(i,j) \log(p(i,j))$$

Autocorrelation:

$$f_6 = \sum_i \sum_j (ij) p(i,j)$$

Dissimilarity:

$$f_7 = \sum_i \sum_j |i-j| p(i,j)$$

Cluster Shade:

$$f_8 = \sum_i \sum_j (i + j - \mu_x - \mu_y)^3 p(i,j)$$

Cluster Prominence:

$$f_9 = \sum_i \sum_j (i + j - \mu_x - \mu_y)^4 p(i,j)$$

Homogeneity:

$$f_4 = \sum_i \sum_j \frac{1}{1 + |i-j|} p(i,j)$$

Maximum Probability:

$$f_{10} = \max_{i,j} p(i,j)$$

FIG.30

COEFFICIENT DATA

| ADJECTIVE PAIRS | $a_1$ | $a_2$ | $a_3$ | $a_4$ | $a_5$ | $a_6$ | Const. |
|---|---|---|---|---|---|---|---|
| BRIGHT-DARK | -0.3464 | -0.0001 | 0.0093 | -0.0361 | 0.5301 | -0.8017 | 0.2823 |
| WARM-COLD | -0.2101 | 0 | -0.0007 | -0.0247 | 0.4687 | -0.6645 | 0.3326 |
| THICK-THIN | 0.2554 | 0.0001 | -0.0145 | 0.0129 | -0.4251 | 0.4366 | -0.0671 |
| SAFE-UNSAFE | -0.2394 | 0 | 0.0022 | -0.0095 | 0.5456 | -0.6132 | 0.258 |
| GOOD-BAD | -0.3604 | 0 | 0.0043 | -0.0137 | 0.7795 | -0.8575 | 0.25 |
| STRONG IMPRESSION-WEAK IMPRESSION | 0.2299 | 0.0001 | -0.0079 | 0.0178 | -0.504 | 0.5832 | -0.3061 |
| HAPPY-SAD | -0.2353 | 0 | 0.0032 | -0.0157 | 0.4777 | -0.5957 | 0.1571 |
| CALM-RESTLESS | -0.2274 | 0 | 0.002 | -0.0058 | 0.5889 | -0.6098 | 0.283 |
| COMFORTABLE-UNCOMFORTABLE | -0.3937 | 0 | 0.0047 | -0.0081 | 0.9019 | -0.9455 | 0.258 |
| HARD-SOFT | 0.5674 | 0 | -0.0068 | 0.0586 | -1.1041 | 1.459 | -0.5294 |
| REGULAR-IRREGULAR | -0.0671 | -0.0001 | 0.0083 | -0.0102 | 0.2234 | -0.3323 | 0.1307 |
| CLEAN-DIRTY | -0.3841 | -0.0001 | 0.0083 | -0.0168 | 0.7321 | -0.8514 | 0.2087 |
| MODERN-OLD | -0.1404 | 0 | 0.0053 | -0.0211 | 0.3233 | -0.4794 | 0.1572 |
| UNIQUE-TYPICAL | 0 | 0 | 0.0009 | 0 | 0 | -0.0322 | 0.0313 |
| REFRESHING-SULLEN | -0.3108 | -0.0001 | 0.0069 | -0.0102 | 0.7712 | -0.8236 | 0.2544 |
| NATURAL-ARTIFICIAL | 0 | 0 | 0 | 0 | 0 | 0 | 0 |
| FRIENDLY-UNFRIENDLY | -0.2311 | 0 | 0.005 | -0.0189 | 0.5474 | -0.6851 | 0.1251 |
| DAMP-DRY | 0 | 0 | 0.0011 | 0 | -0.3983 | 0.3108 | 0.2092 |
| SHARP-MILD | 0.1888 | 0 | 0.0008 | 0.0213 | -0.4448 | 0.5991 | -0.2058 |
| SOLID-AIRY | 0.3041 | 0.0001 | -0.0149 | 0.0352 | -0.462 | 0.669 | -0.1699 |
| ELEGANT-VULGAR | -0.2583 | 0 | 0.0042 | -0.0028 | 0.629 | -0.6314 | 0.1586 |
| DURABLE-FRAGILE | 0 | 0 | 0 | 0 | 0 | 0 | 0 |
| SIMPLE-COMPLEX | -0.1213 | -0.0001 | 0.006 | -0.0167 | 0.4006 | -0.5415 | 0.0372 |
| LIKE-DISLIKE | -0.3152 | 0 | 0.003 | -0.0083 | 0.7374 | -0.7902 | 0.1855 |
| SLIPPERY-VISCOUS | -0.1587 | -0.0001 | 0.0061 | 0.0047 | 0.4655 | -0.4076 | -0.1543 |
| INCISIVE-DULL | 0 | 0 | 0 | 0 | 0 | 0 | 0 |
| STATIC-DYNAMIC | -0.15 | 0 | 0.0024 | -0.0092 | 0.4019 | -0.4257 | 0.313 |
| SOPHISTICATED-CORNY | -0.2111 | -0.0001 | 0.0093 | -0.0207 | 0.5119 | -0.6799 | 0.2748 |
| FUN-BORING | -0.2036 | 0 | 0.0044 | -0.0213 | 0.4103 | -0.5742 | 0.1572 |
| MASCULINE-FEMININE | 0.3186 | 0.0001 | -0.0115 | 0.0448 | -0.5275 | 0.848 | -0.3503 |
| ELASTIC-HARD | 0 | 0 | 0.0003 | 0 | 0.2809 | -0.3728 | 0.2652 |
| SHINY-MAT | -0.2593 | -0.0001 | 0.0138 | -0.0554 | 0.421 | -0.8348 | 0.5886 |
| STRONG-WEAK | 0.3658 | 0.0001 | -0.0086 | 0.0213 | -0.8047 | 0.8728 | -0.1981 |
| BUMPY-FLAT | 0.1727 | 0.0001 | -0.0121 | 0.0136 | -0.4256 | 0.5086 | -0.1586 |
| SMOOTH-ROUGH | -0.3736 | -0.0001 | 0.0151 | -0.0605 | 0.8729 | -1.319 | 0.5955 |
| STRETCHY-RIGID | -0.1701 | 0 | 0.0041 | -0.0331 | 0.5548 | -0.8026 | 0.5448 |
| CHEERFUL-GLOOMY | -0.278 | -0.0001 | 0.0074 | -0.0264 | 0.4251 | -0.6411 | 0.1992 |
| FLASHY-MODEST | 0 | 0 | 0 | 0 | 0 | 0 | 0 |
| CHEERFUL-GLOOMY | -0.278 | -0.0001 | 0.0074 | -0.0264 | 0.4251 | -0.6411 | 0.1992 |
| WESTERN-JAPANESE | -0.0919 | 0 | 0.0033 | -0.0151 | 0.1752 | -0.284 | 0.0986 |
| YOUTHFUL-AGED | -0.1892 | -0.0001 | 0.0078 | -0.028 | 0.3189 | -0.5466 | 0.1405 |
| CLASSY-CRUMMY | -0.1573 | 0 | 0.0041 | -0.0071 | 0.5172 | -0.5926 | 0.2384 |
| RESISTANT-NONRESISTANT | 0.3377 | 0.0001 | -0.0093 | 0.0115 | -0.767 | 0.7813 | -0.0754 |

FIG.33
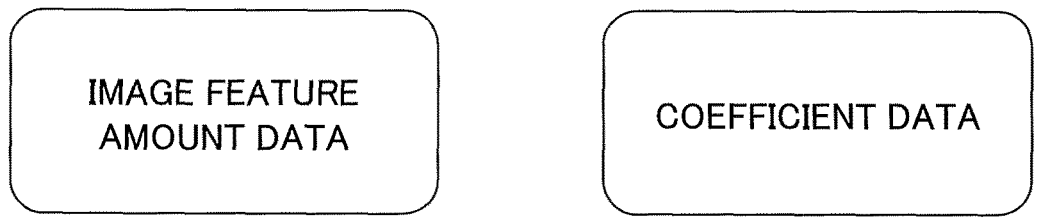
ADJECTIVE PAIR EVALUATION VALUE ESTIMATION
$\hat{Y} = a_1 \cdot (Angular\ Second\ Moment)$
$+ a_2 \cdot (Contrast)$
$+ a_3 \cdot (Dissimilarity)$
$+ a_4 \cdot (Entropy)$
$+ a_5 \cdot (Homogeneity)$
$+ a_6 \cdot (Inverse\ Difference\ Moment)$
$+ Constant.$
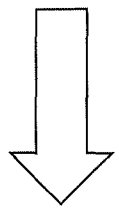
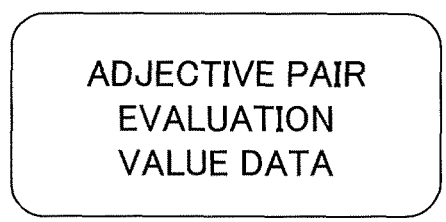

SOUND SYMBOLISM WORD/PHYSICAL FEATURE INFORMATION PROVIDING APPARATUS AND SOUND SYMBOLISM WORD/PHYSICAL FEATURE INFORMATION PROVIDING METHOD

TECHNICAL FIELD

The present invention relates to a technique of analyzing language expressions.

BACKGROUND ART

In the field of product development, it is important to develop products that meet the needs of customers. Product development is, in one aspect, to determine the physical features of a product by trial and error in the selection and allocation of raw materials and materials.

The customer's needs are not necessarily concrete, and it is difficult to associate the customer's needs with the physical features of a product. For example, customers often make indications using sound symbolism words such as onomatopoeia, for example, "I want a drink with a bubbly popping (puchi puchi) feeling", "a silky fluffy (sara fuwa) towel is nice", "sparkling (kira kira) is nice, but glittering (gira gira) is disgusting", etc.; however, it is difficult to directly apply the indications to product development.

Note that, a sound symbolism word is a word whose speech sound is associated, in a synesthetic manner, with the impressions of the five senses (auditory, visual, tactile, olfactory, taste). Onomatopoeia is a kind of a sound symbolism word, and is a generic term of onomatopoeic words/mimetic words.

On the other hand, the inventors of the present invention have proposed techniques relating to the evaluation and generation of onomatopoeia (see Patent Literature 1 and 2, etc.).

CITATION LIST

Patent Literature

[PTL 1]
Japanese Patent No. 5354425
[PTL 2]
Japanese Unexamined Patent Application Publication No. 2013-33351

SUMMARY OF INVENTION

Technical Problem

As described above, customers often express their needs by using sound symbolism words such as onomatopoeia, etc.; however, conventionally, there has been no method for quantitatively associating sound symbolism words with physical features of products.

The present invention has been made in view of the above conventional problem, and an object of the present invention is to make it possible to provide information by quantitatively associating sound symbolism words with physical features.

Solution to Problem

In order to solve the above problems, according to the present invention, the present invention includes an input unit configured to input a sound symbolism word; a morpheme analyzing unit configured to analyze a phonemic element included in the sound symbolism word; a physical feature estimating unit configured to estimate a physical feature value corresponding to the sound symbolism word based on a phonemic physical feature database defining a correlation between a phonemic element and a physical feature value, with respect to the phonemic element included in the sound symbolism word; and a presenting unit configured to present the estimated physical feature value.

Advantageous Effects of Invention

According to the present invention, information can be provided upon quantitatively associating a sound symbolism word and a physical feature.

BRIEF DESCRIPTION OF DRAWINGS

FIG. 2 is a diagram illustrating an example of a data structure of a morpheme database.

FIG. 3A is a diagram (part 1) illustrating an example of a data structure of a phonemic physical feature database.

FIG. 3B is a diagram (part 2) illustrating an example of a data structure of a phonemic physical feature database.

FIG. 4A is a diagram (part 1) illustrating an example of a method of generating a phonemic physical feature database.

FIG. 4B is a diagram (part 2) illustrating an example of a method of generating a phonemic physical feature database.

FIG. 4C is a diagram (part 3) illustrating an example of a method of generating a phonemic physical feature database.

FIG. 5A is a diagram (part 4) illustrating an example of a method of generating a phonemic physical feature database.

FIG. 5B is a diagram (part 5) illustrating an example of a method of generating a phonemic physical feature database.

FIG. 11 is a diagram illustrating an example of analysis items by a morpheme analyzing unit.

FIG. 12 is a diagram illustrating an example of a data structure of onomatopoeia expression data.

FIG. 18 is a diagram illustrating an example of an evaluation scale.

FIG. 19 is a diagram illustrating an example of a data structure of a quantitative evaluation database.

FIG. 23 is a diagram illustrating a process example of image feature amount extraction.

FIG. 25 is a diagram illustrating formulas of an image feature amount of GLOM.

FIG. 30 is a diagram illustrating an example of coefficient data.

FIG. 33 is a diagram illustrating a process example of adjective pair evaluation value estimation.

DESCRIPTION OF EMBODIMENTS

Preferred embodiments of the present invention will be described below. As an example of sound symbolism words, onomatopoeia will be mainly described; however, it is obvious that sound symbolism words other than onomatopoeia can also be applied. Here, the phrase "sound symbolism word" means a word whose speech sound is associated, in a synesthetic manner, with the impression of the five senses (auditory, visual, tactile, olfactory, taste). Onomatopoeia is a kind of sound symbolism word, and is a generic term of onomatopoeic words/mimetic words.

First Embodiment

[Overall Structure]

Figure 1:
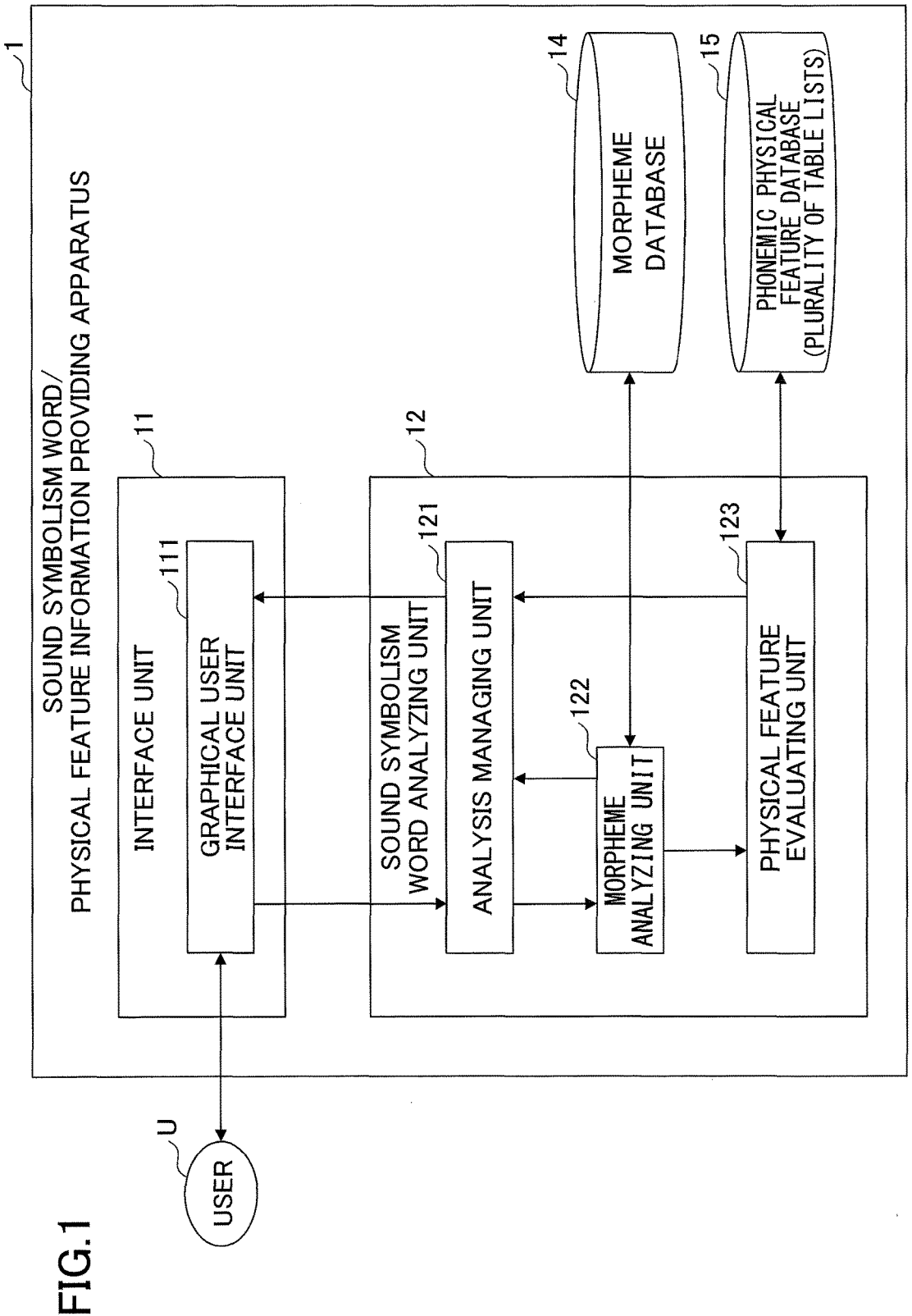
FIG. 1 is a diagram illustrating a configuration example of a sound symbolism word/physical feature information providing apparatus according to a first embodiment.

FIG. 1 is a diagram illustrating a configuration example of a sound symbolism word/physical feature information providing apparatus 1 according to a first embodiment. In FIG. 1, the sound symbolism word/physical feature information providing apparatus 1 includes an interface unit 11 and a sound symbolism word analyzing unit 12 as functional units. These functional units are implemented by computer programs executed on hardware resources such as a CPU (Central Processing Unit), a ROM (Read-Only Memory), and a RAM (Random Access Memory), etc., of a computer forming the sound symbolism word/physical feature information providing apparatus 1. The units need not be arranged on a single computer, but may be distributed over a plurality of computers according to need. For example, the interface unit 11 may be arranged in a remote terminal and may be constituted in the form of a client server. The computer programs may be installed from a recording medium such as a CD-ROM, or may be downloaded from a storage device of a server (not illustrated) communicably connected via the Internet, etc., and installed.

Furthermore, the sound symbolism word/physical feature information providing apparatus 1 includes a morpheme database 14 and a phonemic physical feature database 15 as databases to be referred to/updated during processing. These databases systematically hold predetermined data in a storage area in a storage medium such as an HDD (Hard Disk Drive) in the sound symbolism word/physical feature information providing apparatus 1. These databases need not be arranged in a single computer, but may be distributed over a plurality of computers according to need.

The interface unit 11 includes a graphical user interface unit 111 and has a function of interactively inputting information (inputting sound symbolism words, etc.) and outputting information (displaying corresponding physical feature values, etc.) with a user U.

The sound symbolism word analyzing unit 12 includes an analysis managing unit 121, a morpheme analyzing unit 122, and a physical feature evaluating unit 123, and has a function of estimating a physical feature value corresponding to a sound symbolism word input from the user U. The analysis managing unit 121 has a function of comprehensively managing the sound symbolism word analyzing unit 12. The morpheme analyzing unit 122 has a function of performing morphological analysis by referring to the morpheme database 14 based on a character string of a sound symbolism word input from the user U and generating an internal expression (onomatopoeia expression data, etc.) of the sound symbolism word. The physical feature evaluating unit 123 has a function of estimating a corresponding physical feature value by referring to the phonemic physical feature database 15 based on onomatopoeia expression data, etc.

[Database]

FIG. 2 is a diagram illustrating a data structure example of the morpheme database 14. In the morpheme database 14, "hiragana/katakana", "phoneme", and "morphology" are held in association with each other. Note that examples of phonemes of vowels, consonants, and small vowels are illustrated; however, in addition, there are consonants with contracted sounds (/ky/ etc.), double consonants (/Q/), syllabic nasal (/N/), prolonged sounds (/R/), "Ri" (/ri/), etc.

FIGS. 3A and 3B are diagrams illustrating an example of the data structure of the phonemic physical feature database 15. FIG. 3A is an example of a table list with respect to a product that can be touched by the customer, and includes the correlation values between the evaluation scales of physical features including "friction coefficient", "temperature", "degree of elasticity", "moisture content", etc., and phonemes included in sound symbolism words (onomatopoeia). The illustrated consonants and dull sounds are merely examples, and other phonemic elements, including vowels, may be included. FIG. 3B is an example of a table list with respect to food such as bread, and includes the correlation values between the evaluation scales of physical features including "(amount of) strong flour", "(amount of) soft flour", "(amount of) sugar", "(amount of) butter", etc., and the phonemic elements included in sound symbolism words (onomatopoeia). The table list is not limited to the example illustrated in the drawing; the table list may be prepared according to product categories and five senses. It is assumed that the evaluation scales of physical features can be represented by numerical values.

[Generation of Phonemic Physical Feature Database]

Subject experiments are performed, and analysis is performed based on the obtained results to generate the phonemic physical feature database 15. Specifically, in the case of a product that can be touched by a customer as illustrated in FIG. 3A, a plurality of samples having various values of evaluation scales are prepared, a plurality of subjects touch the samples in a blindfold state, and the subjects declare the sound symbolism word (onomatopoeia) that is imaged when touching the sample. In the case of food as illustrated in FIG. 3B, a plurality of samples having various values of evaluation scales are prepared, a plurality of subjects taste the samples in a blindfold state (also in a state where the subject cannot smell the sample if possible), and the subjects declare the sound symbolism word (onomatopoeia) that is imaged when tasting the sample. However, if the same sound symbolism word (onomatopoeia) is associated with a plurality of products in the subject experiment, the answers of extreme variations are deleted, and the average value for each physical feature scale is used to represent the answer.

FIG. 4A illustrates an example in which variables $X_1$ to $X_{13}$ are associated with phonemic elements (categories) included in a sound symbolism word (onomatopoeia). Note that "mora" refers to the number of beats in the Japanese rhythm. For example, in the case of an onomatopoeia "zuki", "zu" corresponds to the first mora and "ki" corresponds to the second mora.

FIG. 4B is a formula in which a physical feature value Y of a certain evaluation scale is represented by variables $X_1$ to $X_{13}$, and by obtaining the coefficients $a_1$ to $a_{13}$, the correlation value in the phonemic physical feature database 15 is determined. However, Y is the physical feature value of the experiment stimulus, but the category variables $X_1$ to $X_{13}$ are indications of the presence or absence of a phoneme that cannot be represented by a numerical value, and therefore the quantification theory class one (a method of making it possible to perform multiple regression analysis by allocating provisional numbers to categories) is applied.

FIG. 4C illustrates an example of provisional numbers to be allocated to phonemes. FIG. 5A illustrates an example in which provisional numbers are allocated to experimental results with respect to the evaluation scale "friction coefficient". FIG. 5B illustrates an example in which provisional numbers are allocated to experimental results with respect to the evaluation scale "butter". Note that phonemes that cannot be obtained by experiments can be regarded as not related to the physical feature value, and therefore the degree of influence is assumed to be 0. Then, by performing multiple regression analysis with respect to FIGS. 5A and 5B, correlation values between the evaluation scales and the respective categories can be obtained, and the summarized results form the phonemic physical feature database (FIGS. 3A and 3B).

[Automatic Generation of Phonemic Physical Feature Database]

The case where the phonemic physical feature database 15 is generated based on a subject experiment is described above; however, in the case of a substance (product) such as food for which a large number of recipes are posted on websites, etc., on the Internet, for example, the phonemic physical feature database 15 may be generated automatically, without carrying out a subject experiment.

Figure 6:
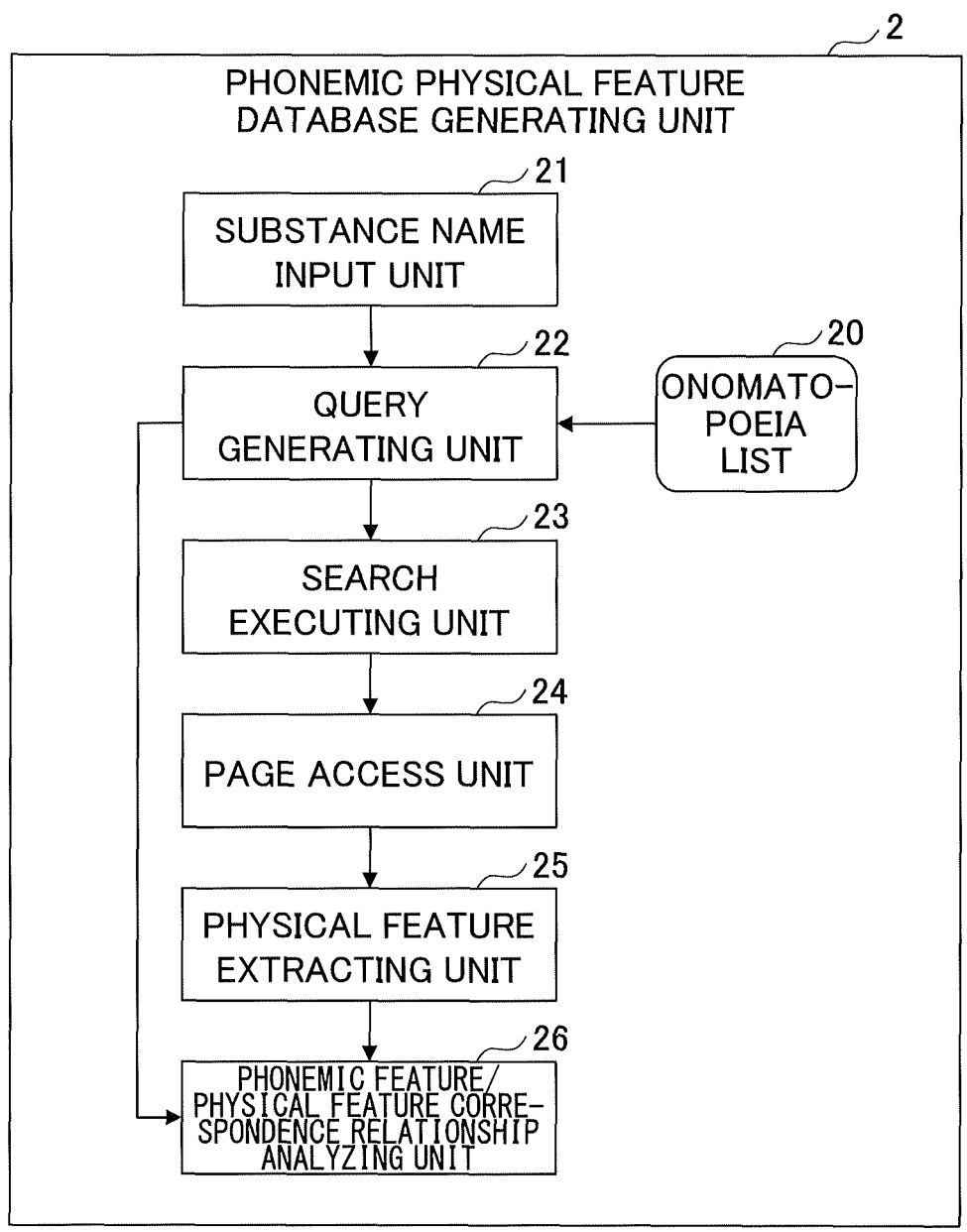
FIG. 6 is a diagram illustrating a configuration example of a phonemic physical feature database generating unit.

FIG. 6 is a diagram illustrating a configuration example of a phonemic physical feature database generating unit 2, which may be provided inside the sound symbolism word/physical feature information providing apparatus 1 (FIG. 1) or in another information processing apparatus. In FIG. 6, the phonemic physical feature database generating unit 2 includes an onomatopoeia list 20, a substance name input unit 21, a query generating unit 22, a search executing unit 23, a page access unit 24, a physical feature extracting unit 25, and a phonemic feature/physical feature correspondence relationship analyzing unit 26.

The onomatopoeia list 20 includes a plurality of onomatopoeias of all phonemes listed in advance. The substance name input unit 21 has a function of inputting a substance name (product common name) of a generation target from an administrator user. The query generating unit 22 has a function of generating a plurality of queries by combining the onomatopoeia in the onomatopoeia list 20 with the substance name input from the administrator user by the substance name input unit 21. The search executing unit 23 has a function of searching websites on a network such as the Internet (issuing a search request to a search engine) according to each query generated by the query generating unit 22, and acquiring a search result.

The page access unit 24 has a function of accessing a page based on a URL, etc., included in the search result, with respect to the top ranking search results, and acquiring the post information. The physical feature extracting unit 25 has a function of extracting physical features (descriptions of physical features) from the post information of the acquired page. The phonemic feature/physical feature correspondence relationship analyzing unit 26 has a function of performing analysis based on the phonemic features of onomatopoeia accompanying the query and the extracted physical feature, and generating a table list of the phonemic physical feature database 15.

Figure 7:
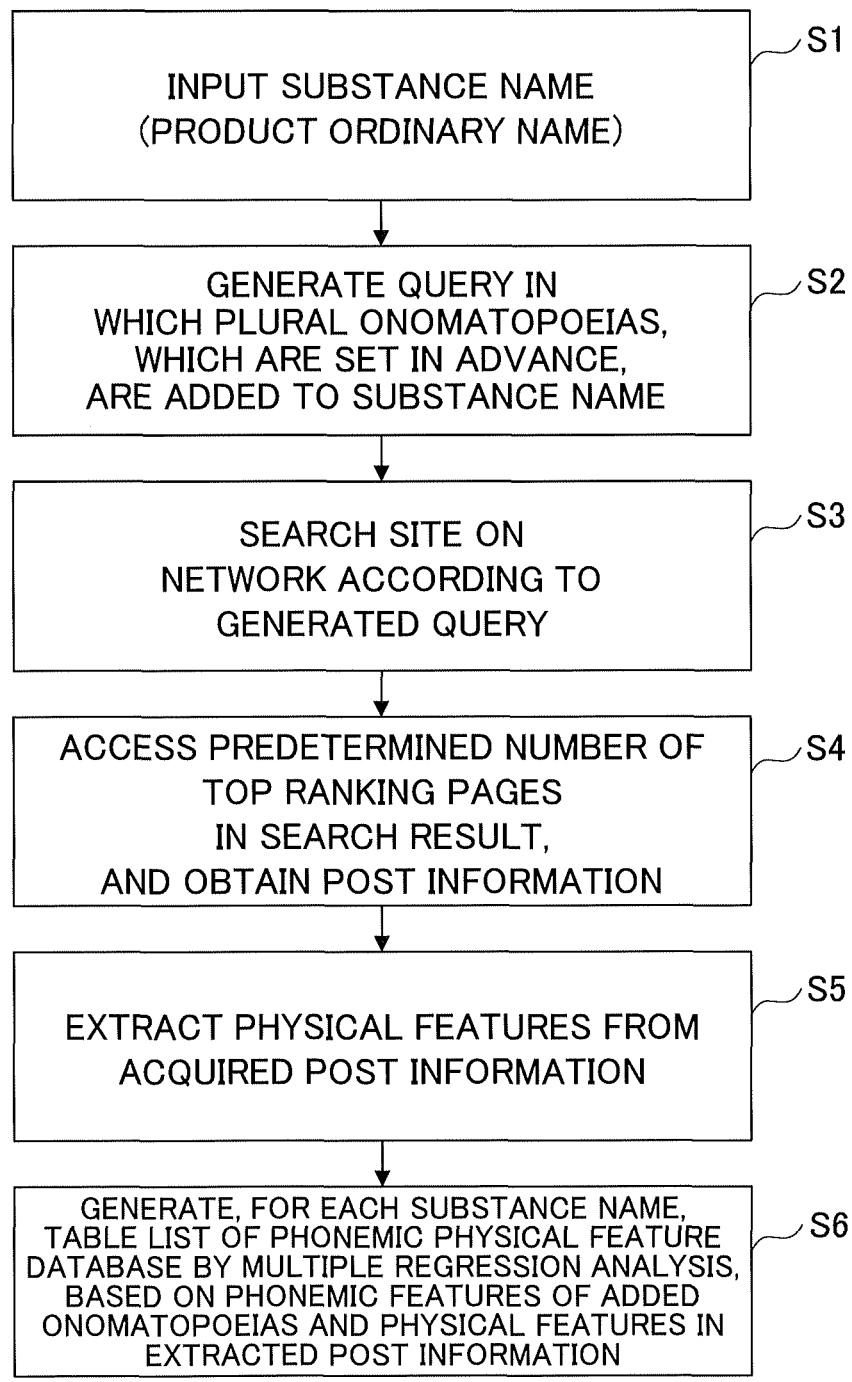
FIG. 7 is a flowchart illustrating a process example of a phonemic physical feature database generating unit.
Figure 8:
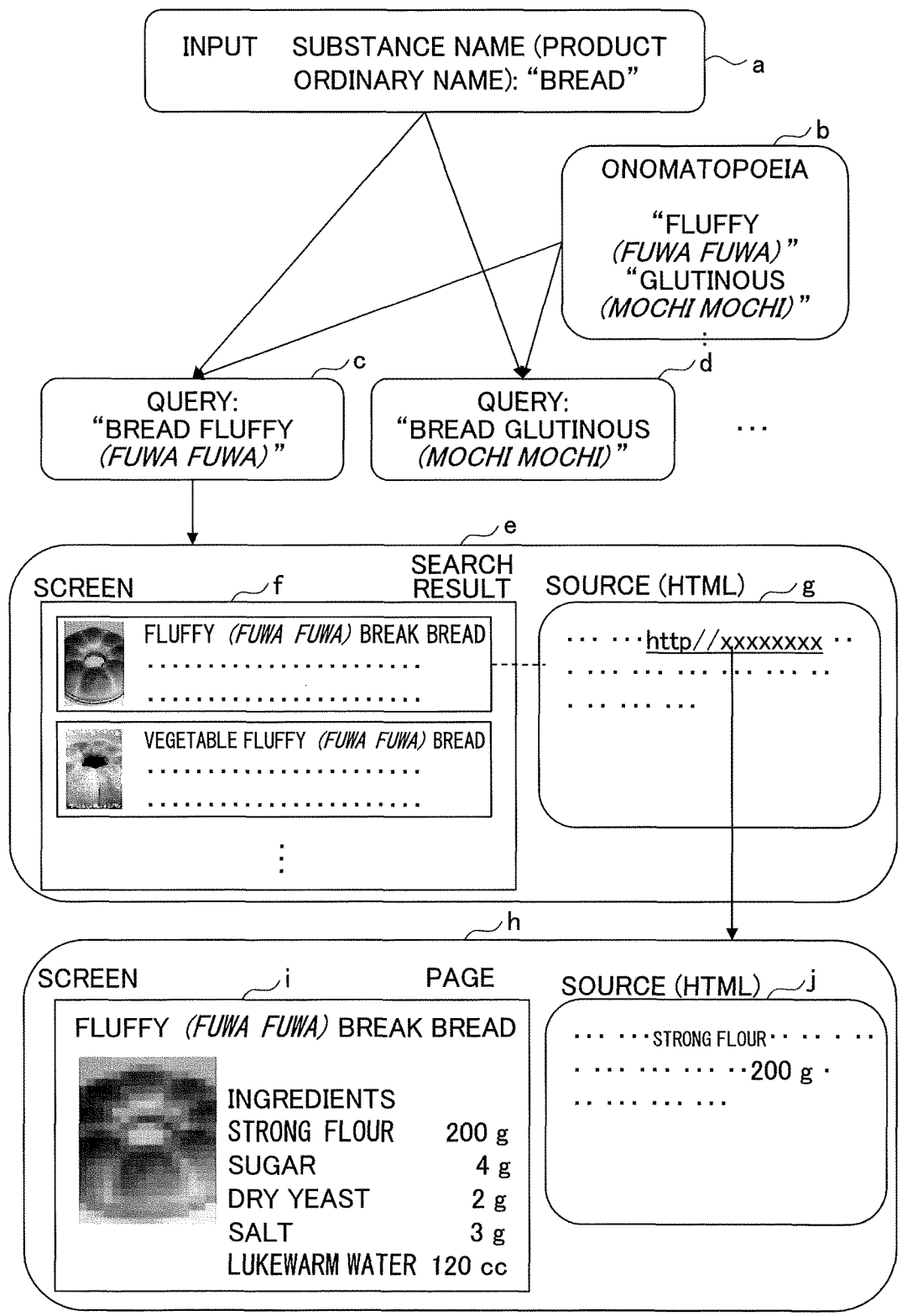
FIG. 8 is a diagram illustrating an example of acquiring information from a website on a network.

FIG. 7 is a flowchart illustrating a process example of the phonemic physical feature database generating unit 2. In FIG. 7, the substance name input unit 21 inputs a substance name (product common name) accepted from a user (step S1). In FIG. 8, "a" illustrates a case where "bread" is input as the substance name.

Returning to FIG. 7, the query generating unit 22 generates queries in which a plurality of onomatopoeias, which are set in advance in the onomatopoeia list 20, are added to the substance name input from the user (step S2). In FIG. 8, "b" illustrates an example of the onomatopoeia list 20, and it is assumed that "fluffy (fuwa fuwa)", "glutinous (mocha mochi)", etc., are registered, and queries such as "bread fluffy (fuwa fuwa)" and "bread glutinous (mocha mochi)" illustrated in "c" and "d" in FIG. 8 are generated.

Returning to FIG. 7, the search executing unit 23 searches websites on the network according to the generated queries (step S3). In FIG. 8, "e" illustrates an example of search results, "f" illustrates an example of screens (there is no need to perform screen display in automatic processing), and "g" illustrates an example of sources such as the HTML, etc.

Returning to FIG. 7, the page access unit 24 accesses a predetermined number of top ranking pages in the search result, and acquires post information (step S4). Based on the URL included in the source of the search result illustrated in "g" in FIG. 8, the corresponding page of "h" is accessed and the post information is acquired from the source of the page illustrated in "j". Although "i" illustrates a screen example of a page, it is not necessary to display a screen in automatic processing.

Returning to FIG. 7, the physical feature extracting unit 25 extracts physical features from the acquired post information (step S5). In FIG. 8, descriptions of materials such as "strong flour", "sugar", etc., are searched from the source of "j" when the target is "bread", for example, and the quantities displayed near the materials, such as "g" and "cc", etc., are extracted together with the descriptions of the materials.

Returning to FIG. 7, the phonemic feature/physical feature correspondence relationship analyzing unit 26 generates, for each substance name, a table list of the phonemic physical feature database 15 by multiple regression analysis, based on the phonemic features of the onomatopoeias added to the queries and the physical features in the extracted post information (step S6). Note that the with respect to mass, volume, etc., of the physical features used for the analysis, the extracted values are not directly used, but values standardized in consideration of the total mass, volume, etc., are used.

[Hardware Configuration]

Figure 9:
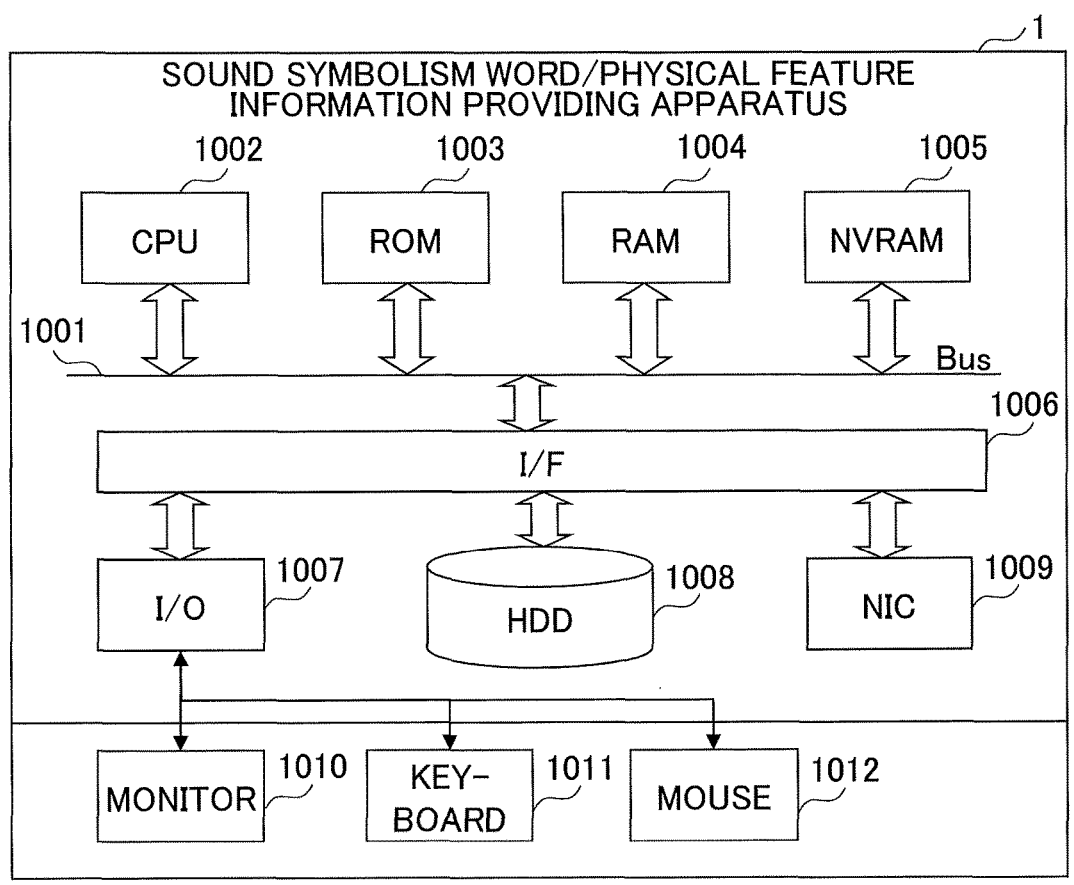
FIG. 9 is a diagram illustrating a hardware configuration example of a sound symbolism word/physical feature information providing apparatus.

FIG. 9 is a diagram illustrating a hardware configuration example of the sound symbolism word/physical feature information providing apparatus 1, which is a general computer configuration. In FIG. 9, the sound symbolism word/physical feature information providing apparatus 1 includes a CPU (Central Processing Unit) 1002, a ROM (Read-Only Memory) 1003, a RAM (Random Access Memory) 1004, and an NVRAM (Non-Volatile Random Access Memory) 1005, which are connected to a system bus 1001. Furthermore, the sound symbolism word/physical feature information providing apparatus 1 includes an I/F (Interface) 1006; an I/O (Input/Output device) 1007, an HDD (Hard Disk Drive) 1008, and an NIC (Network Interface Card) 1009 connected to the I/F 1006; a monitor 1010 connected to the I/O 1007, a keyboard 1011, and a mouse 1012, etc. A CD/DVD (Compact Disk/Digital Versatile Disk) drive, etc., may also be connected to the I/O 1007.

[Process]

Figure 10:
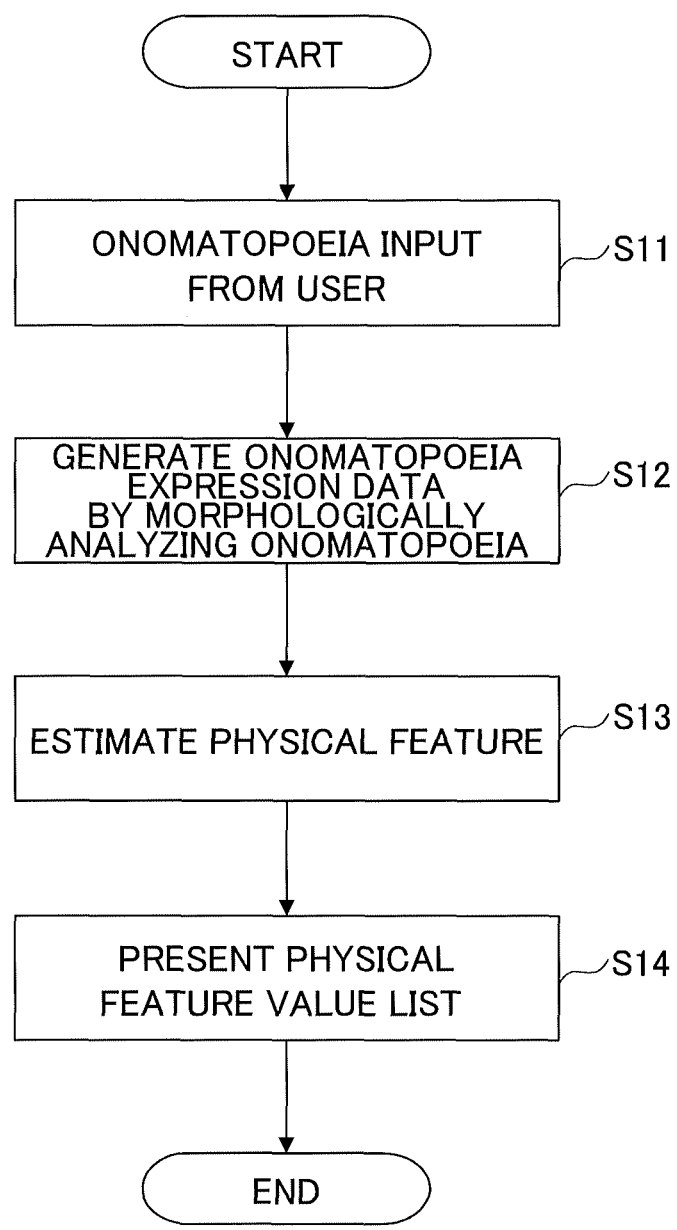
FIG. 10 is a flowchart illustrating a process example according to the first embodiment.

FIG. 10 is a flowchart illustrating a process example according to the first embodiment described above, and illustrates an example of a process of presenting a physical feature value corresponding to any onomatopoeia input from a user U.

In FIG. 10, when any onomatopoeia is input from the user U, the graphical user interface unit 111 of the interface unit 11 transfers the input onomatopoeia to the sound symbolism word analyzing unit 12 (step S11). Note that it is assumed that the onomatopoeia is input by inputting a character string with a keyboard, etc.; however, a voice may be input by using a voice input function and a character string may be acquired from the input voice.

The morpheme analyzing unit 122 of the sound symbolism word analyzing unit 12 morphologically analyzes the onomatopoeia with reference to the morpheme database 14, to generate onomatopoeia expression data (step S12).

That is, the morpheme analyzing unit 122 matches the input character string of the onomatopoeia to the morpheme data in the morpheme database 14 starting from the leading character, to obtain phonemes and morphemes.

Furthermore, with respect to the first mora and the second mora of the onomatopoeia, based on rules as illustrated in FIG. 11, the morpheme analyzing unit 122 analyzes whether the mora corresponds to any of the illustrated categories in "consonant", "dull sound", "contracted sound", "vowel", "small vowel", "special sound" (second mora is "special end of word") (for example, any one of "no", "dull sound", and "semi-dull sound" for "dull sound"), and whether there is repetition, and generates onomatopoeia expression data in the format as illustrated in FIG. 12.

Subsequently, returning to FIG. 10, the physical feature evaluating unit 123 of the sound symbolism word analyzing unit 12 refers to the phonemic physical feature database 15 based on the onomatopoeia expression data generated by the morpheme analyzing unit 122, and performs physical feature estimation (calculation of estimated values with respect to evaluation scales of a plurality of physical features) (step S13).

Figures 13, 14:
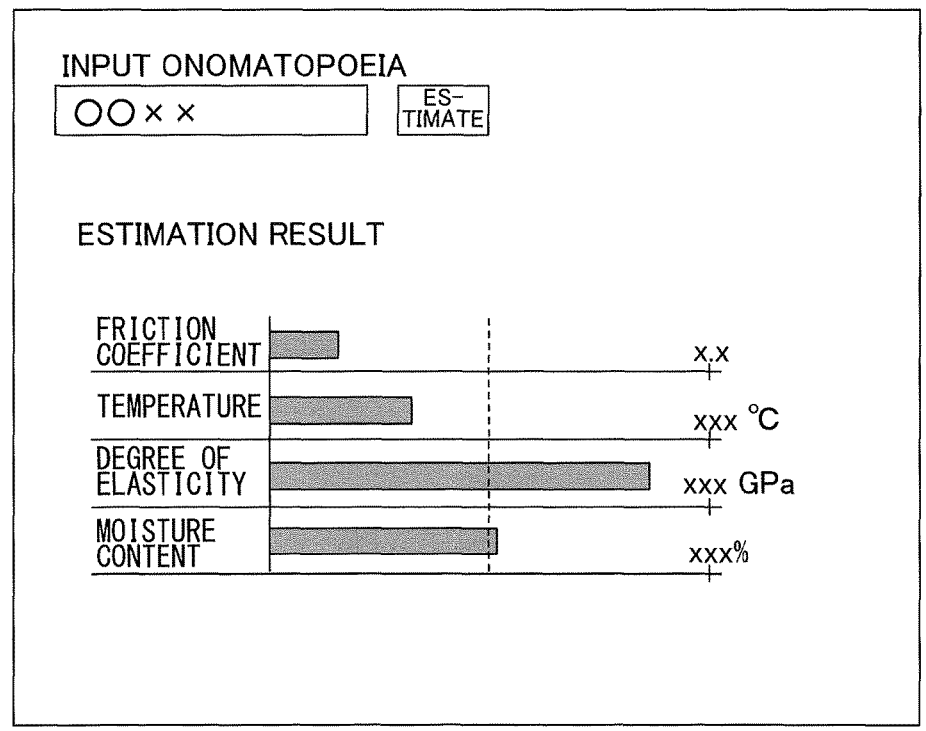
FIG. 13 is a diagram illustrating an example of a calculation formula for quantitative evaluation for each evaluation scale.
FIG. 14 is a diagram illustrating an example of an interface screen.

That is, the physical feature evaluating unit 123 acquires the values of the variables $X_1$ to $X_{13}$ corresponding to the items of the phonemic elements as illustrated in FIG. 4A from the phonemic physical feature data illustrated in FIG. 3A, for each evaluation scale, and calculates the physical feature value Y for each evaluation scale according to the mathematical formula as illustrated in FIG. 13. In the mathematical formula, n is the number of moras and Const is a constant term. For example, with respect to the evaluation scale "friction coefficient", when the consonant of the first mora is of the "ta row" in the Japanese hiragana alphabet, the variable $X_1$ is "0.6". Note that in the mathematical formula, the value is divided by an n number of moras and multiplied by "×2", so that even if onomatopoeia composed of 2 mora or more is input, the value is normalized to be equivalent to 2 mora, and the range of the estimation value to be output is corrected.

Returning to FIG. 10, the graphical user interface unit 111 of the interface unit 11 presents the estimation result obtained by the physical feature evaluating unit 123 of the sound symbolism word analyzing unit 12, to the user U (step S14). FIG. 14 is a diagram illustrating an example of an interface screen, and the estimation result with respect to the input onomatopoeia is displayed. Note that when a product category, etc., is identified before the estimation, only the corresponding table list in the phonemic physical feature database 15 is used for estimation. When the product category, etc., is not identified, estimation results based on all table lists prepared in the phonemic physical feature database 15 can be displayed.

Second Embodiment

A second embodiment corresponds to the reverse lookup of the first embodiment, and the user inputs a physical feature value and the sound symbolism word (onomatopoeia) corresponding to the physical feature value is presented.

Figure 15:
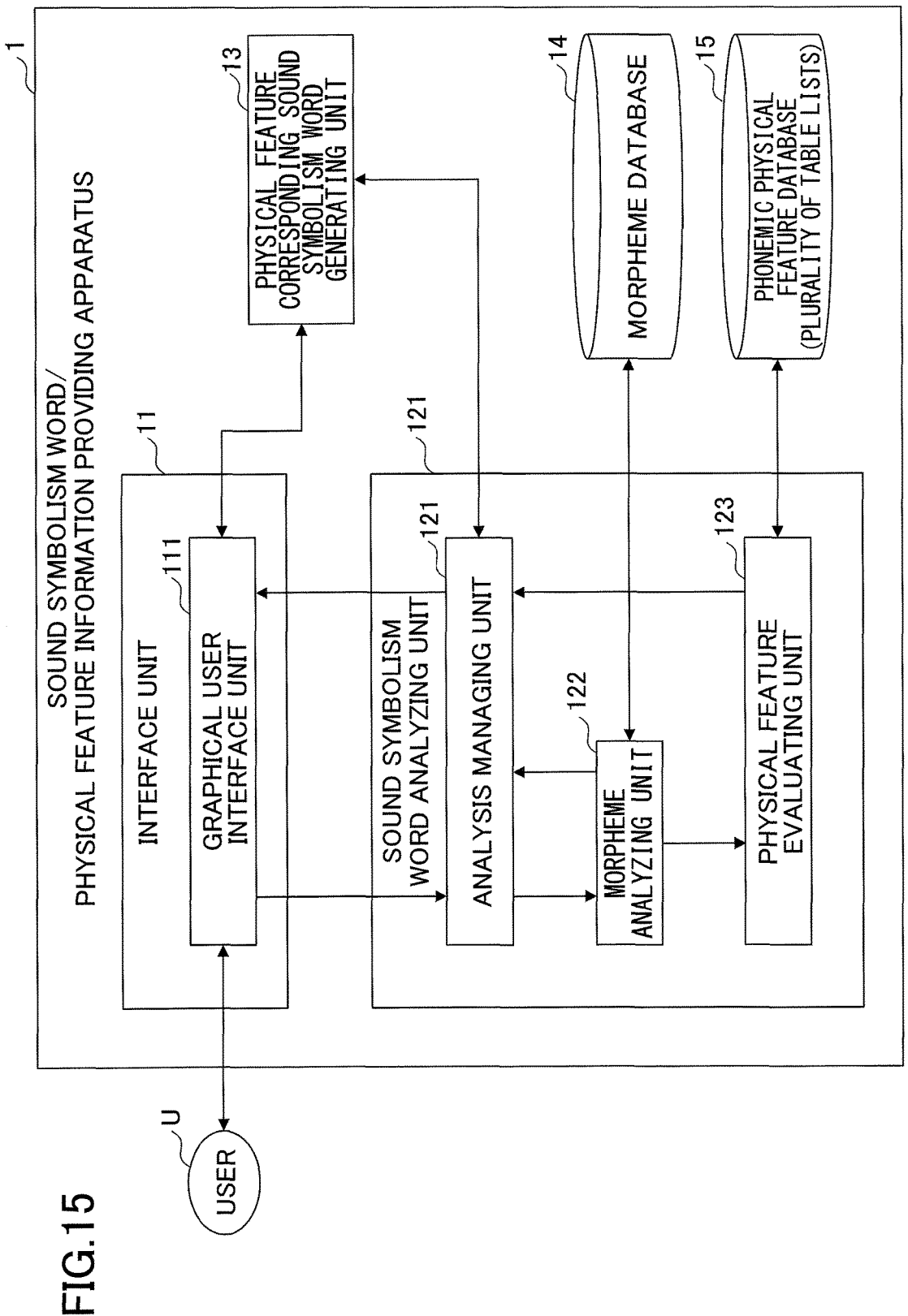
FIG. 15 is a diagram illustrating a configuration example of a sound symbolism word/physical feature information providing apparatus according to a second embodiment.

FIG. 15 is a diagram illustrating a configuration example of the sound symbolism word/physical feature information providing apparatus 1 according to the second embodiment. This configuration is the same as the configuration illustrated in FIG. 1 except that a physical feature corresponding sound symbolism word generating unit 13 is newly provided. When a physical feature value is input from the user U via the interface unit 11, the physical feature corresponding sound symbolism word generating unit 13 has a function of generating a sound symbolism word (onomatopoeia) having a physical feature value equivalent to the input physical feature value, and presenting the generated sound symbolism word to the user U via the interface unit 11.

Figure 16:
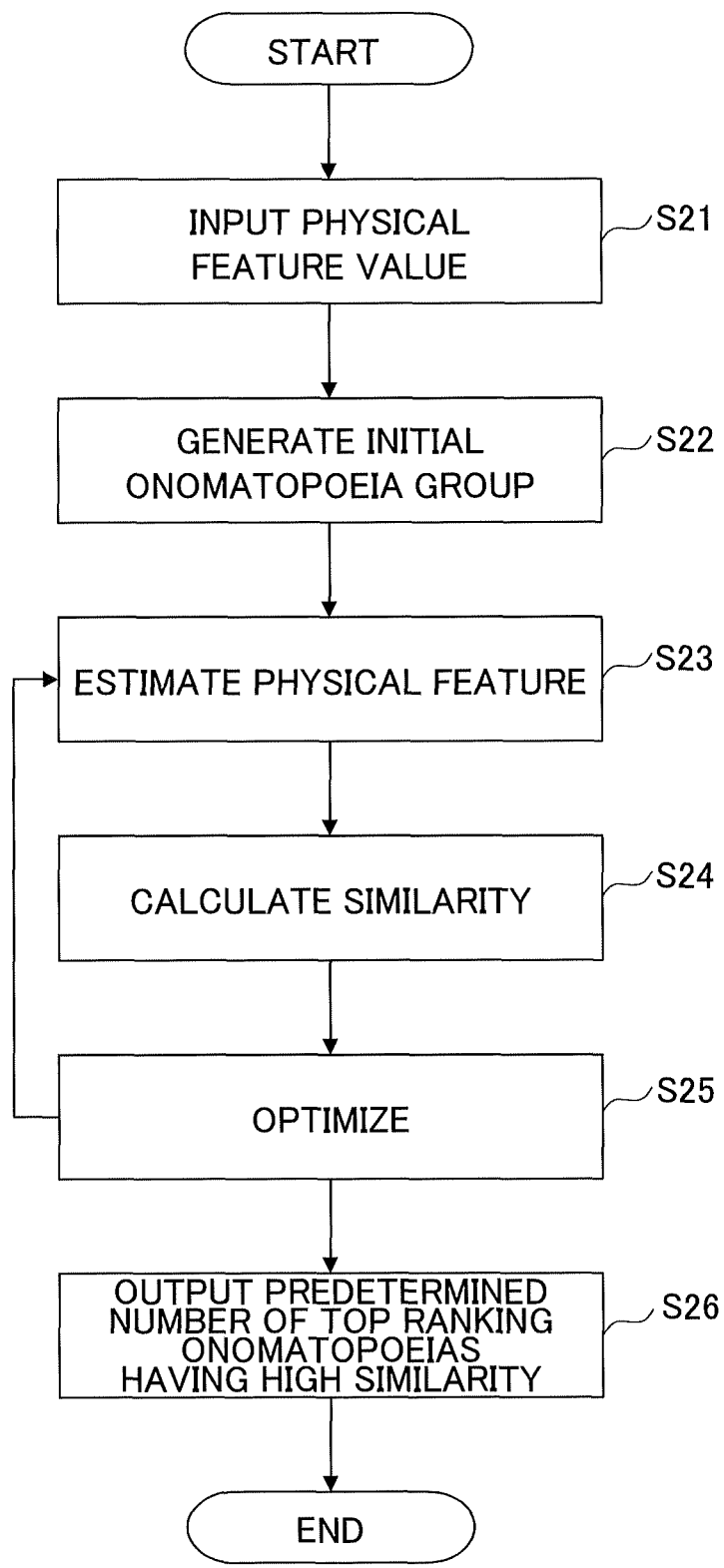
FIG. 16 is a flowchart illustrating a process example according to the second embodiment.

FIG. 16 is a flowchart illustrating a process example according to the second embodiment. In FIG. 16, when any physical feature value is input from the user U, the graphical user interface unit 111 of the interface unit 11 transfers the input physical feature value to the physical feature corresponding sound symbolism word generating unit (step S21). Note that it is assumed that the physical feature value is input by inputting a character string with a keyboard, etc.; however, a voice may be input by using a voice input function and a character string may be acquired from the input voice.

The physical feature corresponding sound symbolism word generating unit 13 generates an initial onomatopoeia group by randomly generating item values of onomatopoeia expression data (FIG. 12) (step S22). The predetermined item values of the onomatopoeia expression data may be fixed values.

Subsequently, the physical feature corresponding sound symbolism word generating unit 13 performs physical feature estimation by the sound symbolism word analyzing unit 12, with respect to each of the pieces of onomatopoeia expression data in the generated initial onomatopoeia group (step S23). The process of estimating the physical feature by the sound symbolism word analyzing unit 12 is the same as in the first embodiment.

Subsequently, the physical feature corresponding sound symbolism word generating unit 13 calculates the similarity between the physical feature value estimated for each piece of onomatopoeia expression data and the physical feature value input from the user U (step S24). The physical feature value is a vector value composed of a plurality of elements, and therefore, for example, the similarity can be calculated by cosine similarity.

Subsequently, the physical feature corresponding sound symbolism word generating unit 13 determines whether there is greater than or equal to a predetermined number of onomatopoeias for which the calculated similarity exceeds a predetermined value, and if not, the physical feature corresponding sound symbolism word generating unit 13 performs optimization (step S25). Optimization, for example, is performed by the processes of crossover, transformation, and selection. One point crossover, which is an example of crossover, is performed by selecting two onomatopoeias based on the probability set such that the higher the degree of similarity, the higher the probability of being selected, switching the front and back positions of the onomatopoeias, with a randomly selected leading position set as the boundary, and combining the onomatopoeias, to generate two new onomatopoeias. Transformation is caused to occur with a predetermined probability (not always occurring), and values at one or more positions randomly determined in the onomatopoeia expression data are randomly changed to generate a new onomatopoeia. Selection is performed by deleting an onomatopoeia with low similarity. Then, the process returns to the physical feature estimation (step S23) again.

Furthermore, when there is greater than or equal to a predetermined number of onomatopoeias for which the calculated similarity exceeds a predetermined value, the physical feature corresponding sound symbolism word generating unit 13 presents, to the user U via the graphical user interface unit 111 of the interface unit 11, a predetermined number of top ranking onomatopoeias having a high similarity, as candidate onomatopoeias (step S26). As the user views the presented onomatopoeias, the user can understand what kind of onomatopoeia corresponds to the physical feature that the user has conceived.

Third Embodiment

In a third embodiment, an impression value (for example, "having a high-grade feeling") is input from a user, and a physical feature value corresponding to the impression value is presented.

Figure 17:
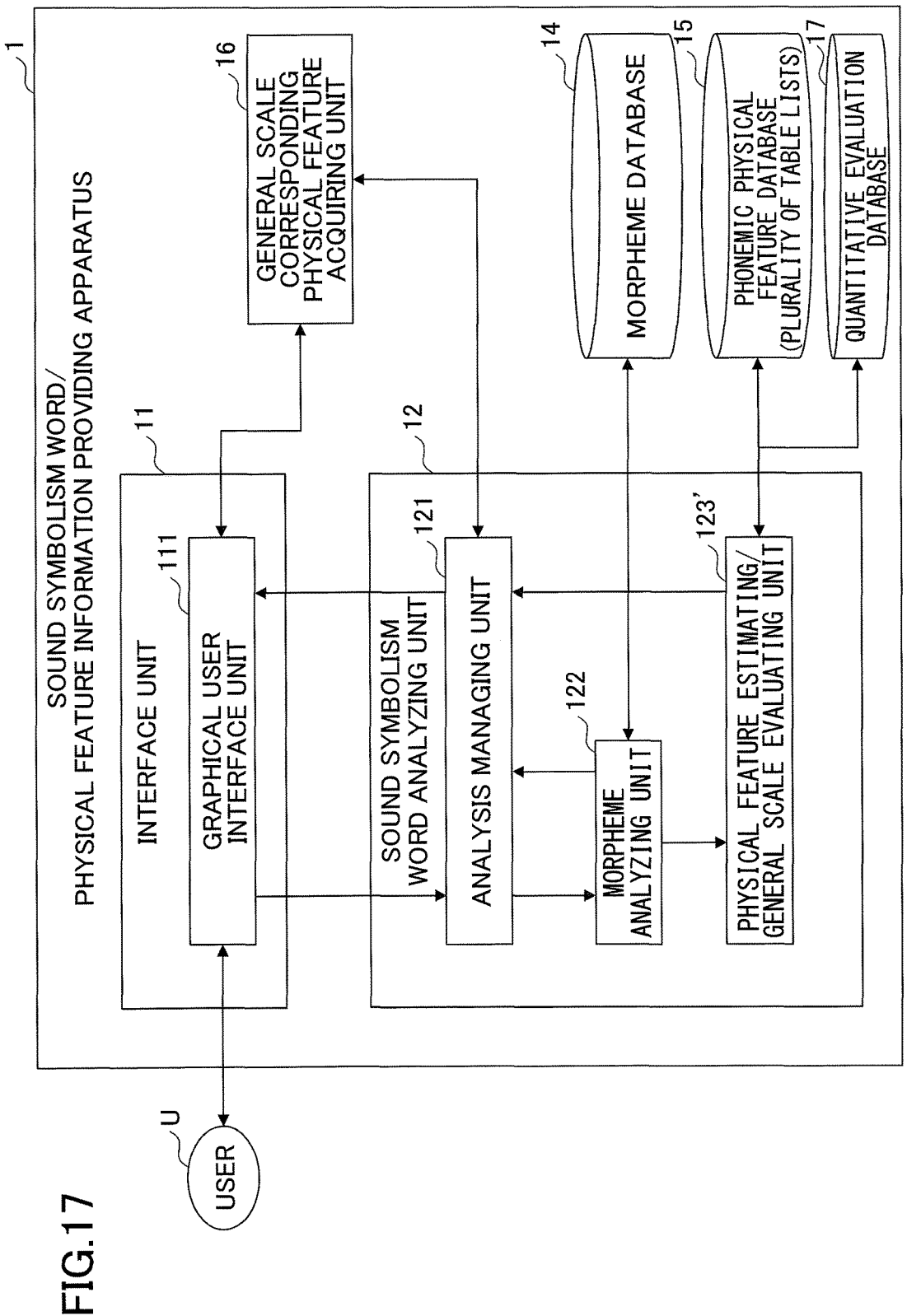
FIG. 17 is a diagram illustrating a configuration example of a sound symbolism word/physical feature information providing apparatus according to a third embodiment.

FIG. 17 is a diagram illustrating a configuration example of the sound symbolism word/physical feature information providing apparatus 1 according to the third embodiment. In this configuration, the physical feature evaluating unit 123 of the sound symbolism word analyzing unit 12 becomes a physical feature estimating/general scale evaluating unit 123', and references is made to a new quantitative evaluation database 17, and a general scale corresponding physical feature acquiring unit 16 is provided; otherwise, the configuration is the same as that in FIG. 1.

In addition to physical feature estimation, the physical feature estimating/general scale evaluating unit 123' has a function of performing quantitative evaluation with respect to a specified sound symbolism word (onomatopoeia) by using a general evaluation scale with reference to the quantitative evaluation database 17. FIG. 18 is a diagram illustrating an example of evaluation scales used for quantitative evaluation, and illustrates 43 adjective pairs used for general impression evaluation. FIG. 19 is a diagram illustrating an example of the data structure of the quantitative evaluation database 17, in which numerical values corresponding to items of onomatopoeia expression data are set for adjective pairs ("strong-weak", etc.) and adjectives ("intense", etc.) that are evaluation scales. Note that part of the data is illustrated, and the evaluation scales and items are not limited to those illustrated in the figure, and numerical values for the second mora also exist. To obtain the quantitative evaluation data, psychological experiments by human beings have been performed with respect to a plurality of onomatopoeias covering conceivable phonemes, and the influences by categories of the respective items have been digitalized by the method of quantification theory class one, etc., based on the responses of feelings with respect to the respective evaluation scales.

Returning to FIG. 17, when an impression value is input from the user U via the interface unit 11, the general scale corresponding physical feature acquiring unit 16 has a function of estimating the physical feature value of the sound symbolism word (onomatopoeia) having the impression value equivalent to the input impression value, and presenting the estimated physical feature value to the user U via the interface unit 11.

Figure 20:
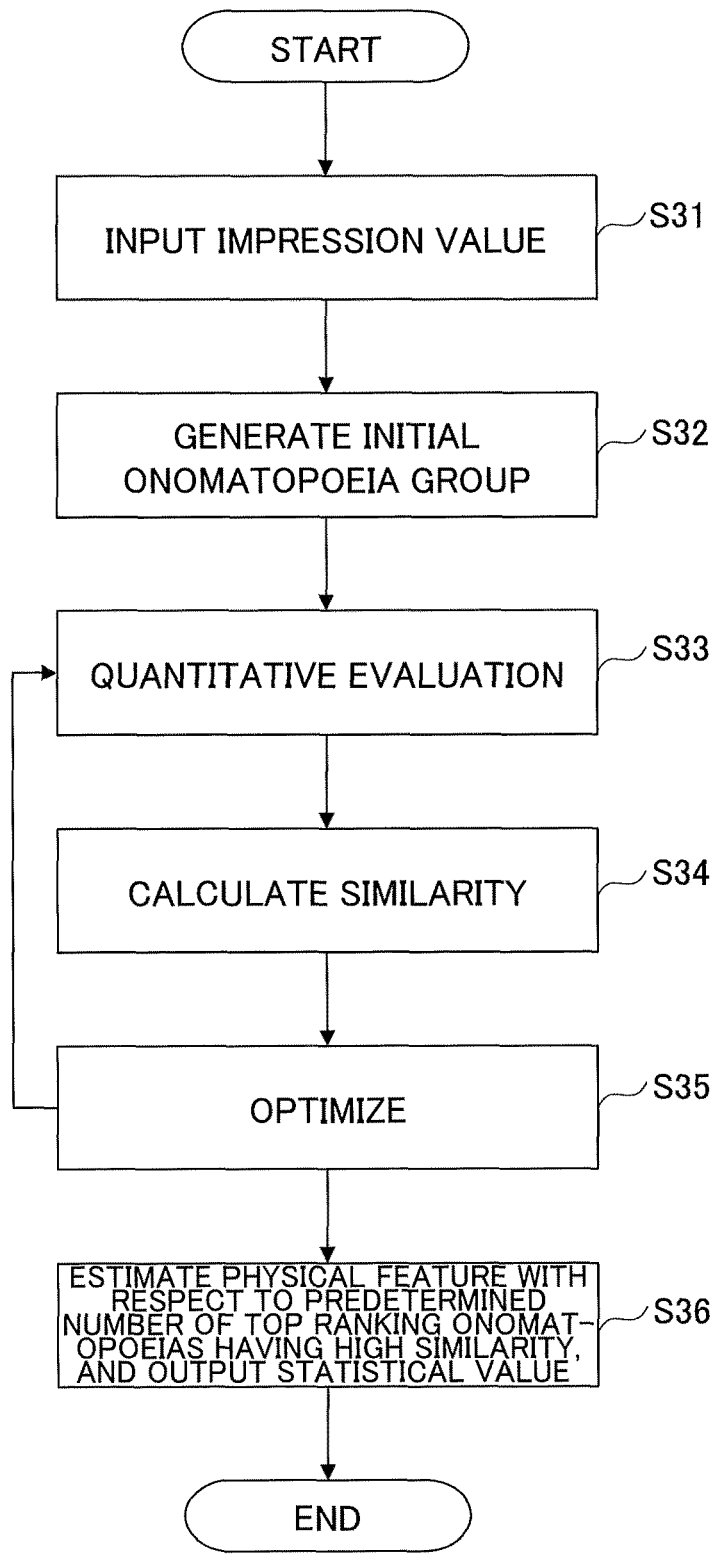
FIG. 20 is a flowchart illustrating a process example according to the third embodiment.

FIG. 20 is a flowchart illustrating a process example according to the third embodiment. In FIG. 20, when any impression value is input from the user U, the graphical user interface unit 111 of the interface unit 11 transfers the input impression value to the general scale corresponding physical feature acquiring unit 16 (step S31). Note that it is assumed that impression value is input by inputting a character string with a keyboard, etc.; however, a voice may be input by using a voice input function and a character string may be acquired from the input voice.

The general scale corresponding physical feature acquiring unit 16 generates an initial onomatopoeia group by randomly generating item values of onomatopoeia expression data (FIG. 12) (step S32). The predetermined item values of the onomatopoeia expression data may be fixed values.

Subsequently, the general scale corresponding physical feature acquiring unit 16 performs quantitative evaluation by the sound symbolism word analyzing unit 12, on each piece of onomatopoeia expression data of the generated initial onomatopoeia group (step S33).

That is, the physical feature estimating/general scale evaluating unit 123' of the sound symbolism word analyzing unit 12 acquires the values of the variables $X_1$ to $X_{13}$ corresponding to the items of phonemic elements as illustrated in FIG. 4A for each evaluation scale from the quantitative evaluation database 17 illustrated in FIG. 19, and calculates an evaluation value Y for each evaluation scale by an mathematic formula as illustrated in FIG. 13. In the mathematical formula, n is the number of moras and Const is a constant term. For example, in the example of FIG. 19, for the evaluation scale "solid-airy", when the consonant of the first mora is of the "ka row" in the Japanese hiragana alphabet, the variable $X_1$ is "0.11".

Subsequently, returning to FIG. 20, the general scale corresponding physical feature acquiring unit 16 calculates the similarity between the evaluation value obtained by evaluating each piece of onomatopoeia expression data and the impression value input from the user U (step S34). The evaluation value and the impression value are vector values composed of a plurality of elements, and therefore, for example, the similarity can be calculated from the cosine similarity.

Subsequently, the general scale corresponding physical feature acquiring unit 16 determines whether there is greater than or equal to a predetermined number of onomatopoeias for which the calculated similarity exceeds a predetermined value, and if not, the general scale corresponding physical feature acquiring unit 16 performs optimization (step S35). The optimization processing is the same as described in the second embodiment. Then, the process returns to the quantitative evaluation (step S33) again.

Subsequently, when there is greater than or equal to a predetermined number of onomatopoeias for which the calculated similarity exceeds a predetermined value, the general scale corresponding physical feature acquiring unit 16 performs physical feature estimation by the sound symbolism word analyzing unit 12 with respect to a predetermined number of top ranking onomatopoeias having a high similarity, and performs a statistical process such as averaging. Then, the general scale corresponding physical feature acquiring unit 16 presents a physical feature value to the user U via the graphical user interface unit 111 of the interface unit 11 (step S36). The physical feature estimation for each onomatopoeia is similar to the process described in the first embodiment (FIG. 10).

As the user views the presented physical feature value, the user can understand what kind of physical feature value corresponds to the impression value that the user has conceived.

Fourth Embodiment

A fourth embodiment corresponds to the reverse lookup of the third embodiment, in which a physical feature value is input from the user and an impression value corresponding to the physical feature value is presented.

Figure 21:
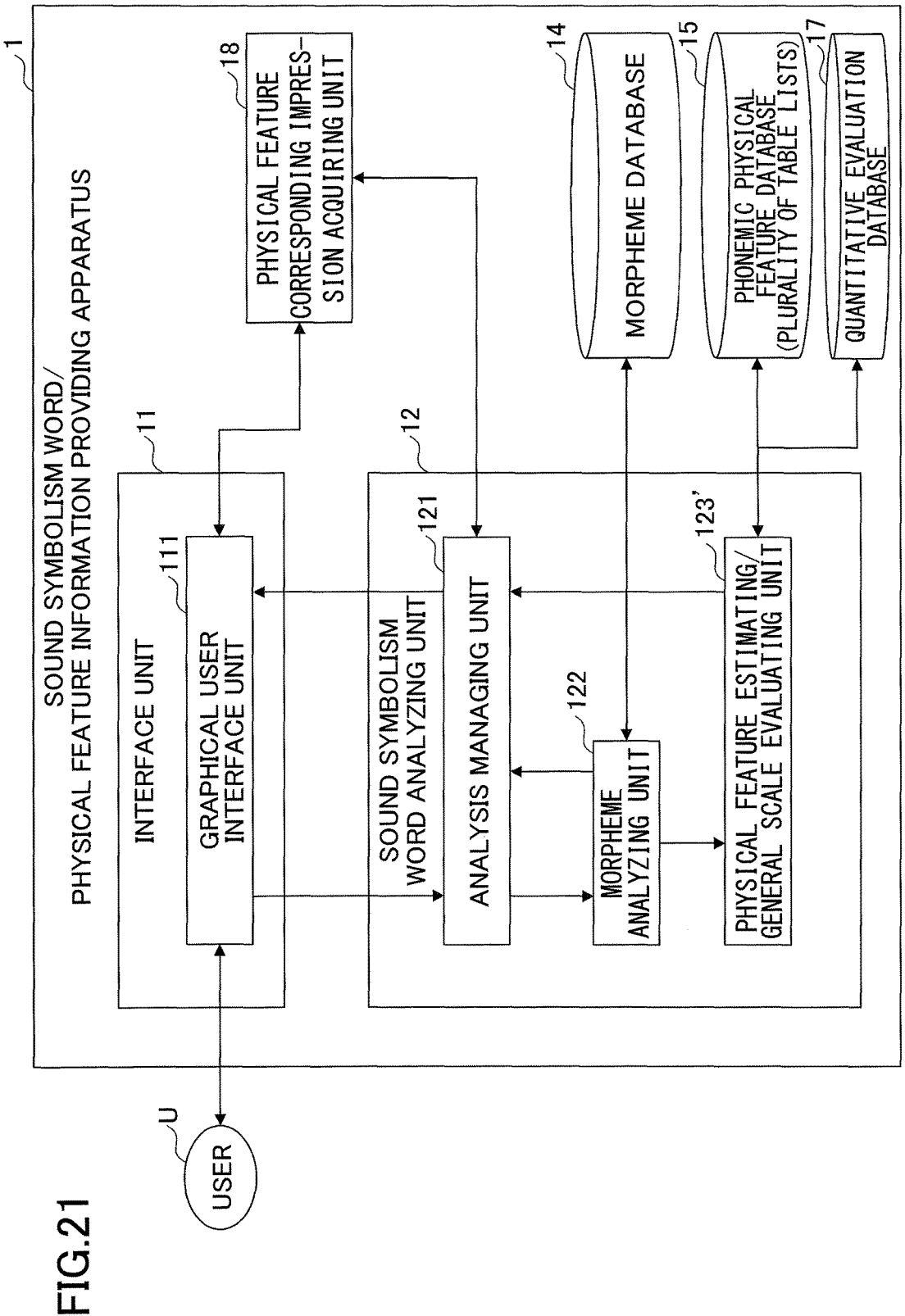
FIG. 21 is a diagram illustrating a configuration example of a sound symbolism word/physical feature information providing apparatus according to a fourth embodiment.

FIG. 21 is a diagram illustrating a configuration example of the sound symbolism word/physical feature information providing apparatus 1 according to the fourth embodiment. The configuration is the same as that of the third embodiment except that a physical feature corresponding impression acquiring unit 18 is provided instead of the general scale corresponding physical feature acquiring unit 16. Upon receiving a physical feature value input from the user U via the interface unit 11, the physical feature corresponding impression acquiring unit 18 has a function of evaluating the impression value of the sound symbolism word (onomatopoeia) having a physical feature value equivalent to the input physical feature value, and presenting the evaluation to the user U via the interface unit 11.

Figure 22:
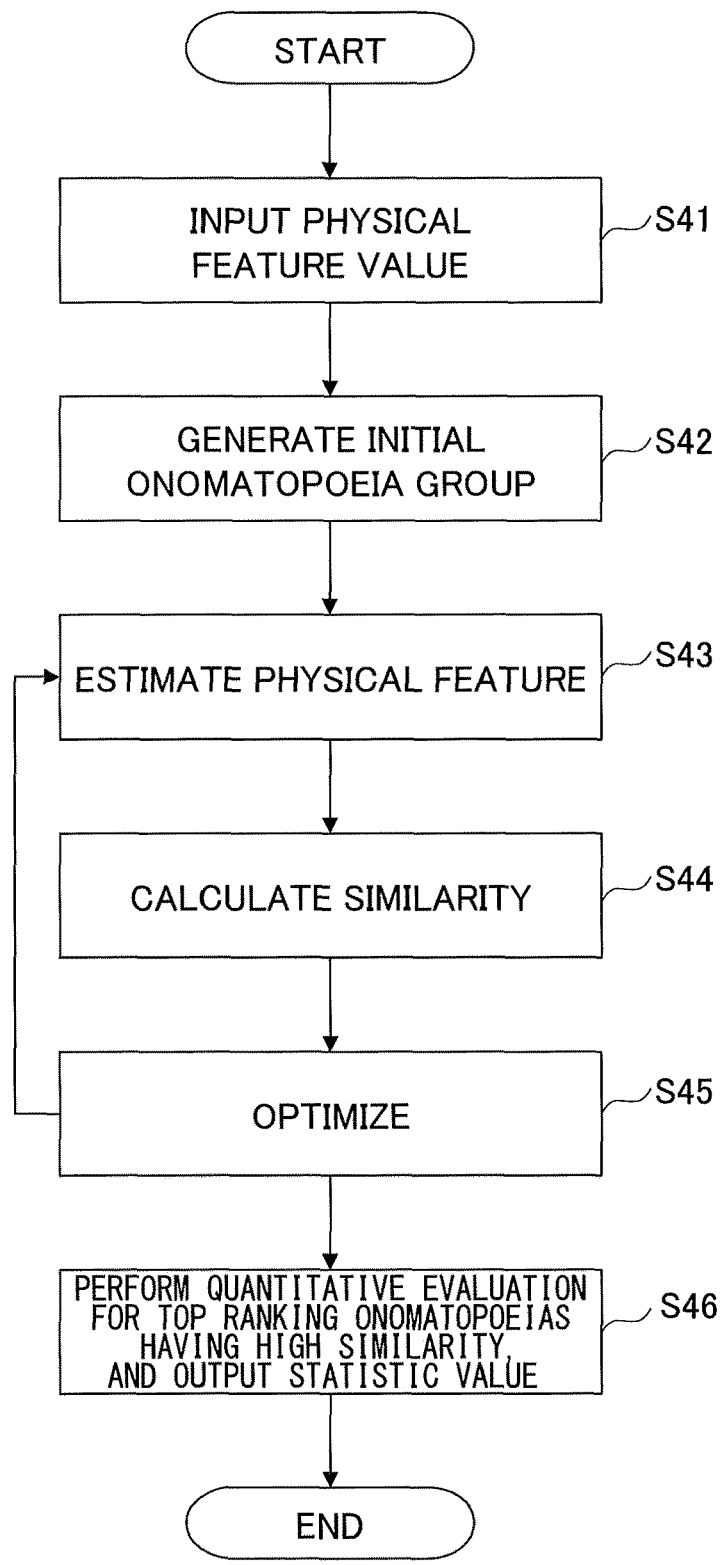
FIG. 22 is a flowchart illustrating a process example according to the fourth embodiment.

FIG. 22 is a flowchart illustrating a process example according to the fourth embodiment. In FIG. 22, when any physical feature value is input from the user U, the graphical user interface unit 111 of the interface unit 11 transfers the input physical feature value to the physical feature corresponding impression acquiring unit 18 (step S41). Note that it is assumed that the physical feature value is input by inputting a character string with a keyboard, etc.; however, a voice may be input by using a voice input function and a character string may be acquired from the input voice.

The physical feature corresponding impression acquiring unit 18 generates an initial onomatopoeia group by randomly generating item values of onomatopoeia expression data (FIG. 12) (step S42). The predetermined item values of the onomatopoeia expression data may be fixed values.

Subsequently, the physical feature corresponding impression acquiring unit 18 performs physical feature estimation by the sound symbolism word analyzing unit 12, with respect to each of the pieces of onomatopoeia expression data in the generated initial onomatopoeia group (step S43). The process of estimating the physical feature by the sound symbolism word analyzing unit 12 is the same as in the first embodiment.

Subsequently, the physical feature corresponding impression acquiring unit 18 calculates the similarity between the physical feature value estimated for each piece of onomatopoeia expression data and the physical feature value input from the user U (step S44). The physical feature value is a vector value composed of a plurality of elements, and therefore, for example, the similarity can be calculated by cosine similarity.

Subsequently, the physical feature corresponding impression acquiring unit 18 determines whether there is greater than or equal to a predetermined number of onomatopoeias for which the calculated similarity exceeds a predetermined value, and if not, the physical feature corresponding impression acquiring unit 18 performs optimization (step S45). The optimization process is the same as described above. Then, the process returns to the physical feature estimation (step S43) again.

Furthermore, when there is greater than or equal to a predetermined number of onomatopoeias for which the calculated similarity exceeds a predetermined value, the physical feature corresponding impression acquiring unit 18 performs quantitative evaluation by the sound symbolism word analyzing unit 12 with respect to a predetermined number of top ranking onomatopoeias having a high similarity, and performs a statistical process such as averaging. Then, the physical feature corresponding impression acquiring unit 18 presents an impression value according to the quantitative evaluation to the user U via the graphical user interface unit 111 of the interface unit 11 (step S46). As the user views the presented impression value, the user can understand what kind of impression value corresponds to the physical feature value that the user has conceived.

Fifth Embodiment

As examples of physical features, "friction coefficient", "temperature", "degree of elasticity", "moisture content", etc. (FIG. 3A), and "(amount of) strong flour", "(amount of) soft flour", "(amount of) sugar", "(amount of) butter", etc. (FIG. 3B), have been given; however, image features may be used as physical features. That is, a person can recognize physical features such as whether the substance is smooth or glossy from an image of the substance, and therefore it can be said that an image feature is one type of a physical feature.

[Image Feature Amount Extraction]

FIG. 23 is a diagram illustrating a process example of image feature amount extraction. FIG. 23 illustrates an example of extracting image feature amount data, for example, by GLCM (Gray-Level Co-occurrence Matrix), from image data. The following are examples of data included in the image feature amount data of GLCM, and these features are indicated by a multidimensional vector quantity.

Angular Second Moment (uniformity)
Auto Correlation
Cluster Prominence (strength of change in light and shade, strength of edge)
Cluster Shade (edge strength)
Contrast (contrast)
Correlation (complexity and periodicity)
Dissimilarity
Entropy (messiness)
Homogeneity (non-uniformity, local uniformity)
Inverse Difference Moment (local uniformity)

Note that in the later analysis, it is possible to use only the effective data for determining the texture, etc., and it is not necessary to extract data that is not used.

Figures 24A, 24B:
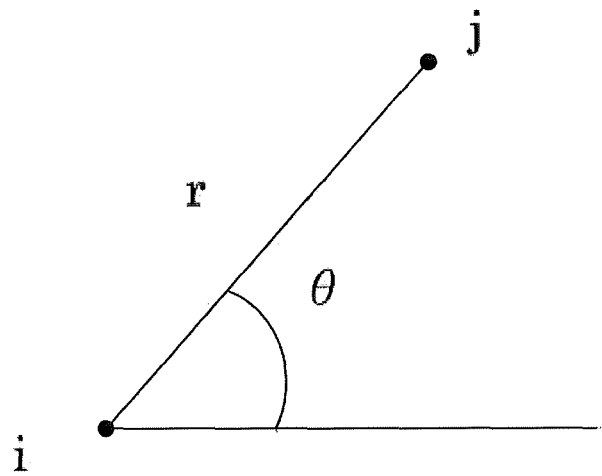
FIG. 24A is a diagram (part 1) illustrating the relationship and definition between two pixels of GLCM.
FIG. 24B is a diagram (part 2) illustrating a relationship and definition between two pixels of GLOM.

As illustrated in FIG. 24A, GLCM is a method of obtaining a co-occurrence matrix in which the element is the probability p (i, j), (i, j=0, 1, 2, ..., n−1; n is a natural number greater than or equal to 1) that j is the density of a point (pixel) separated by a certain displacement δ=(r, θ) from a point (pixel) having a density i in an image, calculating feature amounts from the obtained co-occurrence matrix, and characterizing the texture by calculated values.

The angle θ is generally set to 45° and the distance r is set to an appropriate value. In this case, by defining $\mu_x$, $\mu_y$, $\sigma_x$, $\sigma_y$ as illustrated in FIG. 24B, each feature amount of GLCM is calculated by the formulas illustrated in FIG. 25. Note that $N_g$ is a pixel value.

Note that extraction of image feature amount data by GLCM has been described; however, it is possible to use any method by which a feature amount relating to texture, etc., can be extracted from an image. For example, SIFT (Scale Invariant Feature Transform) or HOG (Histograms of Oriented Gradients) can also be used.

[Process of Using Image Features]

By holding the relationship between the image feature and the phonemic feature according to association by multiple regression analysis in the phonemic physical feature database 15, it is possible to perform the same process as described above with the mechanisms of FIGS. 1, 15 and 21.

Sixth Embodiment

In the embodiments described so far, physical features (including image features) are directly associated with phonemic features; however, physical features (including image features) may be directly associated with adjective pair evaluation values, which are general impression evaluation values. In the following, an example will be described in which the present embodiment is applied to image features as physical features; however, the present embodiment is also applicable to other physical features.

[Coefficient Generation]

Coefficient generation is a process for generating, in advance, coefficient data indicating a numerical relationship between any image feature amount and any adjective pair evaluation value.

Figure 26:
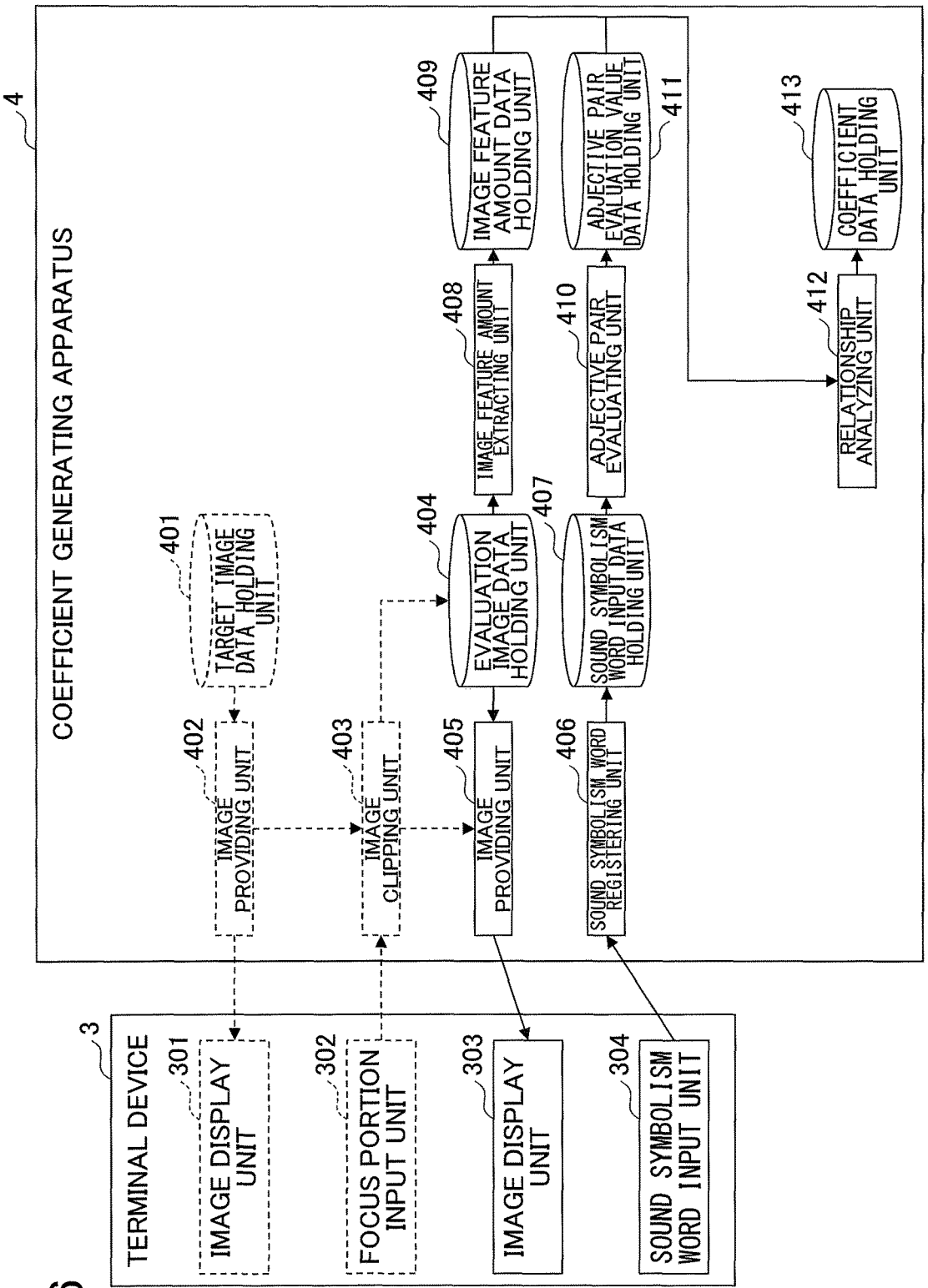
FIG. 26 is a diagram illustrating a configuration example of a coefficient generation system.

FIG. 26 is a diagram illustrating a configuration example of a coefficient generation system. In FIG. 26, a terminal device 3 and a coefficient generating apparatus 4 can communicate with each other via a network such as the Internet or a LAN (Local Area Network). In the present embodiment, in order to perform the processing at a high speed, the terminal device 3 is constituted by a tablet, etc., for inputting data, and the coefficient generating apparatus 4, which requires processing load, is constituted by a server, etc. Furthermore, by adopting a system configuration of a client and a server, there is an advantageous effect that the coefficient can be generated by recruiting a user from among people using the terminal device 3 having a low processing capability such as a mobile terminal. Furthermore, in the present embodiment, an example is indicated in which the terminal device 3 and the coefficient generating apparatus 4 are connected by a network; however, it is also possible to constitute the function of the terminal device 3 and the function of the coefficient generating apparatus 4 by a single computer. Note that the coefficient generation is performed by the operator side of the coefficient generating apparatus 4, and therefore the user of the terminal device 3 is mainly a person on the operator side or a person who cooperates with the operator side.

The terminal device 3 includes an image display unit 301, a focus portion input unit 302, an image display unit 303, and a sound symbolism word input unit 304. The coefficient generating apparatus 4 includes a target image data holding unit 401, an image providing unit 402, an image clipping unit 403, an evaluation image data holding unit 404, an image providing unit 405, a sound symbolism word registering unit 406, a sound symbolism word input data holding unit 407, an image feature amount extracting unit 408, an image feature amount data holding unit 409, an adjective pair evaluating unit 410, an adjective pair evaluation value data holding unit 411, a relationship analyzing unit 412, and a coefficient data holding unit 413.

The image display unit 301 of the terminal device 3 has a function of displaying the target image prepared on the side of the coefficient generating apparatus 4 (an image that may include other images such as a background image in addition to the evaluation image used for evaluation of the texture etc.) to the user. The focus portion input unit 302 has a function of accepting input of a specification of a focus portion considered as important by the user in determining the texture, etc., in the displayed target image, and transmitting data indicating the focus portion to the coefficient generating apparatus 4. Note that in the case where an image of a portion considered to be important in determining the texture, etc., can be prepared as an evaluation image in advance, the image display unit 301 and the focus portion input unit 302 are unnecessary. The image display unit 303 has a function of displaying the evaluation image to the user. The sound symbolism word input unit 304 has a function of accepting input of a sound-symbolism word recalled by the user with respect to a displayed evaluation image and transmitting data of the sound symbolism word to the coefficient generating apparatus 4.

The target image data holding unit 401 of the coefficient generating apparatus 4 holds various kinds of target image data used for subject experiments for generating coefficients. As the target image data, images covering various textures, etc., are prepared. Note that the target image data may include an image such as a background image in addition to the evaluation image for evaluating the texture, etc. The image providing unit 402 has a function of providing target image data held in the target image data holding unit 401 to the image display unit 301 of the terminal device 3. The image clipping unit 403 has a function of performing a process of clipping evaluation image data from the target image data based on the data of the focus portion input from the focus portion input unit 302 of the terminal device 3, applying an image ID to the evaluation image data, and registering the evaluation image data in the evaluation image data holding unit 404.

Note that the function of the image clipping unit 403 may be provided on the terminal device 3 side and the terminal device 3 side may perform the process of clipping evaluation image data from the target image data based on the focus portion. Furthermore, in a case where an image of a portion considered to be important in determining the texture, etc., can be prepared as an evaluation image in advance, the target image data holding unit 401, the image providing unit 402, and the image clipping unit 403 are unnecessary.

The image providing unit 405 has a function of providing the evaluation image data held in the evaluation image data holding unit 404 to the image display unit 303 of the terminal device 3. The sound symbolism word registering unit 406 has a function of registering the sound symbolism word data input from the sound symbolism word input unit 304 of the terminal device 3, in the sound symbolism word input data holding unit 407 in association with an image ID. The image feature amount extracting unit 408 has a function of extracting the image feature amount for each piece of evaluation image data registered in the evaluation image data holding unit 404 at a predetermined timing (for example, at the time when a subject experiment is completed), and registering the image feature amount data in the image feature amount data holding unit 409 in association with an image ID.

The adjective pair evaluating unit 410 has a function of performing an adjective pair evaluation for each piece of sound symbolism word data registered in the sound symbolism word input data holding unit 407 at a predetermined timing, and registering the adjective pair evaluation value data in the adjective pair evaluation value data holding unit 411 in association with an image ID. The relationship analyzing unit 412 has a function of generating coefficient data indicating a numerical relationship between any image feature amount and any adjective pair evaluation value at a predetermined timing, based on a plurality of pieces of image feature amount data registered in the image feature amount data holding unit 409 and a plurality of pieces of adjective pair evaluation value data registered in the adjective pair evaluation value data holding unit 411, and registering the coefficient data in the coefficient data holding unit 413.

The hardware configuration of the terminal device 3 and the coefficient generating apparatus 4 have elements of a general information processing apparatus in the same manner as illustrated in FIG. 9. The image display unit 301, the focus portion input unit 302, the image display unit 303, and the sound symbolism word input unit 304 of the terminal device 3 illustrated in FIG. 26 are implemented by executing computer programs in the CPU 1002 in FIG. 9. Similarly, the image providing unit 402, the image clipping unit 403, the image providing unit 405, the sound symbolism word registering unit 406, the image feature amount extracting unit 408, the adjective pair evaluating unit 410, and the relationship analyzing unit 412 of the coefficient generating apparatus 4 illustrated in FIG. 26 are implemented by executing computer programs in the CPU 1002 in FIG. 9. The target image data holding unit 401, the evaluation image data holding unit 404, the sound symbolism word input data holding unit 407, the image feature amount data holding unit 409, the adjective pair evaluation value data holding unit 411, and the coefficient data holding unit 413 of the coefficient generating apparatus 4 illustrated in FIG. 26 are implemented by the HDD/flash memory 1008, etc., in FIG. 9.

Figure 27:
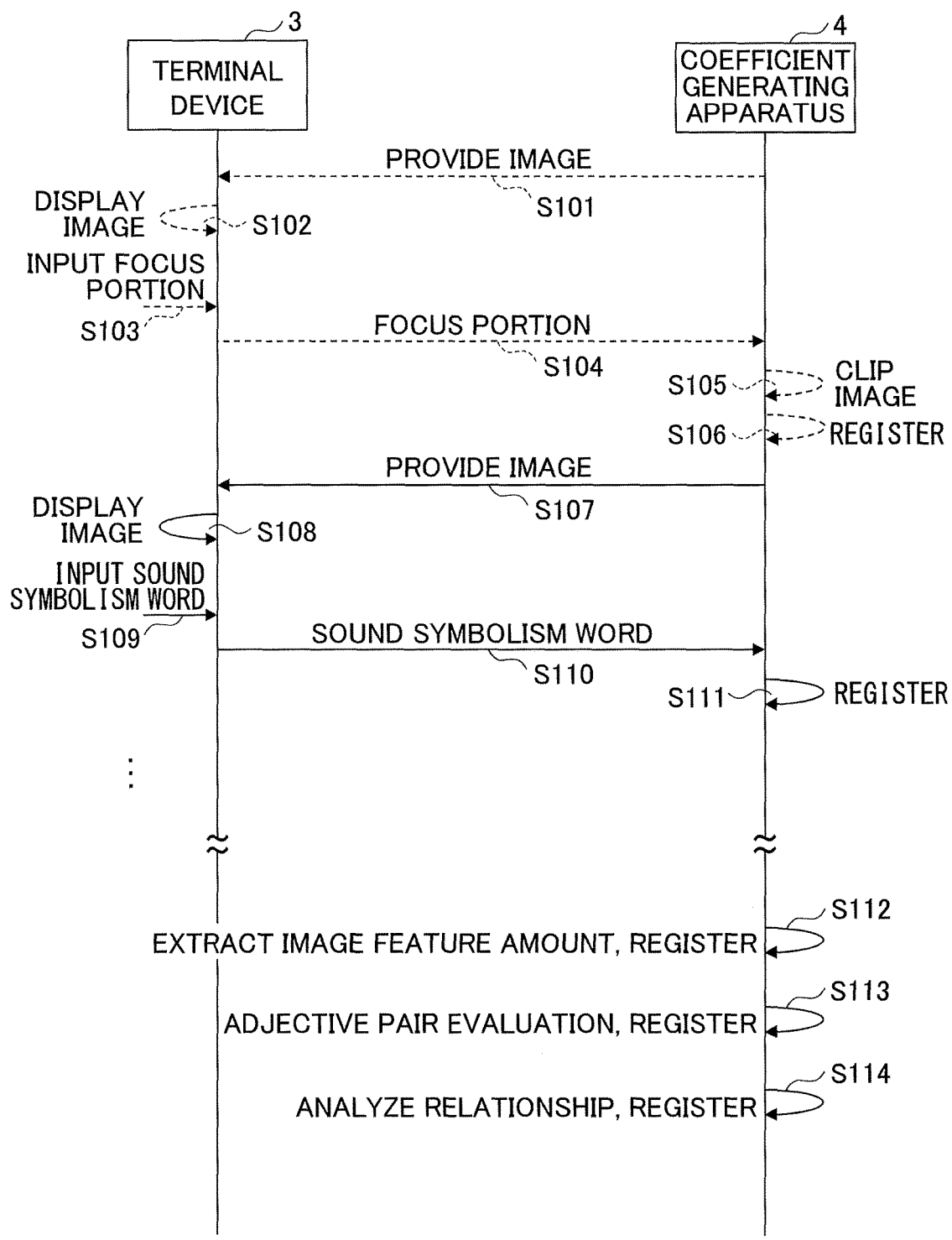
FIG. 27 is a sequence diagram illustrating a process example of coefficient generation.

FIG. 27 is a sequence diagram illustrating a process example of coefficient generation. In FIG. 27, the image providing unit 402 of the coefficient generating apparatus 4 provides target image data held in the target image data holding unit 401, to the image display unit 301 of the terminal device 3 (step S101). Upon acquiring the target image data from the image providing unit 402 of the coefficient generating apparatus 4, the image display unit 301 of the terminal device 3 displays the target image to the user (step S102).

The focus portion input unit 302 of the terminal device 3 accepts input of a focus portion that the user considers important in determining the texture, etc., in the displayed target image (step S103), and transmits the data specifying the accepted focus portion to the coefficient generating apparatus 4 (step S104). Upon receiving the data specifying the focus portion from the focus portion input unit 302 of the terminal device 3, the image clipping unit 403 of the coefficient generating apparatus 4 performs a process of clipping evaluation image data from the target image data (step S105), assigns an image ID to the clipped evaluation image data, and registers the evaluation image data in the evaluation image data holding unit 404 (step S106).

Note that the processing so far is unnecessary in the case where an image of a portion considered to be important in determining the texture, etc., can be prepared in advance as an evaluation image and held in the evaluation image data holding unit 404.

Subsequently, the image providing unit 405 of the coefficient generating apparatus 4 provides the evaluation image data held in the evaluation image data holding unit 404, to the image display unit 303 of the terminal device 3 (step S107). Upon acquiring the evaluation image data from the image providing unit 405 of the coefficient generating apparatus 4, the image display unit 303 of the terminal device 3 displays the evaluation image to the user (step S108).

The sound symbolism word input unit 304 of the terminal device 3 accepts the input of a sound symbolism word recalled by the user with respect to the displayed evaluation image (step S109), and transmits data of the input sound symbolism word to the coefficient generating apparatus 4 (step S110). Upon receiving the data of the sound symbolism word from the sound symbolism word input unit 304 of the terminal device 3; the sound symbolism word registering unit 406 of the coefficient generating apparatus 4 associates the sound symbolism word data with an image ID and registers the sound symbolism word data in the sound symbolism word input data holding unit 407 (step S111).

For each user, the above process is repeated for a plurality of images within a range that does not cause an excessive load. Note that the above describes that in the case of using a target image, the focus portion is input, the evaluation image is clipped, and a sound symbolism word with respect to the evaluation image is input; however, in order to eliminate the influence of images other than that of the focus portion, applied on the user's image formation, the process of inputting a focus portion and the process of inputting a sound symbolism word with respect to the evaluation image that has undergone the clipping process may be separated, and these processes may be performed by different users or at different timings.

Thereafter, at a predetermined timing (for example, at the point in time when the subject experiment is completed, etc.), the image feature amount extracting unit 408 of the coefficient generating apparatus 4 extracts the image feature amount from each piece of the evaluation image data registered in the evaluation image data holding unit 404, and registers image feature amount data in the image feature amount data holding unit 409 in association with an image ID (step S112). Details of the processing will be described later.

Subsequently, the adjective pair evaluating unit 410 performs an adjective pair evaluation for each piece of the sound symbolism word data registered in the sound symbolism word input data holding unit 407, associates the adjective pair evaluation value data with an image ID, and registers the adjective pair evaluation value data in the adjective pair evaluation value data holding unit 411 (step S113). Details of this process will be described later.

Subsequently, the relationship analyzing unit 412 generates coefficient data indicating a numerical relationship between any image feature amount and any adjective pair evaluation value, from the image feature amount data registered in the image feature amount data holding unit 409 and the adjective pair evaluation value data registered in the adjective pair evaluation value data holding unit 411, and registers the coefficient data in the coefficient data holding unit 413 (step S114). Details of this process will be described later.

[Adjective Pair Evaluation]

Figure 28:
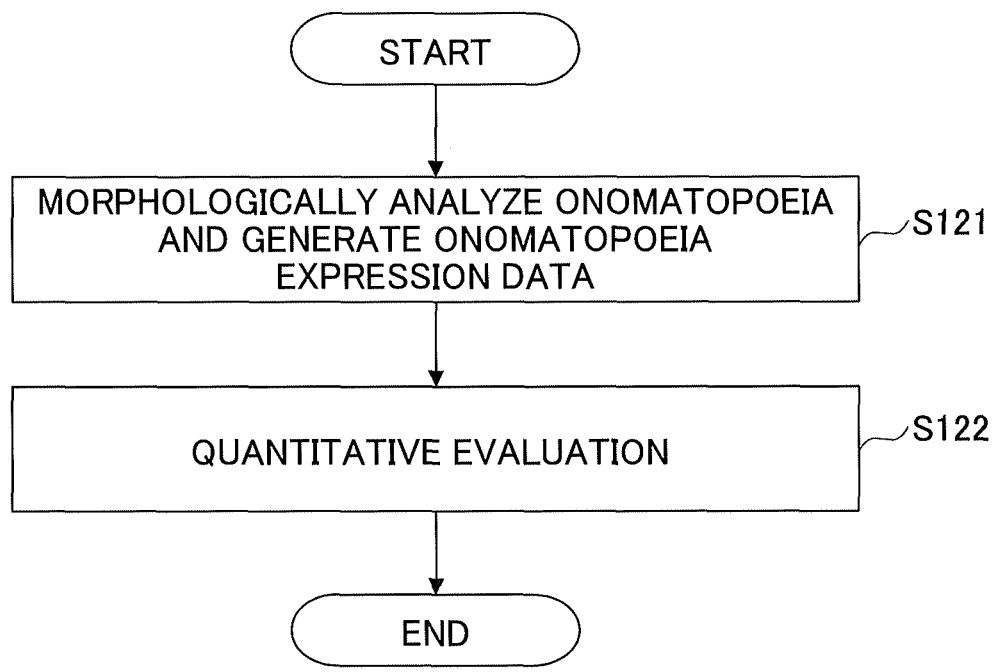
FIG. 28 is a flowchart illustrating a process example of adjective pair evaluation.

FIG. 28 is a flowchart illustrating an example of adjective pair evaluation by the adjective pair evaluating unit 410 of the coefficient generating apparatus 4. Note that, here, the sound symbolism word is described as the onomatopoeia.

In FIG. 28, the adjective pair evaluating unit 410 refers to the morpheme database to morphologically analyze each of onomatopoeias acquired from the sound symbolism word input data holding unit 407, and generates onomatopoeia expression data (step S121). The morpheme database used for the morphological analysis is the same as that illustrated in FIG. 2. The adjective pair evaluating unit 410 matches the character string of each onomatopoeia to the morpheme data in the morpheme database 14 starting from the leading character, to obtain phonemes and morphemes.

Furthermore, the adjective pair evaluating unit 410 follows the analysis items similar to those illustrated in FIG. 11, and analyzes whether the first mora and the second mora in the onomatopoeia correspond to any of the illustrated categories in "consonant", "dull sound", "contracted sound", "vowel", "small vowel", "special sound" ("special end of word" for second mora) (for example, any one of "no", "dull sound", and "semi-dull sound" for "dull sound"), and whether there is repetition, and generates onomatopoeia expression data in the format as illustrated in FIG. 12.

Subsequently, returning to FIG. 28, the adjective pair evaluating unit 410 performs quantitative evaluation (calculation of adjective pair evaluation values for a plurality of adjective pair evaluation scales) with reference to the quantitative evaluation database, based on each piece of the generated onomatopoeia expression data (step S122). The quantitative evaluation database is the same as that illustrated in FIG. 19.

Then, the adjective pair evaluating unit 410 acquires the values of the variables $X_1$ to $X_{13}$ corresponding to the items of phonemic elements as illustrated in FIG. 4A from the quantitative evaluation data as illustrated in FIG. 19 for each evaluation scale, and calculates an evaluation value Y for each evaluation scale by the mathematical formula as illustrated in FIG. 13. In the mathematical formula, n is the number of moras and Const is a constant term. For example, with respect to the evaluation scale "warm-cold", when the consonant of the first mora is of the "ka row" in the Japanese hiragana alphabet, the variable $X_1$ is "0.16". Note that in the mathematical formula, the value is divided by an n number of moras and multiplied by "×2", so that even if onomatopoeia composed of 2 mora or more is input, the value is normalized to be equivalent to 2 mora, and the range of the evaluation value to be output is corrected. The evaluation values are associated with 43 adjective pairs (evaluation scales) as illustrated in FIG. 18.

[Relationship Analysis]

Figure 29:
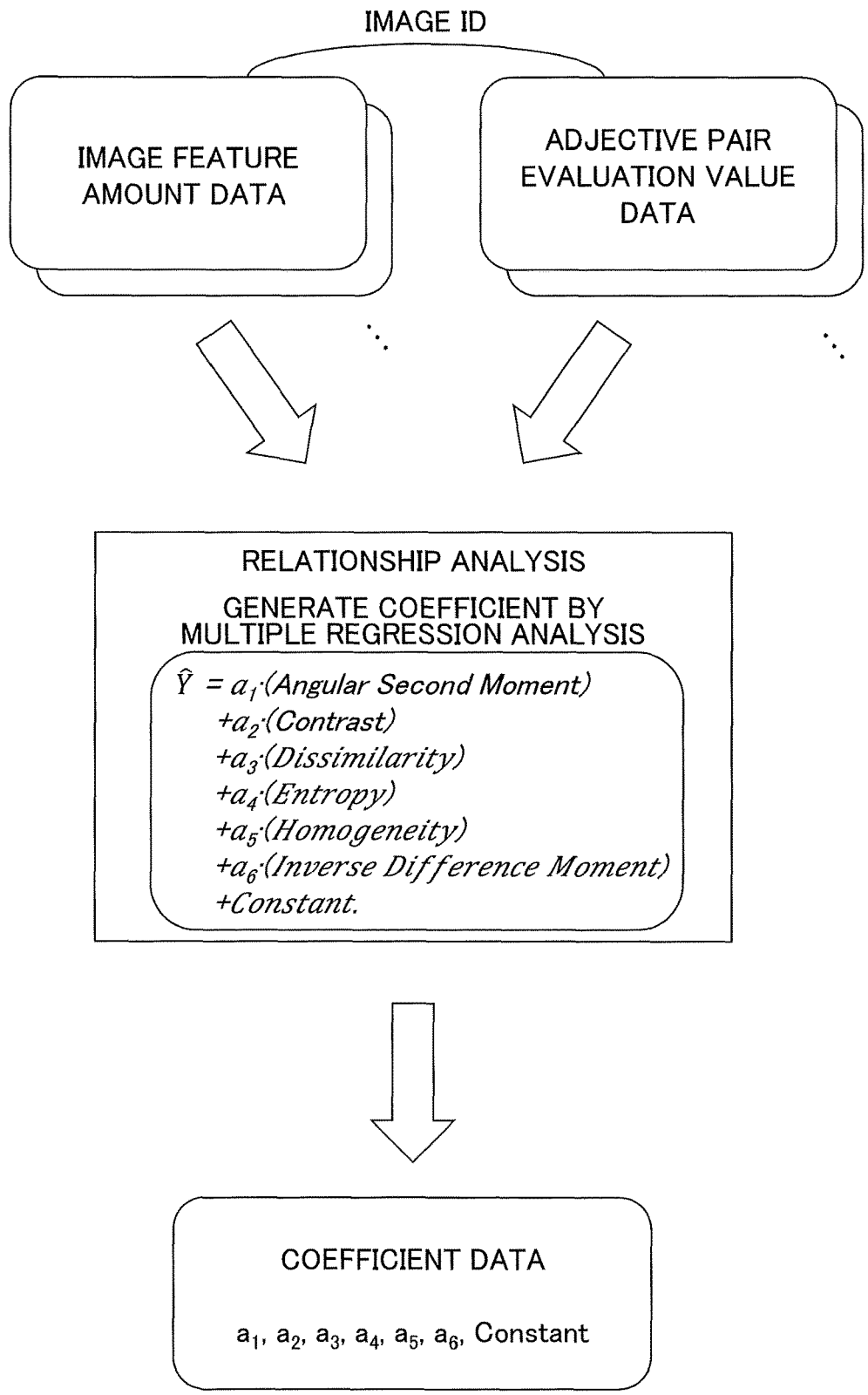
FIG. 29 is a diagram illustrating process example of a relationship analysis.

FIG. 29 is a diagram illustrating a process example of relationship analysis by the relationship analyzing unit 412 of the coefficient generating apparatus 4. In FIG. 29, the relationship analyzing unit 412 generates coefficient data indicating the numerical relationship between any image feature amount and any adjective pair evaluation value by performing multiple regression analysis, for example, based on a plurality of sets of image feature amount data of each image associated with each other by an image ID and adjective pair evaluation value data.

In this case, the following image feature amounts are used, among the image feature amounts obtained by GLCM illustrated in FIG. 23.

Angular Second Moment (uniformity)
  Contrast (contrast)
  Dissimilarity
  Entropy (messiness)
  Homogeneity (non-uniformity, local uniformity)
  Inverse Difference Moment (local uniformity)

The corresponding coefficients $a_1$ to $a_6$ and the constant term "Constant" become the coefficient data.

FIG. 30 is a diagram illustrating an example of coefficient data, illustrating a state in which coefficients $a_1$ to $a_6$ and constant terms Const. are calculated for 43 adjective pairs.

Although the case of using multiple regression analysis has been described, any method of analyzing the relationship between multidimensional vector amounts and obtaining a coefficient for converting one vector amount to the other vector amount, may be used.

Furthermore, with respect to the determination of similarity between adjective pair evaluation values at a subsequent stage, a coefficient for obtaining the adjective pair evaluation value from the image feature amount is calculated; however, when the similarity determination at a subsequent stage is performed according to image feature amounts, the coefficient to be obtained is a coefficient for obtaining the image feature amount from the adjective pair evaluation value.

[Extension to Physical Features Other than Image Features]

As described above, it is possible to directly associate physical features (including image features) with adjective pair evaluation values that are general impression evaluation values. In this way, it is possible to estimate the adjective pair evaluation value from the phonemic feature of the sound symbolism word typified by onomatopoeia, and estimate the physical feature from the adjective pair evaluation value. Conversely, it is also possible to estimate the adjective pair evaluation value from the physical feature, and to obtain a candidate sound symbolism word having the phonemic feature corresponding to the adjective pair evaluation value.

Similarly, it is possible to estimate the physical feature from the adjective pair evaluation value that is an impression value. Conversely, it is also possible to estimate the adjective pair evaluation value that is the impression value, from the physical feature.

Seventh Embodiment

In the following, image search using coefficient data in which an image feature is associated with an adjective pair evaluation value will be described.

[Image Search by Sound Symbolism Word (Part 1)]

Figure 31:
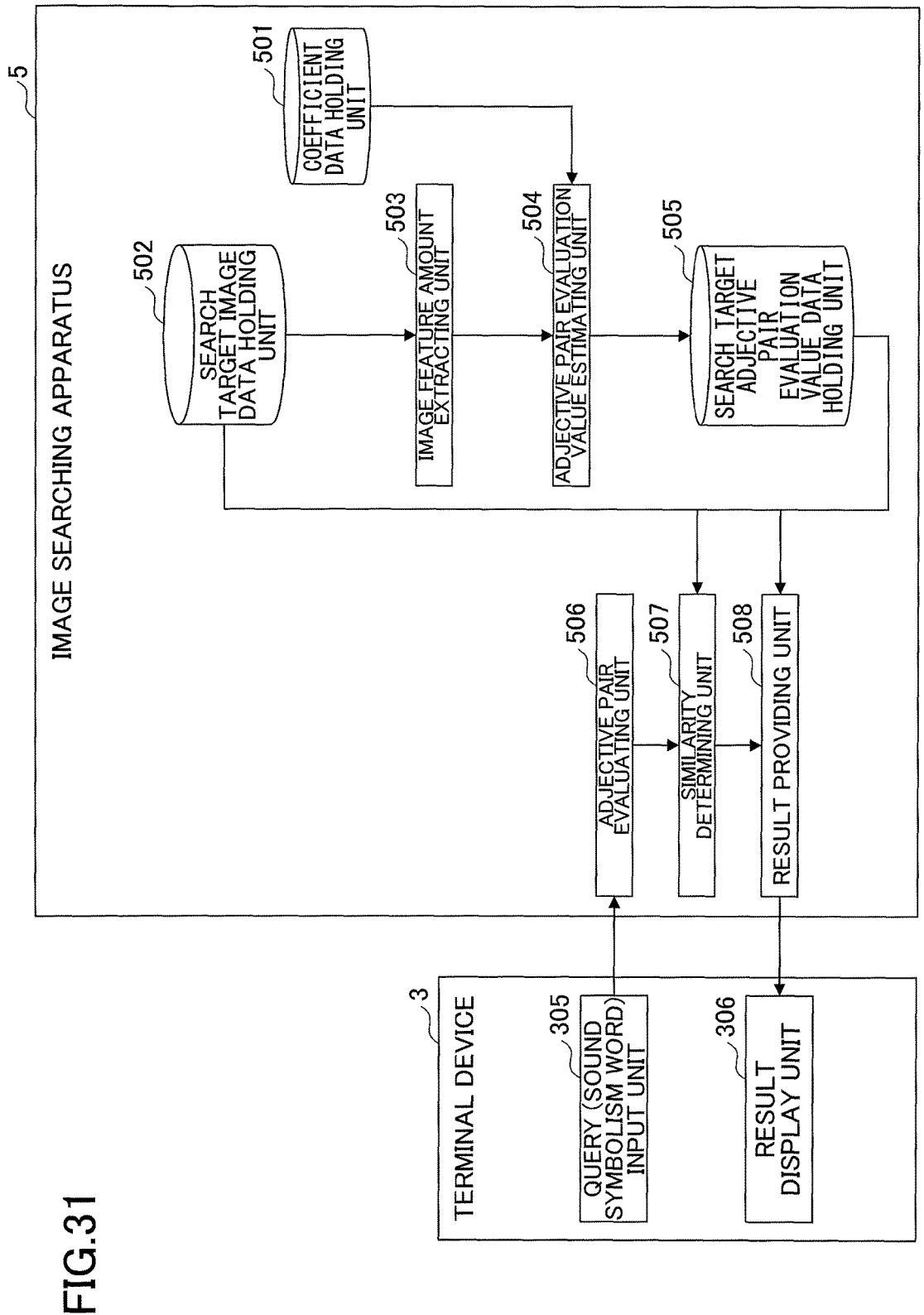
FIG. 31 is a diagram (part 1) illustrating a configuration example of an image searching system.

FIG. 31 is a diagram illustrating a configuration example of the image searching system, in which image searching by a sound symbolism word such as onomatopoeia is made possible by using the coefficient data generated by the above-described process.

In FIG. 31, the terminal device 3 and an image searching apparatus 5 can communicate with each other via a network. In the present embodiment, in order to perform processing at a high speed, the terminal device 3 is constituted by a tablet, etc., for inputting data, and the image searching apparatus 5, which requires processing load, is constituted by a server, etc. Furthermore, by adopting a system configuration of a client and a server, there is an advantageous effect that image searching can be performed even with the terminal device 3 having a low processing capability such as a mobile terminal. Furthermore, in the present embodiment, an example is indicated in which the terminal device 3 and the image searching apparatus 5 are connected by a network; however, it is also possible to constitute the function of the terminal device 3 and the function of the image searching apparatus 5 by a single computer. Note that the image searching by a sound symbolism word is a service provided to a general user, and therefore the user of the terminal device 3 is mainly a general user.

The terminal device 3 includes a query input unit 305 and a result display unit 306. The image searching apparatus 5 includes a coefficient data holding unit 501, a search target image data holding unit 502, an image feature amount extracting unit 503, an adjective pair evaluation value estimating unit 504, a search target adjective pair evaluation value data holding unit 505, an adjective pair evaluating unit 506, a similarity determining unit 507, and a result providing unit 508.

The query input unit 305 of the terminal device 3 has a function of accepting an input of a query (search condition) including a sound symbolism word from the user and transmitting the data of the query to the image searching apparatus 5. The result display unit 306 has a function of displaying to the user the image search result returned from the image searching apparatus 5.

The coefficient data holding unit 501 of the image searching apparatus 5 corresponds to the coefficient data holding unit 413 of the coefficient generating apparatus 4 in FIG. 26.

In the case where the coefficient generating apparatus 4 and the image searching apparatus 5 are constituted by the same information processing apparatus, the coefficient data holding unit may be shared. When the coefficient generating apparatus 4 and the image searching apparatus 5 are constituted by different information processing apparatuses, the coefficient data copied from the coefficient data holding unit 413 of the coefficient generating apparatus 4 is held in the coefficient data holding unit 501.

In FIG. 31, the search target image data holding unit 502 holds search target image data. The search target image data is obtained by previously collecting data of images to be the target of searching. The image feature amount extracting unit 503 has a function of extracting the image feature amount for each piece of the search target image data registered in the search target image data holding unit 502, at a predetermined timing (for example, at the time when a predetermined period elapses). The adjective pair evaluation value estimating unit 504 has a function of estimating (calculating) the adjective pair evaluation value by applying the coefficient data in the coefficient data holding unit 501 to the image feature amount data extracted by the image feature amount extracting unit 503, and registering the adjective pair evaluation value data in the search target adjective pair evaluation value data holding unit 505 in association with an image ID.

The adjective pair evaluating unit 506 has a function of performing adjective pair evaluation on the sound symbolism word included in the query received from the query input unit 305 of the terminal device 3 and transferring the adjective pair evaluation value data to the similarity determining unit 507. The similarity determining unit 507 has a function of determining the similarity between the adjective pair evaluation data in the query generated by the adjective pair evaluating unit 506 and a plurality of (multiple) pieces of search target adjective pair evaluation value data registered in the search target adjective pair evaluation value data holding unit 505, and outputting image IDs corresponding to a predetermined number of top ranking search target images having a high similarity to the result providing unit 508. The result providing unit 508 has a function of generating an image search result including a predetermined number of top ranking search target images determined by the similarity determining unit 507 and providing the image search result to the result display unit 306 of the terminal device 3.

The hardware configuration of the image searching apparatus 5 is the same as that illustrated in FIG. 9. The image feature amount extracting unit 503, the adjective pair evaluation value estimating unit 504, the adjective pair evaluating unit 506, the similarity determining unit 507, and the result providing unit 508 of the image searching apparatus 5 illustrated in FIG. 31 are implemented by executing computer programs in the CPU 1002 in FIG. 9. The coefficient data holding unit 501, the search target image data holding unit 502, and the search target adjective pair evaluation value data holding unit 505 illustrated in FIG. 31 are implemented by the HDD/flash memory 1008, etc., in FIG. 9.

Figure 32:
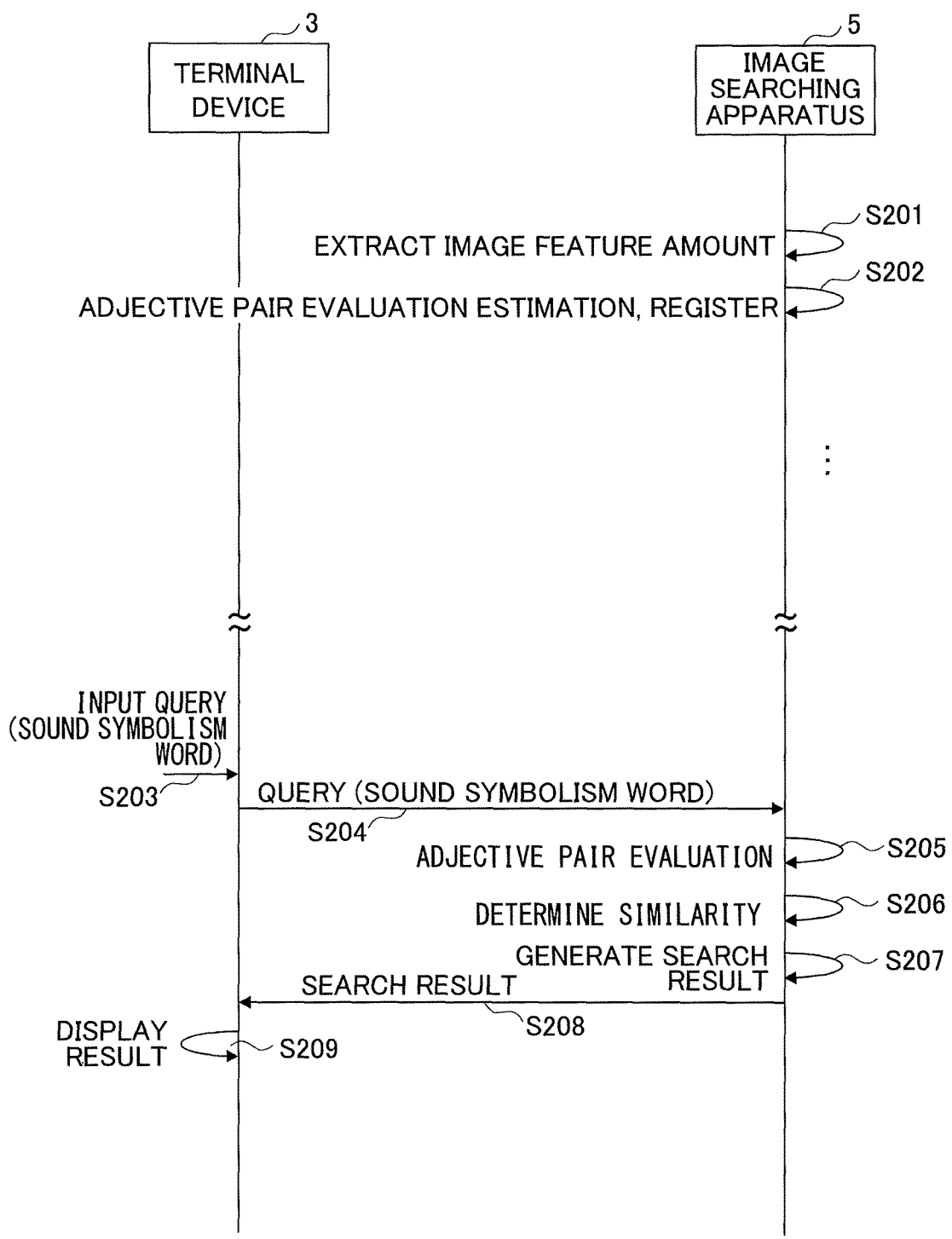
FIG. 32 is a sequence diagram (part 1) illustrating a process example of image searching.

FIG. 32 is a sequence diagram illustrating a process example of image searching. In FIG. 32, the image feature amount extracting unit 503 of the image searching apparatus 5 extracts an image feature amount for each piece of the search target image data registered in the search target image data holding unit 502, at a predetermined timing (for example, at the time when a predetermined period elapses), and transfers the image feature amount data to the adjective pair evaluation value estimating unit 504 (step S201).

Details of the image feature amount extraction are the same as those described with reference to FIGS. 23 to 25.

In FIG. 32, the adjective pair evaluation value estimating unit 504 estimates (calculates) the adjective pair evaluation value by applying the coefficient data in the coefficient data holding unit 501 to the image feature amount data extracted by the image feature amount extracting unit 503, and registers the adjective pair evaluation value data in the search target adjective pair evaluation value data holding unit 505 in association with an image ID (step S202).

FIG. 33 is a diagram illustrating a process example of adjective pair evaluation value estimation by the adjective pair evaluation value estimating unit 504. As an example, the adjective pair evaluation value estimating unit 504 assigns image feature amount data corresponding to each piece of the search target image data and coefficient data registered in the coefficient data holding unit 501, to a definitional equation used for generated a coefficient by multiple regression analysis illustrated in FIG. 29, to calculate adjective pair evaluation value data. In the adjective pair evaluation value data, evaluation values are associated with a plurality of adjective pairs illustrated in FIG. 18.

Returning to FIG. 32, subsequently, while the image searching service is being provided, the query input unit 305 of the terminal device 3 accepts a query that includes a sound symbolism word input by the user (step S203), and transmits the data of the query to the image searching apparatus 5 (step S204).

The adjective pair evaluating unit 506 of the image searching apparatus 5 performs adjective pair evaluation with respect to the sound symbolism word included in the query, based on the data of the query received from the query input unit 305 of the terminal device 3, and transfers the generated adjective pair evaluation value data to the similarity determining unit 507 (step S205). Details of the adjective pair evaluation are the same as described with reference to FIG. 28.

In FIG. 32, the similarity determining unit 507 determines the similarity between the adjective pair evaluation data of the query generated by the adjective pair evaluating unit 506 and a plurality of (multiple) pieces of search target adjective pair evaluation value data registered in the search target adjective pair evaluation value data holding unit 505, and outputs image IDs corresponding to a predetermined number of pieces of top ranking search target images to the result providing unit 508 (step S206).

Figure 34:
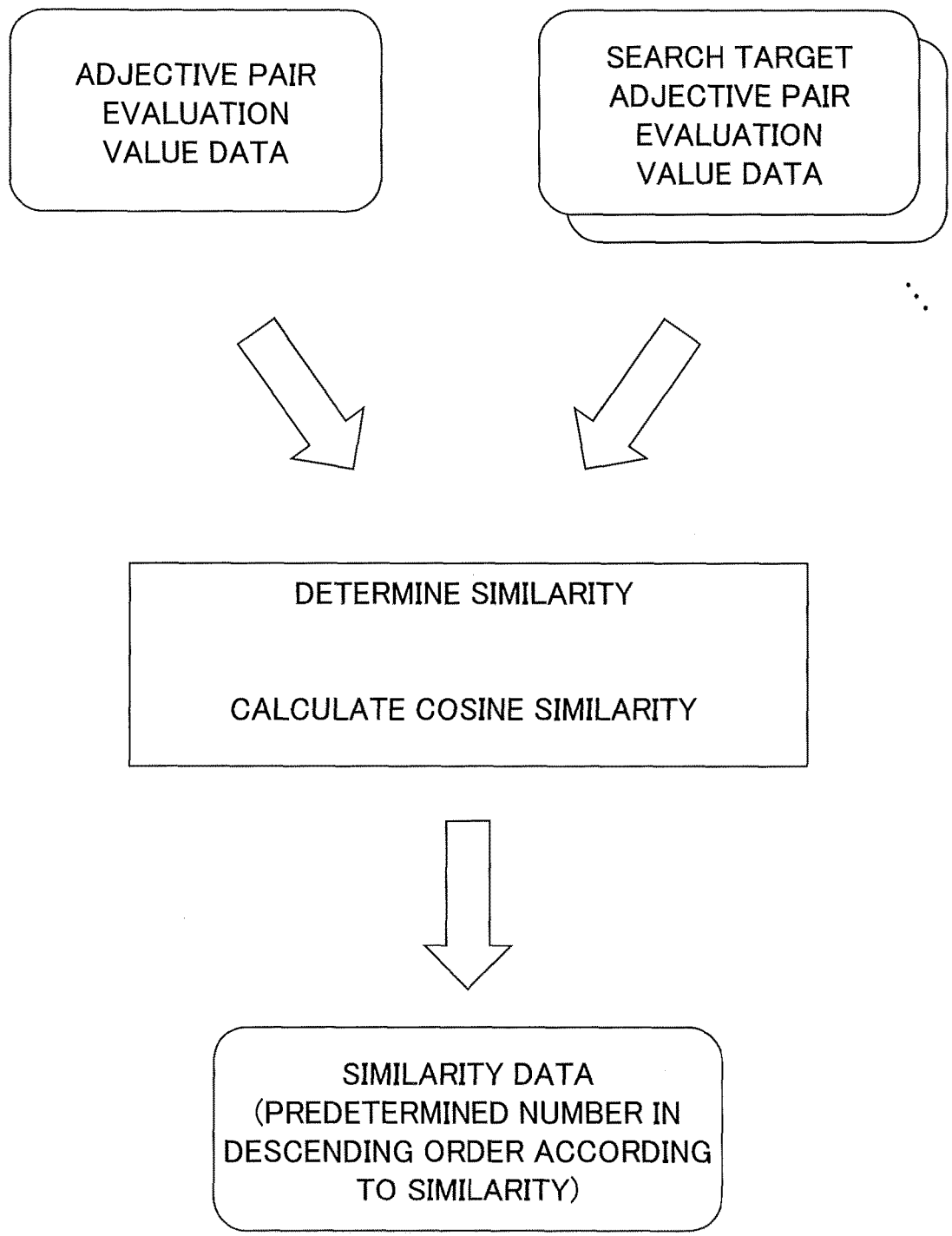
FIG. 34 is a diagram illustrating a process example of similarity determination.

FIG. 34 is a diagram illustrating a process example of the similarity determination by the similarity determining unit 507. The similarity determining unit 507 calculates the cosine similarity (inner product of vector) between adjective pair evaluation value data generated from a sound symbolism word included in a query and a plurality (multiple) of pieces of search target adjective pair evaluation value data registered in the search target adjective pair evaluation value data holding unit 505, to acquire similarity data.

Returning to FIG. 32, the result providing unit 508 generates an image search result including a predetermined number of top ranking search target images having a high similarity determined by the similarity determining unit 507 (step S207), and provides the image search result to the result display unit 306 of the terminal device 3 (step S208). In response to receiving the image search result, the result display unit 306 displays the image search result to the user (step S209).

By the above process, the user of the terminal device 3 can search for an image matching the texture, etc., represented by a sound symbolism word, by using the sound symbolism word such as an onomatopoeia as a query.

[Image Searching by Sound Symbolism Word (Part 2)]

Figure 35:
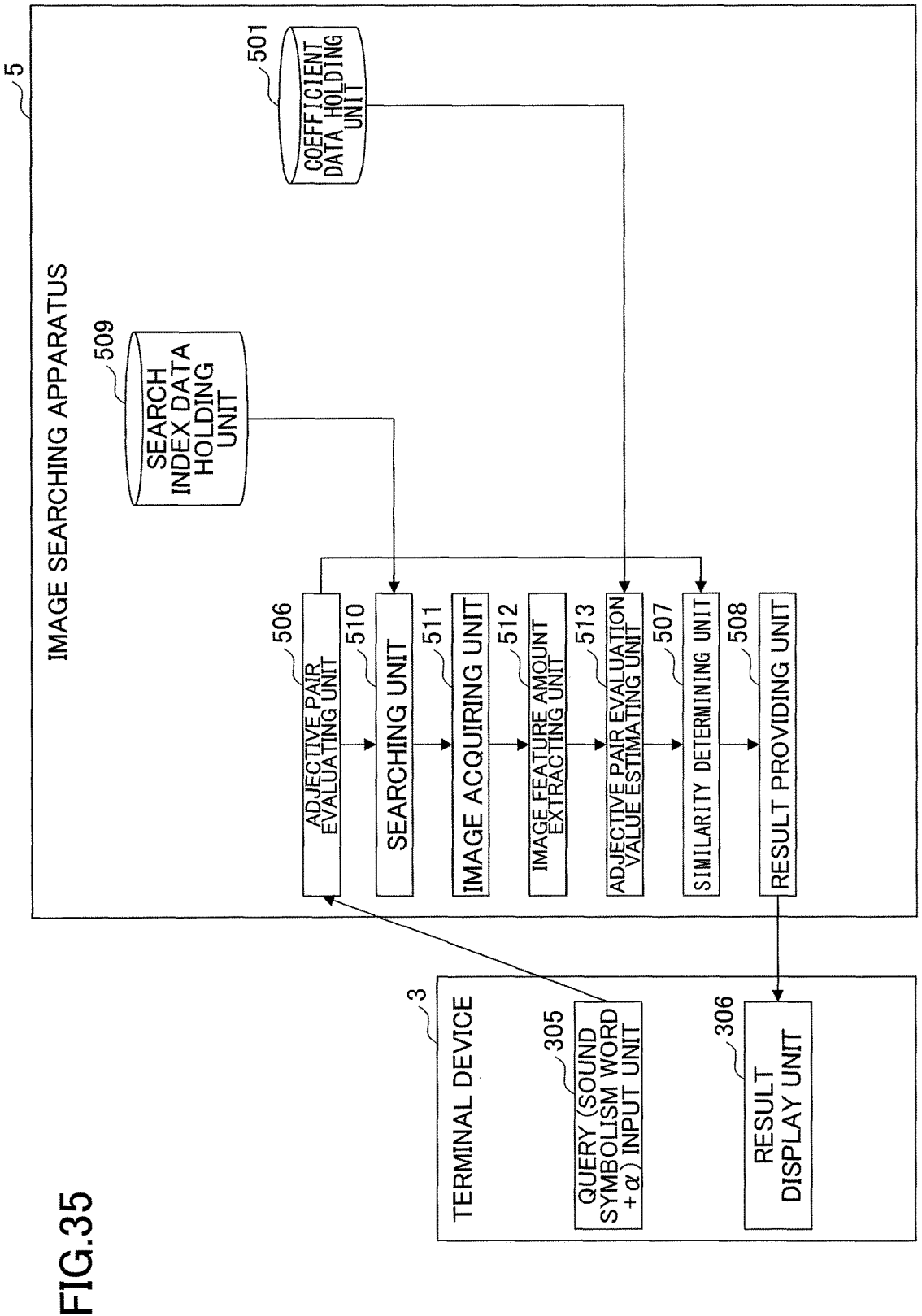
FIG. 35 is a diagram (part 2) illustrating a configuration example of an image searching system.

FIG. 35 is a diagram illustrating another configuration example of the image searching system, in which the adjective pair evaluation value data is not generated in advance for all of the pieces of search target image data, but adjective pair evaluation value data is generated for the search target images within a range identified based on a query from the user. This eliminates the need to collect search target image data that is assumed in advance, and also eliminates the need to generate adjective pair evaluation value data in advance.

Compared to the configuration of FIG. 31, in the configuration of the image searching apparatus 5 of FIG. 35, the search target image data holding unit 502, the image feature amount extracting unit 503, the adjective pair evaluation value estimating unit 504, and the search target adjective pair evaluation value data holding unit 505 are removed. Furthermore, a search index data holding unit 509, a searching unit 510, an image acquiring unit 511, an image feature amount extracting unit 512, and an adjective pair evaluation value estimating unit 513 are newly added. Other configurations are the same as those in FIG. 31. The searching unit 510, the image acquiring unit 511, the image feature amount extracting unit 512, and the adjective pair evaluation value estimating unit 513 are implemented by executing computer programs in the CPU 1002 in FIG. 9. The search index data holding unit 509 is implemented by the HDD/flash memory 1008, etc., in FIG. 9.

In FIG. 35, the search index data holding unit 509 of the image searching apparatus 5 holds a keyword included in a query entered by a user in association with address information (a URI, etc.) where an article, etc., including the keyword exists. The searching unit 510 has a function of searching the search index data holding unit 509 mainly based on a general term (for example, the part "blanket" in a query "fluffy (fuwa fuwa) blanket", etc.) other than the sound symbolism word included in the query entered by the user.

The image acquiring unit 511 has a function of acquiring image data (generally, a plurality of pieces of image data) via the network from the range identified by the searching by the searching unit 510. The image feature amount extracting unit 512 has a function of extracting an image feature amount for each piece of the image data acquired by the image acquiring unit 511. The adjective pair evaluation value estimating unit 513 has a function of estimating (calculating) an adjective pair evaluation value by applying the coefficient data in the coefficient data holding unit 501 to each piece of image feature amount data extracted by the image feature amount extracting unit 512.

Figure 36:
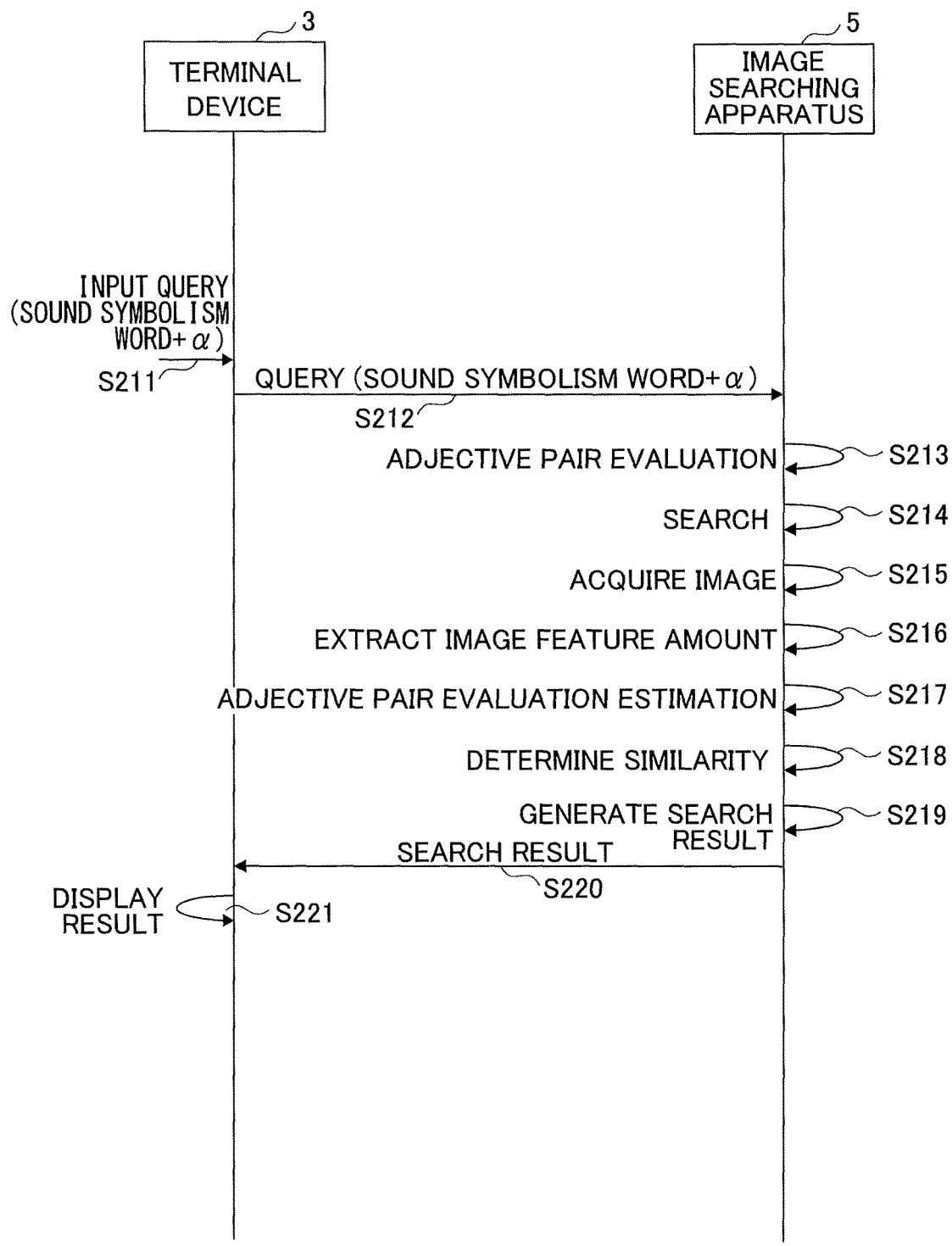
FIG. 36 is a sequence diagram (part 2) illustrating a process example of image searching.

FIG. 36 is a sequence diagram illustrating a process example of image searching. In FIG. 36, while an image searching service is being provided, the query input unit 305 of the terminal device 3 accepts a query including a sound symbolism word input by a user (step S211), and transmits the query data to the image searching apparatus 5 (step S212).

The adjective pair evaluating unit 506 of the image searching apparatus 5 performs adjective pair evaluation on the sound symbolism word included in the query, based on the query data received from the query input unit 305 of the terminal device 3, and transfers the generated adjective pair evaluation value data to the similarity determining unit 507 (step S213). Details of the adjective pair evaluation are the same as described in FIG. 28.

In FIG. 36, the searching unit 510 searches the search index data holding unit 509 mainly based on a general term other than the sound symbolism word included in the query input by the user, and transfers a predetermined number of search results (pieces of address information) with high search accuracy to the image acquiring unit 511 (step S214).

The image acquiring unit 511 acquires image data (generally, a plurality of pieces of image data) via the network from the range identified by the searching by the searching unit 510, and transfers the acquired image data to the image feature amount extracting unit 512 (step S215).

The image feature amount extracting unit 512 extracts the image feature amount for each piece of the image data acquired by the image acquiring unit 511, and transfers the generated image feature amount data to the adjective pair evaluation value estimating unit 513 (step S216). Details of the image feature amount extraction are the same as those described with reference to FIGS. 23 to 25.

In FIG. 36, the adjective pair evaluation value estimating unit 513 estimates (calculates) the adjective pair evaluation value by applying the coefficient data in the coefficient data holding unit 501 to each piece of image feature amount data extracted by the image feature amount extracting unit 512, and transfers the adjective pair evaluation value to the similarity determining unit 507 (step S217). Details of the adjective pair evaluation value estimation are the same as described in FIG. 33. Note that the adjective pair evaluation value data once generated is held in the image searching apparatus 5 for reuse, and generation of adjective pair evaluation value data can be omitted for an image for which adjective pair evaluation value data has already been generated.

In FIG. 36, the similarity determining unit 507 determines the similarity between the adjective pair evaluation data of the query generated by the adjective pair evaluating unit 506 and the plurality of pieces of adjective pair evaluation value data acquired from the adjective pair evaluation value estimating unit 513, and outputs, to the result providing unit 508, information identifying a predetermined number of top ranking search target images having a high similarity (step S218). Details of the similarity determination are the same as those described with reference to FIG. 34.

In FIG. 36, the result providing unit 508 generates an image search result including a predetermined number of top ranking search target images determined by the similarity determining unit 507 (step S219), and provides the image search result to the result display unit 306 of the terminal device 3 (step S220). In response to receiving the image search result, the result display unit 306 displays the image search result to the user (step S221).

[Image Searching by Sound Symbolism Word (Part 3)]

Figure 37:
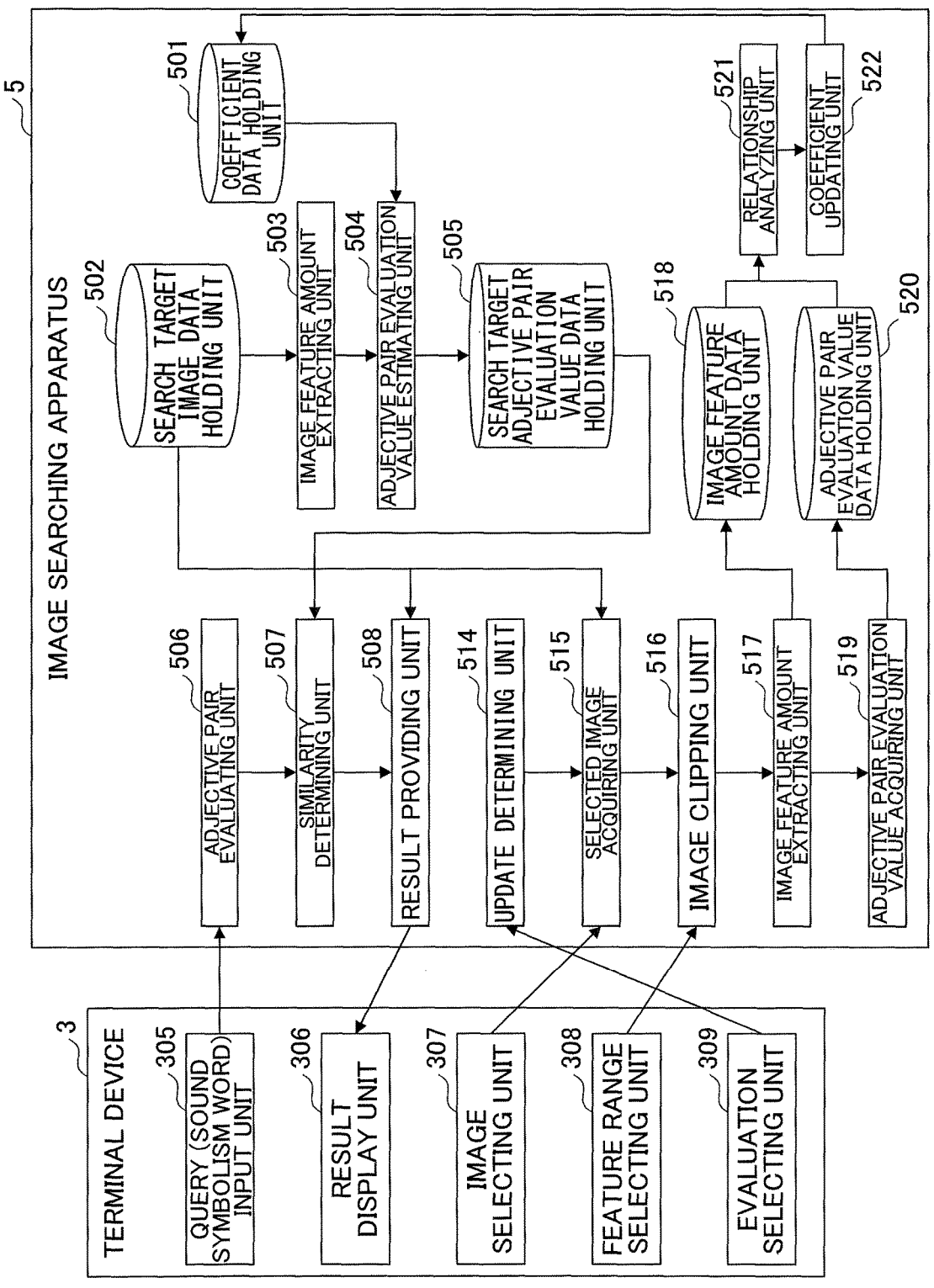
FIG. 37 is a diagram (part 3) illustrating a configuration example of an image searching system.

FIG. 37 is a diagram illustrating yet another configuration example of the image searching system. As an extension of the image searching, a user inputs a feature range or an evaluation, and the coefficient data is updated based on the input information. This makes it possible to increase the accuracy of the coefficient data and increase the precision of the image searching, through the usage by the user.

Compared to the configuration of FIG. 31, the terminal device 3 of FIG. 37 newly includes an image selecting unit 307, a feature range selecting unit 308, and an evaluation selecting unit 309. Furthermore, as compared with the configuration of FIG. 31, the image searching apparatus 5 of FIG. 37 newly includes an update determining unit 514, a selected image acquiring unit 515, an image clipping unit 516, an image feature amount extracting unit 517, an image feature amount data holding unit 518, an adjective pair evaluation value acquiring unit 519, an adjective pair evaluation value data holding unit 520, a relationship analyzing unit 521, and a coefficient updating unit 522.

In FIG. 37, the image selecting unit 307 of the terminal device 3 has a function of accepting a selection of an image by the user from among the search target images provided as a search result, and transmitting the selection to the selected image acquiring unit 515 of the image searching apparatus 5. The feature range selecting unit 308 has a function of accepting a selection of a feature range from the user when there is a feature portion highly related to the sound symbolism word of the query with respect to the image selected by the user, and transmitting the feature range to the image clipping unit 516 of the image searching apparatus 5.

The evaluation selecting unit 309 has a function of accepting an evaluation by the user regarding the consistency between a search condition and the image selected by the user, and transmitting the evaluation to the update determining unit 514 of the image searching apparatus 5.

The update determining unit 514 of the image searching apparatus 5 has a function of determining to update the coefficient data in a case where the evaluation of the user acquired from the evaluation selecting unit 309 of the terminal device 3 is greater than or equal to a predetermined value (for example, greater than or equal to the top two points on a file-point scale).

The selected image acquiring unit 515 has a function of acquiring corresponding image data from the search target image data holding unit 502 based on the selection of the image acquired from the image selecting unit 307 of the terminal device 3, when it is determined by the update determining unit 514 to update the coefficient data. The image clipping unit 516 has a function of performing a process of clipping an image portion from the image data acquired by the selected image acquiring unit 515 based on the feature range acquired from the feature range selecting unit 308 of the terminal device 3.

The image feature amount extracting unit 517 has a function of extracting the image feature amount of the image data clipped by the image clipping unit 516, and registering the image feature amount data in the image feature amount data holding unit 518 in association with an image ID. Note that the image feature amount data holding unit 518 corresponds to the image feature amount data holding unit 409 in FIG. 26 and stores the image feature amount data that is the basis of calculation of the present coefficient data. When the coefficient generating apparatus 4 and the image searching apparatus 5 are constituted by the same information processing apparatus, the image feature amount data holding unit may be shared. When the coefficient generating apparatus 4 and the image searching apparatus 5 are constituted by different information processing apparatuses, the image feature amount data copied from the image feature amount data holding unit 409 of the coefficient generating apparatus 4 is held in the image feature amount data holding unit 518.

The adjective pair evaluation value acquiring unit 519 has a function of acquiring, from the adjective pair evaluating unit 506, adjective pair evaluation value data with respect to a sound symbolism word included in a query used for searching the selected image, and registering the adjective pair evaluation value data in the adjective pair evaluation value data holding unit 520 in association with an image ID. Note that the adjective pair evaluation value data holding unit 520 corresponds to the adjective pair evaluation value data holding unit 411 in FIG. 26, and stores the adjective pair evaluation value data that has been the basis of the calculation of the present coefficient data. When the coefficient generating apparatus 4 and the image searching apparatus 5 are constituted by the same information processing apparatus, the adjective pair evaluation value data holding unit may be shared. When the coefficient generating apparatus 4 and the image searching apparatus 5 are constituted by different information processing apparatuses, the adjective pair evaluation value data copied from the adjective pair evaluation value data holding unit 411 of the coefficient generating apparatus 4 is held in the adjective pair evaluation value data holding unit 520.

The relationship analyzing unit 521 has a function of generating coefficient data indicating a numerical relationship between any image feature amount and any adjective pair evaluation value, based on image feature amount data registered in the image feature amount data holding unit 518 and adjective pair evaluation value data registered in the adjective pair evaluation value data holding unit 520. The coefficient updating unit 522 has a function of updating the coefficient data in the coefficient data holding unit 501 based on the coefficient data newly generated by the relationship analyzing unit 521.

Figure 38:
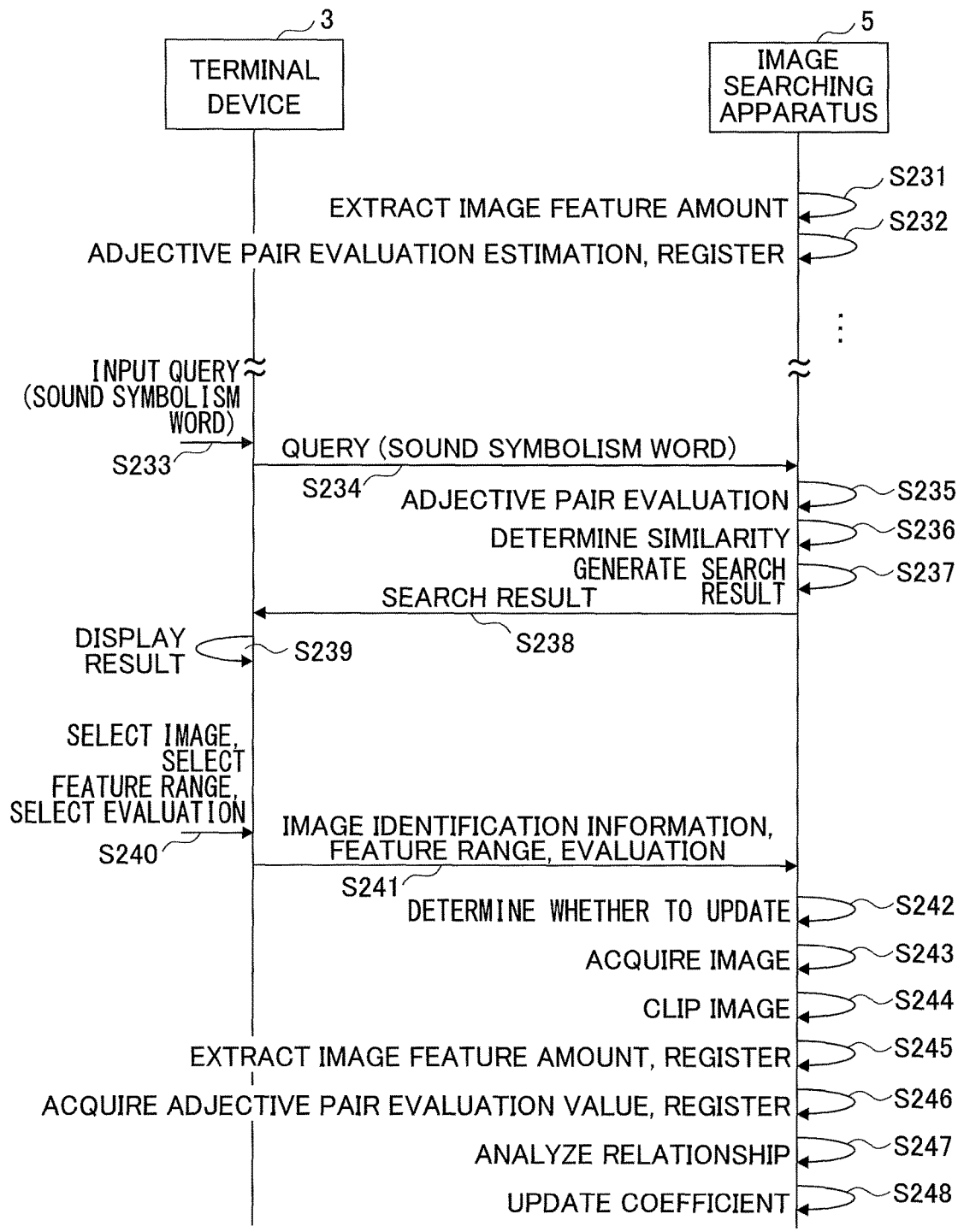
FIG. 38 is a sequence diagram (part 3) illustrating a process example of image searching.

FIG. 38 is a sequence diagram illustrating a process example of image searching. In FIG. 38, the processes of steps S231 to S239 are similar to the processes of steps S201 to S209 of FIG. 32, and therefore descriptions thereof will be omitted.

In FIG. 38, the image selecting unit 307, the feature range selecting unit 308, and the evaluation selecting unit 309 of the terminal device 3 accept a selection of an image by the user from the search target images provided as a search result, a selection of a feature range from the user (only when a feature range is selected), and an evaluation by the user with respect to the consistency with the search condition (step S240), and transmits the corresponding data to the selected image acquiring unit 515 of the image searching apparatus 5 (step S241).

The update determining unit 514 of the image searching apparatus 5 determines to update the coefficient data, in a case where the user's evaluation acquired from the evaluation selecting unit 309 of the terminal device 3 is greater than or equal to a predetermined value (for example, greater than or equal to the top two points on a file-point scale) (step S242). When the update determining unit 514 determines not to update the coefficient, the following processes are not performed. Here, the following processes will be described assuming that the update determining unit 514 determines to update the coefficient data.

The selected image acquiring unit 515 acquires the corresponding image data from the search target image data holding unit 502 based on the selection of the image acquired from the image selecting unit 307 of the terminal device 3 (step S243).

The image clipping unit 516 performs a process of clipping an image portion from the image data acquired by the selected image acquiring unit 515, based on the feature range acquired from the feature range selecting unit 308 of the terminal device 3 (step S244). Note that when a feature range is not selected, the clipping process is not performed.

The image feature amount extracting unit 517 extracts the image feature amount of the image data clipped by the image clipping unit 516 (the original image data in the case where the clipping process is not performed), and registers the image feature amount data in the image feature amount data holding unit 518 in association with an image ID (step S245). Details of the image feature amount extraction are the same as those described with reference to FIGS. 23 to 25.

In FIG. 38, the adjective pair evaluation value acquiring unit 519 acquires, from the adjective pair evaluating unit 506, adjective pair evaluation value data with respect to the sound symbolism word included in the query used for searching the selected image, and registers the adjective pair evaluation value data in the adjective pair evaluation value data holding unit 520 in association with an image ID (step S246).

The relationship analyzing unit 521 generates coefficient data indicating a numerical relationship between any image feature amount and any adjective pair evaluation value, based on image feature amount data registered in the image feature amount data holding unit 518 and adjective pair evaluation value data registered in the adjective pair evaluation value data holding unit 520 (step S247). Details of the coefficient data generation are the same as those described with reference to FIGS. 29 and 30.

In FIG. 38, the coefficient updating unit 522 updates the coefficient data in the coefficient data holding unit 501 based on the coefficient data newly generated by the relationship analyzing unit 521 (step S248).

Note that although the example applied to the image searching apparatus 5 illustrated in FIG. 31 has been described, the same function may be applied to the image searching apparatus 5 in FIG. 35. Note that when a user is given a login ID unique to the user when using the image searching system according to the present embodiment, by creating updated coefficient data for each user in association with the login ID, it will be possible to search for results that match the user's impression, the more the user uses the image searching apparatus 5.

[Acquisition of Sound Symbolism Word from Image]

Figure 39:
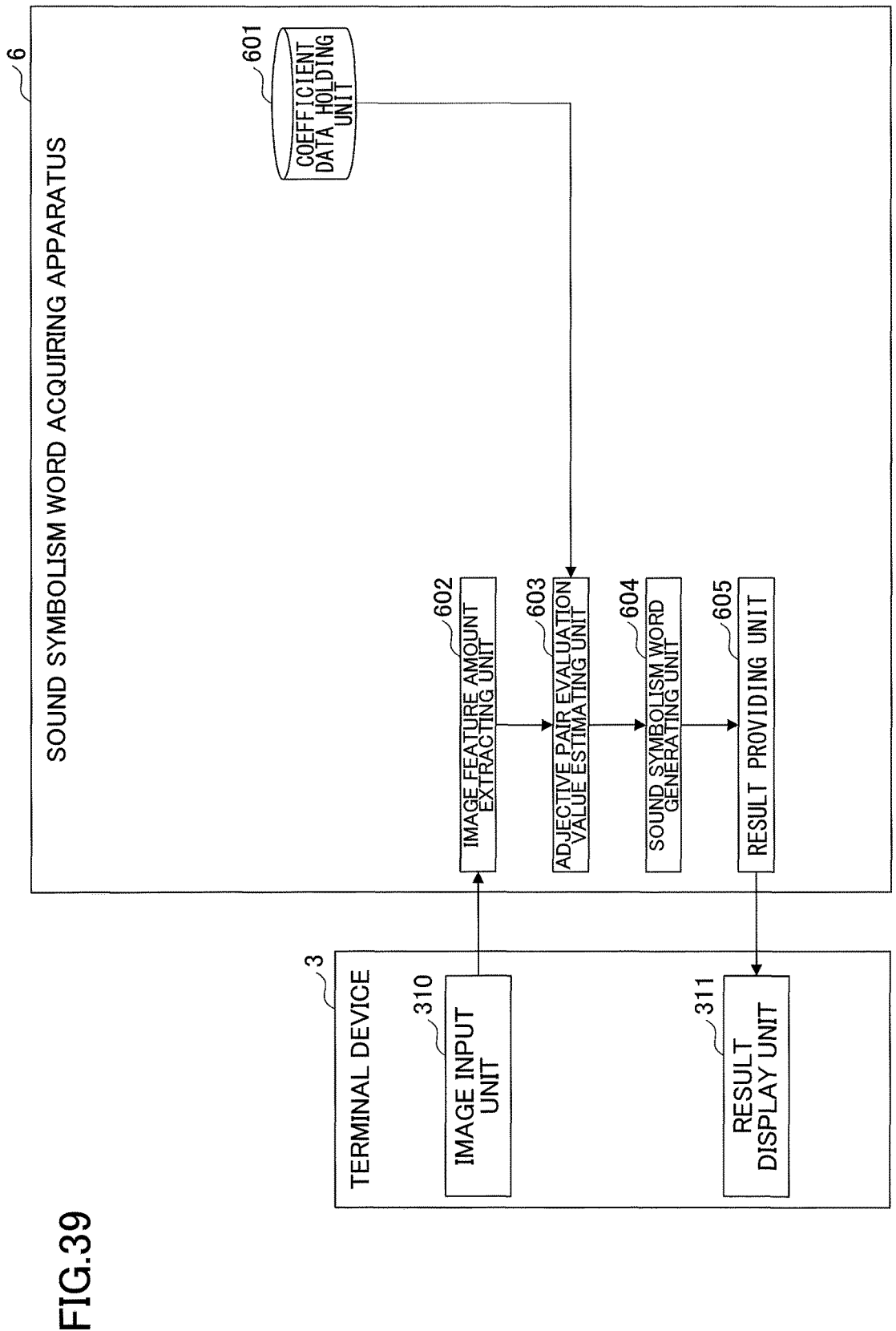
FIG. 39 is a diagram illustrating a configuration example of a sound symbolism word acquisition system.

FIG. 39 is a diagram illustrating an example of the configuration of a sound symbolism word acquisition system, in which the user of the terminal device 3 can acquire a sound symbolism word such as onomatopoeia, etc., that matches the texture, etc., represented by any image.

In FIG. 39, the terminal device 3 and a sound symbolism word acquiring apparatus 6 can communicate with each other via a network. In the present embodiment, in order to perform the processing at a high speed, the terminal device 3 is constituted by a tablet, etc., for inputting data, and the sound symbolism word acquiring apparatus 6, which requires processing load, is constituted by a server, etc. Furthermore, by adopting a system configuration of a client and a server, there is an advantageous effect that the sound symbolism word can be acquired using the terminal device 3 having a low processing capability such as a mobile terminal. Furthermore, in the present embodiment, an example is indicated in which the terminal device 3 and the sound symbolism word acquiring apparatus 6 are connected by a network; however, it is also possible to constitute the function of the terminal device 3 and the function of the sound symbolism word acquiring apparatus 6 by a single computer. Note that the sound symbolism word acquisition from an image is mainly a service provided to those who develop products, and therefore the user of the terminal device 3 is mainly the person who develops products. However, it is obvious that the service may be provided to general users.

The terminal device 3 includes an image input unit 310 and a result display unit 311. The sound symbolism word acquiring apparatus 6 includes a coefficient data holding unit 601, an image feature amount extracting unit 602, an adjective pair evaluation value estimating unit 603, a sound symbolism word generating unit 604, and a result providing unit 605.

The image input unit 310 of the terminal device 3 has a function of accepting input of image data that is a target for which the user wishes to acquire a sound symbolism word representing the texture, etc., and transmitting the image data to the image feature amount extracting unit 602 of the sound symbolism word acquiring apparatus 6. The result display unit 311 has a function of receiving the acquisition result including the corresponding sound symbolism word from the result providing unit 605 of the sound symbolism word acquiring apparatus 6 and displaying the acquisition result to the user.

The coefficient data holding unit 601 of the sound symbolism word acquiring apparatus 6 corresponds to the coefficient data holding unit 413 of the coefficient generating apparatus 4 in FIG. 26, and when the coefficient generating apparatus 4 and the sound symbolism word acquiring apparatus 6 are constituted by the same information processing apparatus, the coefficient data holding unit may be shared. When the coefficient generating apparatus 4 and the sound symbolism word acquiring apparatus 6 are constituted by different information processing apparatuses, the coefficient data copied from the coefficient data holding unit 413 of the coefficient generating apparatus 4 is held in the coefficient data holding unit 601.

The image feature amount extracting unit 602 has a function of extracting the image feature amount of the image data acquired from the image input unit 310 of the terminal device 3. The adjective pair evaluation value estimating unit 603 has a function of estimating (calculating) the adjective pair evaluation value by applying the coefficient data in the coefficient data holding unit 601 to the image feature amount data extracted by the image feature amount extracting unit 602.

The sound symbolism word generating unit 604 has a function of generating sound symbolism words (generally, a plurality of sound symbolism words) based on the adjective pair evaluation value estimated by the adjective pair evaluation value estimating unit 603. The result providing unit 605 has a function of generating an acquisition result from the sound symbolism word generated by the sound symbolism word generating unit 604 and transmitting the acquisition result to the result display unit 311 of the terminal device 3.

The hardware configuration of the terminal device 3 is as illustrated in FIG. 9, and the image input unit 310 and the result display unit 311 are implemented by executing computer programs in the CPU 1002 in FIG. 9. The hardware configuration of the sound symbolism word acquiring apparatus 6 is also the same as that illustrated in FIG. 9. The image feature amount extracting unit 602, the adjective pair evaluation value estimating unit 603, the sound symbolism word generating unit 604, and the result providing unit 605 illustrated in FIG. 39 are implemented by executing computer programs in the CPU 1002 in FIG. 9. The coefficient data holding unit 601 illustrated in FIG. 39 is implemented by the HDD/flash memory 1008, etc., in FIG. 9.

Figure 40:
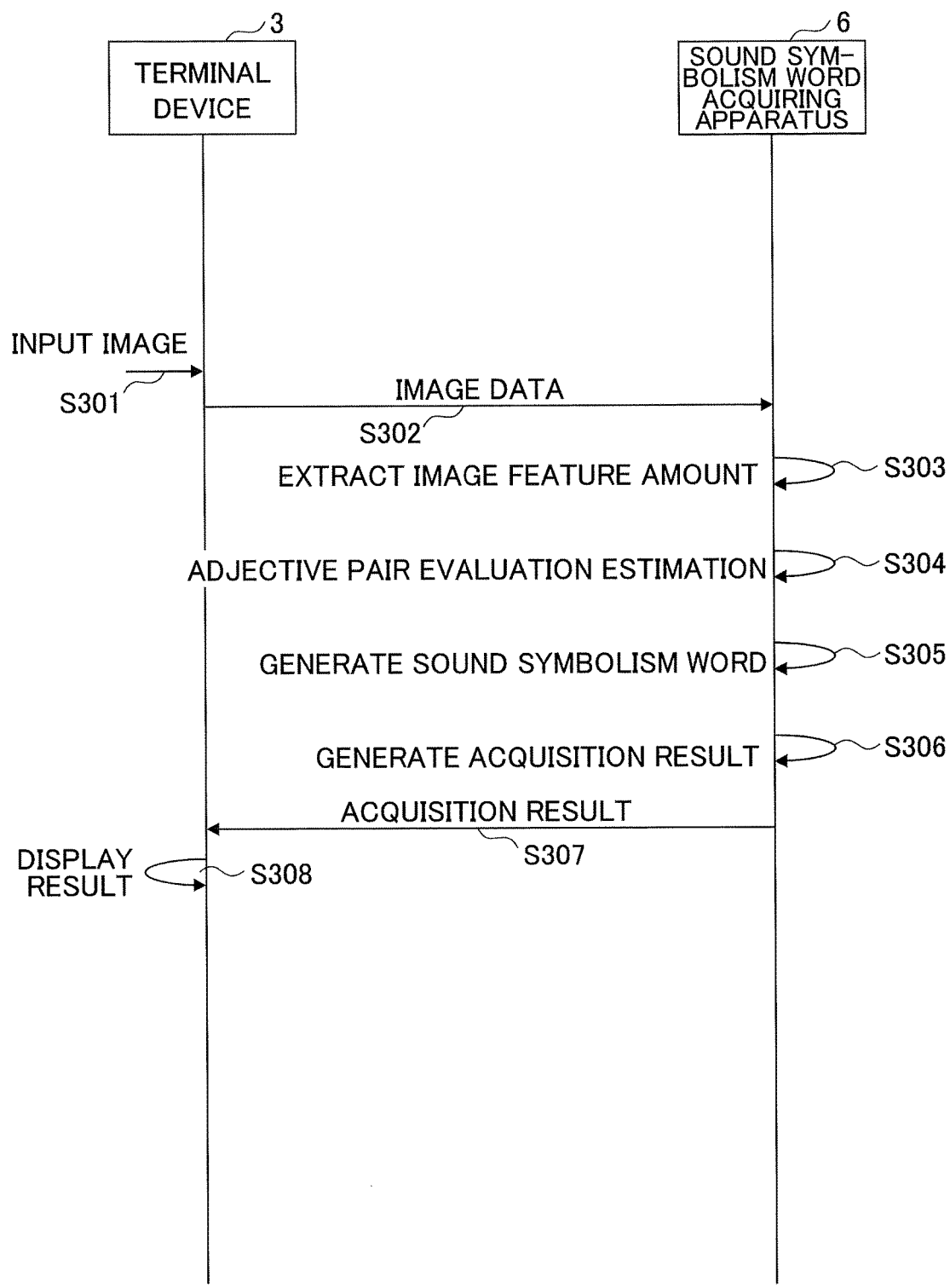
FIG. 40 is a sequence diagram illustrating a process example of sound symbolism word acquisition.

FIG. 40 is a sequence diagram illustrating a process example of acquiring a sound symbolism word. In FIG. 40, the image input unit 310 of the terminal device 3 accepts the input of image data that is a target for which the user wishes to acquire a sound symbolic word representing the texture, etc. (step S301), and transmits the image data to the image feature amount extracting unit 602 of the sound symbolism word acquiring apparatus 6 (step S302).

The image feature amount extracting unit 602 of the sound symbolism word acquiring apparatus 6 extracts the image feature amount with respect to the image data acquired from the image input unit 310 of the terminal device 3 (step S303). Details of the image feature amount extraction are the same as those described with reference to FIGS. 23 to 25.

In FIG. 40, the adjective pair evaluation value estimating unit 603 estimates (calculates) the adjective pair evaluation value by applying the coefficient data in the coefficient data holding unit 601 to the image feature amount data extracted by the image feature amount extracting unit 602 (step S304). Details of the adjective pair evaluation are the same as described with reference to FIG. 28.

In FIG. 40, the sound symbolism word generating unit 604 generates a sound symbolism word (generally, a plurality of sound symbolism words) based on the adjective pair evaluation value estimated by the adjective pair evaluation value estimating unit 603 (step S305). Details of the generation of the sound symbolism word will be described later.

The result providing unit 605 generates an acquisition result from the sound symbolism word generated by the sound symbolism word generating unit 604 (step S306), and transmits the acquisition result to the result display unit 311 of the terminal device 3 (step S307). The result display unit 311 of the terminal device 3 receives the acquisition result including the corresponding sound symbolism word from the result providing unit 605 of the sound symbolism word acquiring apparatus 6, and displays the acquisition result to the user (step S308).

Figure 41:
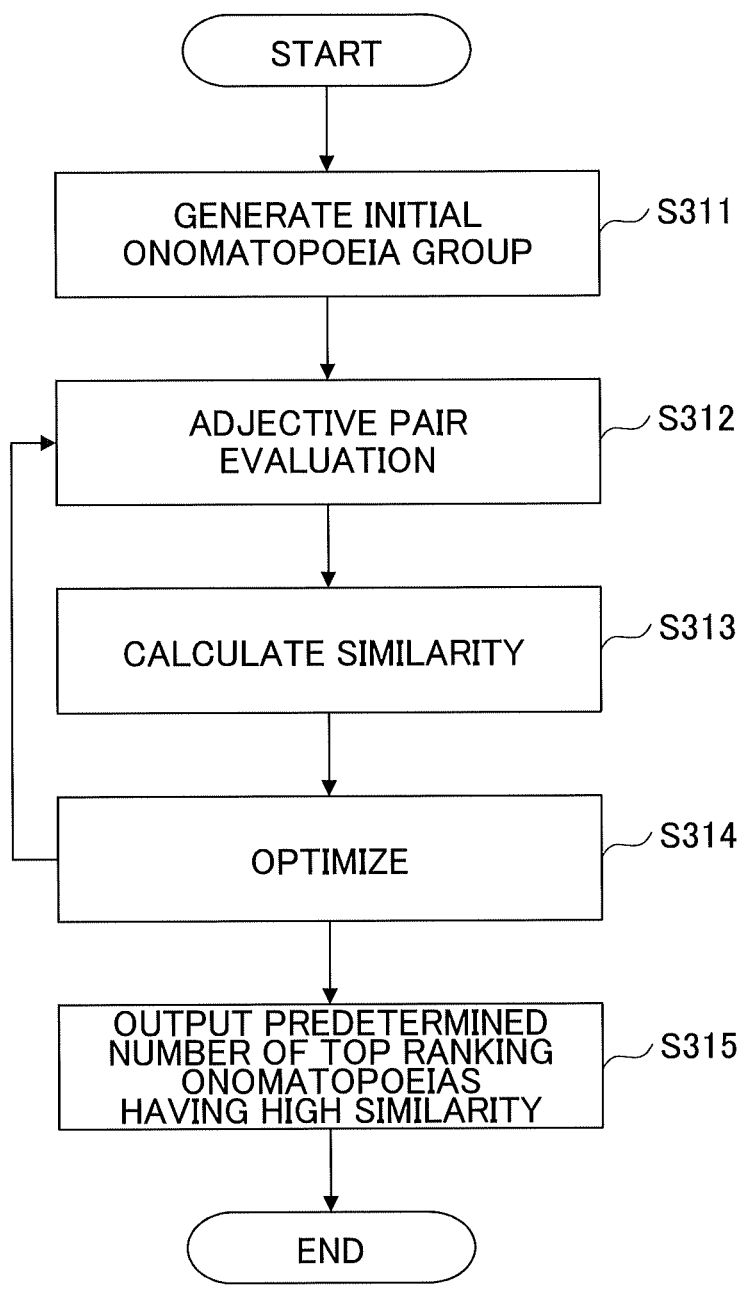
FIG. 41 is a flowchart illustrating a process example of sound symbolism word generation.

FIG. 41 is a flowchart illustrating a process example of generating a sound symbolism word by the sound symbolism word generating unit 604. In the following description, the sound symbolism word is referred to as onomatopoeia.

In FIG. 41, the sound symbolism word generating unit 604 generates an initial onomatopoeia group by randomly generating item values of onomatopoeia expression data (FIG. 12) (step S311). The predetermined item values of the onomatopoeia expression data may be fixed values. Accordingly, restrictions can be placed on the range of onomatopoeia to be generated.

Subsequently, the sound symbolism word generating unit 604 performs adjective pair evaluation by referring to the quantitative evaluation database (FIG. 19) based on each piece of onomatopoeia expression data of the generated initial onomatopoeic group (step S312). Details of the adjective pair evaluation are the same as described with reference to FIG. 28.

In FIG. 41, the sound symbolism word generating unit 604 calculates the similarity between an adjective pair evaluation value corresponding to the image input by a user acquired from the adjective pair evaluation value estimating unit 603 in advance, and an adjective pair evaluation value generated from onomatopoeic expression data (step S313). Details of the similarity calculation are the same as those described with reference to FIG. 34.

In FIG. 41, the sound symbolism word generating unit 604 determines whether there is greater than or equal to a predetermined number of onomatopoeias for which the calculated similarity exceeds a predetermined value, and if not, the sound symbolism word generating unit 604 performs optimization (step S314). Optimization, for example, is performed by the processes of crossover, transformation, and selection. One point crossover, which is an example of crossover, is performed by selecting two onomatopoeias based on the probability set such that the higher the degree of similarity, the higher the probability of being selected, switching the front and back positions of the onomatopoeias, with a randomly selected leading position set as the boundary, and combining the onomatopoeias, to generate two new onomatopoeias. Transformation is caused to occur with a predetermined probability (not always occurring), and values at one or more positions randomly determined in the onomatopoeia expression data are randomly changed to generate a new onomatopoeia. Selection is performed by deleting an onomatopoeia with low similarity. Then, the process returns to the adjective pair evaluation (step S312) again.

Furthermore, when there is greater than or equal to a predetermined number of onomatopoeias for which the calculated similarity exceeds a predetermined value, the sound symbolism word generating unit 604 ends the process, and outputs a predetermined number of top ranking onomatopoeias having a high similarity (step S315).

According to the seventh embodiment, by interposing a sound symbolism word such as an onomatopoeia, it is possible to easily and objectively handle the texture, etc., of the appearance from the image of the article/product. More specifically, it becomes possible to search for articles having a desired texture, etc., concerning the appearance and the hand feeling expressed intuitively by various onomatopoeias such as "slippery (tsuru tsuru)", "twinkly (kira kira)", "fluffy (fuwa fuwa)", "glutinous (mochi mochi)" and "puffy (pafu pafu)", and the effect of activating purchasing activities in the Internet market can be expected. Also, in addition to the appearance and the hand feeling, the taste and smell such as "crispy (saku saku) texture" and "airy (fuwah) incense" are also often expressed by onomatopoeias, and therefore it is also possible to promote the purchasing activities of articles for which the incense, the taste, and the texture are important qualities.

It is possible to be aware of the onomatopoeia corresponding to the image of the trial product at the site of manufacturing, and therefore this is expected to contribute to realize the texture, etc., that the consumer is intuitively desiring by onomatopoeia. It is possible to facilitate communication with consumers for recognizing what consumers desire, and facilitate communication among product developers.

The main points of the embodiments using the image feature amount are summarized as follows.

(Item 1)

An image searching method includes a) extracting an image feature amount from a search target image, and based on a coefficient indicating a numerical relationship between any image feature amount and any adjective pair evaluation value, generating an adjective pair evaluation value for each search target image from an image feature amount extracted from the search target image, and b) accepting input of a search condition including a sound symbolism word from a user, and generating an adjective pair evaluation value from the sound symbolism word, in a random order, determining a similarity between the adjective pair evaluation value generated with respect to the sound symbolism word and an adjective pair evaluation value generated for each of the search target images, and providing the corresponding search target image as a search result based on the similarity.

(Item 2)

The image searching method according to item 1, wherein the process of extracting the image feature amount from the search target image includes extracting the image feature amount with respect to all of the search target images.

(Item 3)

The image searching method according to item 1, wherein the process of extracting the image feature amount from the search target image includes extracting the image feature amount with respect to the search target image within a range identified by the search condition.

(Item 4)

The image searching method according to any one of items 1 to 3, further including accepting a selection of an image by a user from the search target images provided as the search result, accepting evaluation by the user regarding consistency with the search condition with respect to the image for which the selection is accepted, extracting an image feature amount from the image when the evaluation is greater than or equal to a predetermined value, and updating the coefficient based on the adjective pair evaluation value and the image feature amount extracted from the image.

(Item 5)

The image searching method according to item 4, wherein the updating of the coefficient includes updating the coefficient for each user and generating the coefficient unique to each user.

(Item 6)

A sound symbolism word acquiring method including accepting input of an image from a user, extracting an image feature amount from the image, generating an adjective pair evaluation value from the image feature amount extracted from the image based on a coefficient indicating a numerical relationship between any image feature amount and any adjective pair evaluation value, and generating a sound symbolism word from the adjective pair evaluation value extracted from the image through the image feature amount.

(Item 7)

A coefficient generating method including accepting input of a sound symbolism word recalled by a user with respect to an evaluation image, extracting an image feature amount from the evaluation image, generating an adjective pair evaluation value from the sound symbolism word, and generating a coefficient indicating a numerical relationship between any image feature amount and any adjective pair evaluation value from the image feature amount and the adjective pair evaluation value.

(Item 8)

An image searching program that causes a computer to function as means for extracting an image feature amount from a search target image, generating an adjective pair evaluation value for each search target image from an image feature amount extracted from the search target image based on a coefficient indicating a numerical relationship between any image feature amount and any adjective pair evaluation value, accepting input of a search condition including a sound symbolism word from a user, generating an adjective pair evaluation value from the sound symbolism word, determining a similarity between the adjective pair evaluation value generated with respect to the sound symbolism word and an adjective pair evaluation value generated for each of the search target images, and providing the corresponding search target image as a search result based on the similarity.

(Item 9)

A sound symbolism word acquiring program that causes a computer to function as means for accepting input of an image from a user, extracting an image feature amount from the image, generating an adjective pair evaluation value from the image feature amount extracted from the image based on a coefficient indicating a numerical relationship between any image feature amount and any adjective pair evaluation value, and generating a sound symbolism word from the adjective pair evaluation value extracted from the image through the image feature amount.

(Item 10)

A coefficient generating program that causes a computer to function as means for accepting input of a sound symbolism word recalled by a user with respect to an evaluation image, extracting an image feature amount from the evaluation image, generating an adjective pair evaluation value from the sound symbolism word, and generating a coefficient indicating a numerical relationship between any image feature amount and any adjective pair evaluation value from the image feature amount and the adjective pair evaluation value.

(Item 11)

An image searching apparatus including means for extracting an image feature amount from a search target image, generating an adjective pair evaluation value for each search target image from an image feature amount extracted from the search target image based on a coefficient indicating a numerical relationship between any image feature amount and any adjective pair evaluation value, accepting input of a search condition including a sound symbolism word from a user, generating an adjective pair evaluation value from the sound symbolism word, determining a similarity between the adjective pair evaluation value generated with respect to the sound symbolism word and an adjective pair evaluation value generated for each of the search target images, and providing the corresponding search target image as a search result based on the similarity.

(Item 12)

A sound symbolism word acquiring apparatus including means for accepting input of an image from a user, extracting an image feature amount from the image, generating an adjective pair evaluation value from the image feature amount extracted from the image based on a coefficient indicating a numerical relationship between any image feature amount and any adjective pair evaluation value, and generating a sound symbolism word from the adjective pair evaluation value extracted from the image through the image feature amount.

(Item 13)

A coefficient generating apparatus including means for accepting input of a sound symbolism word recalled by a user with respect to an evaluation image, extracting an image feature amount from the evaluation image, generating an adjective pair evaluation value from the sound symbolism word, and generating a coefficient indicating a numerical relationship between any image feature amount and any adjective pair evaluation value from the image feature amount and the adjective pair evaluation value.

Overview

As described above, according to the present embodiment, it is possible to provide information upon quantitatively correlating a sound symbolism word and a physical feature, and it is possible to effectively support product development, etc.

The present invention has been described above by preferred embodiments of the present invention. Although the present invention has been described herein with reference to specific examples, it is obvious that various modifications and changes may be made to these examples without departing from the broad spirit and scope of the invention as defined in the claims. That is, the present invention is not to be construed as being limited by the details of specific examples and the attached drawings.

The present international patent application claims the benefit of priority of Japanese Patent Application No. 2015-178379, filed on Sep. 10, 2015, the contents of which are incorporated herein by reference in the entirety of Japanese Patent Application No. 2015-178379.

REFERENCE SIGNS LIST 1 sound symbolism word/physical feature information providing apparatus
11 interface unit
111 graphical user interface unit
12 sound symbolism word analyzing unit
121 analysis managing unit
122 morpheme analyzing unit
123 physical feature evaluating unit
123' physical feature estimating/general scale evaluating unit
13 physical feature corresponding sound symbolism word generating unit
14 morpheme database
15 phonemic physical feature database
16 general scale corresponding physical feature acquiring unit
17 quantitative evaluation database
18 physical feature corresponding impression acquiring unit
2 phonemic physical feature database generating unit
20 onomatopoeia list
21 substance name input unit
22 query generating unit
23 search executing unit
24 page access unit
25 physical feature extracting unit
26 phonemic feature/physical feature correspondence relationship analyzing unit
U user

The invention claimed is:

1. A sound symbolism word/physical feature information providing apparatus comprising:
a processor; and
a memory containing instructions that cause the processor to execute a process, the process including:
storing, in a phonemic physical feature database, a correlation between a physical feature value indicating a quantity of a component in each object, and a phonemic element included in a sound symbolism word imaged with respect to the each object;
inputting a sound symbolism word;
analyzing a phonemic element included in the sound symbolism word input at the inputting;
estimating a physical feature value corresponding to the sound symbolism word input at the inputting based on the phonemic element analyzed at the analyzing and the phonemic physical feature database; and
presenting the estimated physical feature value.

2. A sound symbolism word/physical feature information providing apparatus comprising:
a processor; and
a memory containing instructions that cause the processor to execute a process, the process including:
storing, in a phonemic physical feature database, a correlation between a physical feature value indicating a quantity of a component in each object, and a phonemic element included in a sound symbolism word imaged with respect to the each object;
inputting a first physical feature value;
initially generating a sound symbolism word;
analyzing a phonemic element included in the sound symbolism word generated at the initial generating;
estimating a second physical feature value corresponding to the sound symbolism word generated at the initial generating based on the phonemic element analyzed at the analyzing and the phonemic physical feature database;
transforming the sound symbolism word generated at the initial generating based on a similarity between the estimated second physical feature value and the input first physical feature value, and optimizing the sound symbolism word by repeating processes of the analyzing and the estimating; and
presenting the optimized sound symbolism word.

3. A sound symbolism word/physical feature information providing apparatus comprising:
a processor; and
a memory containing instructions that cause the processor to execute a process, the process including:
storing, in a phonemic physical feature database, a correlation between a physical feature value indicating a quantity of a component in each object, and a phonemic element included in a sound symbolism word imaged with respect to the each object;
inputting an impression value;
initially generating a sound symbolism word;
analyzing a phonemic element included in the sound symbolism word generated at the initial generating;
quantitatively evaluating an impression evaluation value corresponding to the sound symbolism word generated at the initial generating based on the phonemic element analyzed at the analyzing and a quantitative evaluation database defining a correlation between a phonemic element and an impression evaluation scale;
transforming the sound symbolism word generated at the initial generating based on a similarity between the impression evaluation value and the input impression value, and optimizing the sound symbolism word by repeating processes of the analyzing and the quantitative evaluating;
analyzing a phonemic element included in the optimized sound symbolism word;
estimating a physical feature value corresponding to the optimized sound symbolism word based on the analyzed phonemic element included in the optimized sound symbolism word and the phonemic physical feature database; and
presenting the estimated physical feature value.

4. A sound symbolism word/physical feature information providing apparatus comprising:
a processor; and
a memory containing instructions that cause the processor to execute a process, the process including:
storing, in a phonemic physical feature database, a correlation between a physical feature value indicating a quantity of a component in each object, and a phonemic element included in a sound symbolism word imaged with respect to the each object;
inputting a physical feature value;
initially generating a sound symbolism word;
analyzing a phonemic element included in the sound symbolism word generated at the initial generating;
estimating a physical feature value corresponding to the sound symbolism word generated at the initial generating based on the phonemic element analyzed at the analyzing and the phonemic physical feature database;
transforming the sound symbolism word generated at the initial generating based on a similarity between the estimated physical feature value and the input physical feature value, and optimizing the sound symbolism word by repeating processes of the analyzing and the estimating;
analyzing a phonemic element included in the optimized sound symbolism word;
quantitatively evaluating an impression evaluation value corresponding to the optimized sound symbolism word based on the analyzed phonemic element included in the optimized sound symbolism word and a quantitative evaluation database defining a correlation between a phonemic element and an impression evaluation scale; and
presenting the impression evaluation value.

5. A sound symbolism word/physical feature information providing method executed by a computer, the sound symbolism word/physical feature information providing method comprising:
storing, in a phonemic physical feature database, a correlation between a physical feature value indicating a quantity of a component in each object, and a phonemic element included in a sound symbolism word imaged with respect to the each object;
inputting a sound symbolism word;
analyzing a phonemic element included in the sound symbolism word input at the inputting;
estimating a physical feature value corresponding to the sound symbolism word input at the inputting based on the phonemic element analyzed at the analyzing and the phonemic physical feature database; and
presenting the estimated physical feature value.

6. A sound symbolism word/physical feature information providing method executed by a computer, the sound symbolism word/physical feature information providing method comprising:
storing, in a phonemic physical feature database, a correlation between a physical feature value indicating a quantity of a component in each object, and a phonemic element included in a sound symbolism word imaged with respect to the each object;
inputting a first physical feature value;
initially generating a sound symbolism word;

analyzing a phonemic element included in the sound symbolism word generated at the initial generating;
estimating a second physical feature value corresponding to the sound symbolism word generated at the initial generating based on the phonemic element analyzed at the analyzing and the phonemic physical feature database;
transforming the sound symbolism word generated at the initial generating based on a similarity between the estimated second physical feature value and the input first physical feature value, and optimizing the sound symbolism word by repeating processes of the analyzing and the estimating; and
presenting the optimized sound symbolism word.

7. A sound symbolism word/physical feature information providing method executed by a computer, the sound symbolism word/physical feature information providing method comprising:
storing, in a phonemic physical feature database, a correlation between a physical feature value indicating a quantity of a component in each object, and a phonemic element included in a sound symbolism word imaged with respect to the each object;
inputting an impression value;
initially generating a sound symbolism word;
analyzing a phonemic element included in the sound symbolism word generated at the initial generating;
quantitatively evaluating an impression evaluation value corresponding to the sound symbolism word generated at the initial generating based on the phonemic element analyzed at the analyzing and a quantitative evaluation database defining a correlation between a phonemic element and an impression evaluation scale;
transforming the sound symbolism word generated at the initial generating based on a similarity between the impression evaluation value and the input impression value, and optimizing the sound symbolism word by repeating processes of the analyzing and the quantitative evaluating;
analyzing a phonemic element included in the optimized sound symbolism word;
estimating a physical feature value corresponding to the optimized sound symbolism word based on the analyzed phonemic element included in the optimized sound symbolism word and the phonemic physical feature database; and
presenting the estimated physical feature value.

8. A sound symbolism word/physical feature information providing method executed by a computer, the sound symbolism word/physical feature information providing method comprising:
storing, in a phonemic physical feature database, a correlation between a physical feature value indicating a quantity of a component in each object, and a phonemic element included in a sound symbolism word imaged with respect to the each object;
inputting a physical feature value;
initially generating a sound symbolism word;
analyzing a phonemic element included in the sound symbolism word generated at the initial generating;
estimating a physical feature value corresponding to the sound symbolism word generated at the initial generating based on the phonemic element analyzed at the analyzing and the phonemic physical feature database;
transforming the sound symbolism word generated at the initial generating based on a similarity between the estimated physical feature value and the input physical feature value, and optimizing the sound symbolism word by repeating processes of the analyzing and the estimating;
analyzing a phonemic element included in the optimized sound symbolism word;
quantitatively evaluating an impression evaluation value corresponding to the optimized sound symbolism word based on the analyzed phonemic element included in the optimized sound symbolism word and a quantitative evaluation database defining a correlation between a phonemic element and an impression evaluation scale; and
presenting the impression evaluation value.

9. A non-transitory computer-readable recording medium storing a sound symbolism word/physical feature information providing program that causes a computer to execute a process, the process comprising:
storing, in a phonemic physical feature database, a correlation between a physical feature value indicating a quantity of a component in each object, and a phonemic element included in a sound symbolism word imaged with respect to the each object;
inputting a sound symbolism word;
analyzing a phonemic element included in the sound symbolism word input at the inputting;
estimating a physical feature value corresponding to the sound symbolism word input at the inputting based on the phonemic element analyzed at the analyzing and the phonemic physical feature database; and
presenting the estimated physical feature value.

10. A non-transitory computer-readable recording medium storing a sound symbolism word/physical feature information providing program that causes a computer to execute a process, the process comprising:
storing, in a phonemic physical feature database, a correlation between a physical feature value indicating a quantity of a component in each object, and a phonemic element included in a sound symbolism word imaged with respect to the each object;
inputting a first physical feature value;
initially generating a sound symbolism word;
analyzing a phonemic element included in the sound symbolism word generated at the initial generating;
estimating a second physical feature value corresponding to the sound symbolism word generated at the initial generating based on the phonemic element analyzed at the analyzing and the phonemic physical feature database;
transforming the sound symbolism word generated at the initial generating based on a similarity between the estimated second physical feature value and the input first physical feature value, and optimizing the sound symbolism word by repeating processes of the analyzing and the estimating; and
presenting the optimized sound symbolism word.

11. A non-transitory computer-readable recording medium storing a sound symbolism word/physical feature information providing program that causes a computer to execute a process, the process comprising:
storing, in a phonemic physical feature database, a correlation between a physical feature value indicating a quantity of a component in each object, and a phonemic element included in a sound symbolism word imaged with respect to the each object;
inputting an impression value;
initially generating a sound symbolism word;

analyzing a phonemic element included in the sound symbolism word generated at the initial generating;

quantitatively evaluating an impression evaluation value corresponding to the sound symbolism word generated at the initial generating based on the phonemic element analyzed at the analyzing and a quantitative evaluation database defining a correlation between a phonemic element and an impression evaluation scale;

transforming the sound symbolism word generated at the initial generating based on a similarity between the impression evaluation value and the input impression value, and optimizing the sound symbolism word by repeating processes of the analyzing and the quantitative evaluating;

analyzing a phonemic element included in the optimized sound symbolism word;

estimating a physical feature value corresponding to the optimized sound symbolism word based on the analyzed phonemic element included in the optimized sound symbolism word and the phonemic physical feature database; and presenting the estimated physical feature value.

12. A non-transitory computer-readable recording medium storing a sound symbolism word/physical feature information providing program that causes a computer to execute a process, the process comprising:

storing, in a phonemic physical feature database, a correlation between a physical feature value indicating a quantity of a component in each object, and a phonemic element included in a sound symbolism word imaged with respect to the each object;

inputting a physical feature value;

initially generating a sound symbolism word;

analyzing a phonemic element included in the sound symbolism word generated at the initial generating;

estimating a physical feature value corresponding to the sound symbolism word generated at the initial generating based on the phonemic element analyzed at the analyzing and the phonemic physical feature database;

transforming the sound symbolism word generated at the initial generating based on a similarity between the estimated physical feature value and the input physical feature value, and optimizing the sound symbolism word by repeating processes of the analyzing and the estimating;

analyzing a phonemic element included in the optimized sound symbolism word;

quantitatively evaluating an impression evaluation value corresponding to the optimized sound symbolism word based on the analyzed phonemic element included in the optimized sound symbolism word and a quantitative evaluation database defining a correlation between a phonemic element and an impression evaluation scale; and presenting the impression evaluation value.

* * * * *